United States Patent
Myung et al.

(10) Patent No.: US 11,483,866 B2
(45) Date of Patent: Oct. 25, 2022

(54) METHOD FOR PERFORMING INITIAL ACCESS PROCEDURE IN UNLICENSED BAND IN WIRELESS COMMUNICATION SYSTEM AND USER EQUIPMENT USING SAME

(71) Applicant: LG Electronics Inc., Seoul (KR)

(72) Inventors: Sechang Myung, Seoul (KR); Seonwook Kim, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/267,314

(22) PCT Filed: Aug. 9, 2019

(86) PCT No.: PCT/KR2019/010099
§ 371 (c)(1),
(2) Date: Feb. 9, 2021

(87) PCT Pub. No.: WO2020/032703
PCT Pub. Date: Feb. 13, 2020

(65) Prior Publication Data
US 2021/0345407 A1 Nov. 4, 2021

Related U.S. Application Data

(60) Provisional application No. 62/760,886, filed on Nov. 13, 2018.

(30) Foreign Application Priority Data

Aug. 9, 2018 (KR) .................. 10-2018-0092839
Nov. 2, 2018 (KR) .................. 10-2018-0133627

(Continued)

(51) Int. Cl.
*H04W 74/08* (2009.01)
*H04L 27/26* (2006.01)
(Continued)

(52) U.S. Cl.
CPC ..... *H04W 74/0816* (2013.01); *H04L 27/2607* (2013.01); *H04W 72/1263* (2013.01); *H04W 72/14* (2013.01)

(58) Field of Classification Search
None
See application file for complete search history.

(56) References Cited

U.S. PATENT DOCUMENTS

2017/0289966 A1* 10/2017 Islam .................. H04L 5/0044
2017/0325225 A1* 11/2017 Dinan ............... H04W 72/0446
(Continued)

FOREIGN PATENT DOCUMENTS

WO WO2017138702 8/2017

OTHER PUBLICATIONS

Broadcom, "WF on eNB to UE COT sharing in Autonomous UL in FeLAA," R1-1803042, 3GPP TSG RAN WG1 Meeting #92, Athens, Greece, dated Feb. 26-Mar. 2, 2018, 5 pages.
(Continued)

*Primary Examiner* — Anh Vu H Ly
(74) *Attorney, Agent, or Firm* — Fish & Richardson P.C.

(57) ABSTRACT

A method, performed by a user equipment (UE), for performing an initial access procedure in an unlicensed band includes: performing the initial access procedure with a base station; and performing transmission of a physical uplink shared channel (PUSCH) on the basis of the performing of the initial access procedure, wherein the UE obtains, from the base station, information about a listen before talk (LBT) type and information about a PUSCH starting position, and the UE performs the transmission of the PUSCH on the basis (Continued)

of the information about the LBT type and the information about the PUSCH starting position. The information about the PUSCH starting position is information indicating one position among a plurality of PUSCH starting position candidates. The information about the LBT type indicates one of a LBT type 1, a LBT type 2, and a LBT type 3.

14 Claims, 44 Drawing Sheets

(30) Foreign Application Priority Data

| Jan. 10, 2019 | (KR) | ......................... 10-2019-0003576 |
| Feb. 15, 2019 | (KR) | ......................... 10-2019-0017878 |
| May 2, 2019 | (KR) | ......................... 10-2019-0051811 |

(51) Int. Cl.
*H04W 72/12* (2009.01)
*H04W 72/14* (2009.01)

(56) References Cited

U.S. PATENT DOCUMENTS

| 2017/0359808 A1 | 12/2017 | Dinan |
| 2019/0306923 A1* | 10/2019 | Xiong .................... H04L 5/0051 |
| 2019/0385376 A1* | 12/2019 | Kim ....................... G06F 3/0482 |

OTHER PUBLICATIONS

InterDigital Inc., "On Frame Structure for NR-U Operation," R1-1804868, 3GPP TSG RAN WG1 Meeting #92bis, Sanya, China, dated Apr. 16-20, 2018, 5 pages.

InterDigital Inc., "On NR-Unlicensed Frame Structure," R1-1807034, 3GPP TSG RAN WG1 Meeting #93, Busan, Korea, dated May 21-25, 2018, 4 pages.

* cited by examiner

FIG. 37
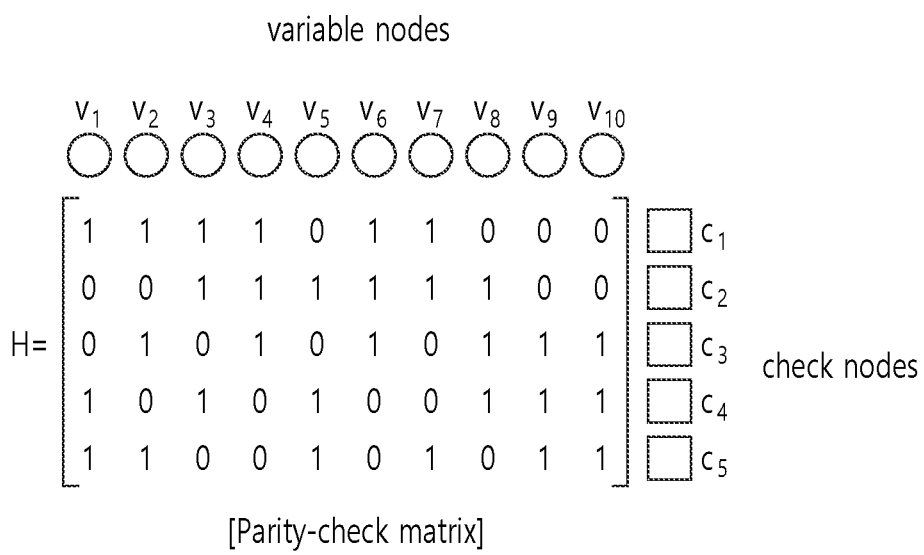
[Parity-check matrix]
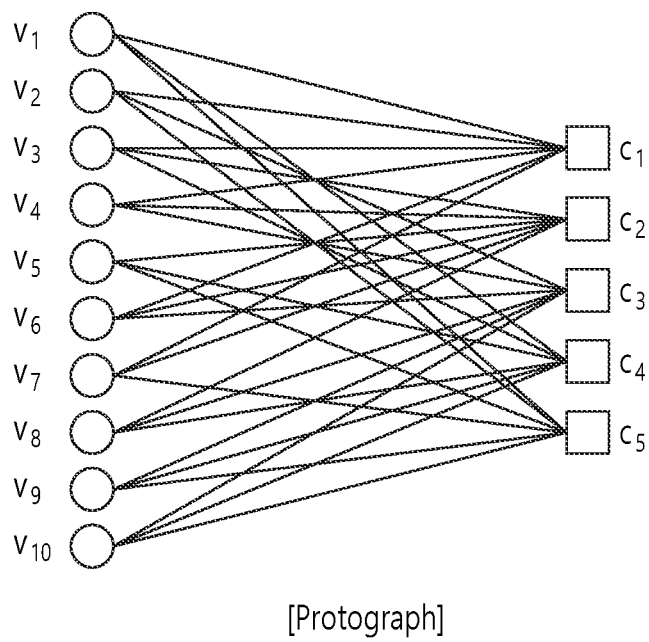
[Protograph]

(a)

$$F = \begin{bmatrix} 1 & 0 \\ 1 & 1 \end{bmatrix}$$

(b)

METHOD FOR PERFORMING INITIAL ACCESS PROCEDURE IN UNLICENSED BAND IN WIRELESS COMMUNICATION SYSTEM AND USER EQUIPMENT USING SAME

CROSS-REFERENCE TO RELATED APPLICATIONS

This application is a National Stage application under 35 U.S.C. § 371 of International Application No. PCT/KR2019/010099, filed on Aug. 9, 2019, which claims the benefit of earlier filing date and right of priority to Korean Application Nos. 10-2018-0092839, filed on Aug. 9, 2018, 10-2018-0133627, filed on Nov. 2, 2018, 10-2019-0003576, filed on Jan. 10, 2019, 10-2019-0017878, filed on Feb. 15, 2019, and 10-2019-0051811, filed on May 2, 2019, and also claims the benefit of U.S. Provisional Application No. 62/760,886, filed on Nov. 13, 2018. The disclosures of the prior applications are incorporated by reference in their entirety.

BACKGROUND OF THE DISCLOSURE

Field of the Disclosure

The present disclosure relates to wireless communication and, more particularly, to a method for performing an initial access procedure in an unlicensed band and a user equipment using the method.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more communication devices require larger communication capacity, the need for enhanced mobile broadband (eMBB) communication arises. In addition, massive machine type communication (MTC) that provides various services anytime anywhere by connecting multiple devices and things is also one of main issues to be considered in next-generation communication. Furthermore, ultra-reliable and low latency communication (URLLC) that takes services/user equipment (UE) sensitive to reliability and latency into account is also under discussion. In this manner, introduction of a next-generation radios access technology in consideration of eMBB, massive MTC, URLLC, and the like is under discussion, and such a new radio access technology may be called a new radio access technology (NR) for convenience.

In millimeter wave (mmW) bands, wavelengths become short and thus a plurality of antennas can be installed in the same area. For example, a wavelength is 1 cm in a 30 GHz band, and a total of 100 antenna elements can be installed in a 2-dimensional arrangement on a panel in 5×5 cm² at intervals of 0.5λ (wavelength). Accordingly, coverage is increased or throughput is improved by increasing a beamforming gain using a plurality of antenna elements in mmW bands.

In this case, independent beamforming is possible for each frequency resource if a transceiver is provided such that transmission power and phase can be controlled per antenna element. However, installation of transceivers for all of 100 antenna elements is inefficient in terms of price. Accordingly, a method of mapping a plurality of antenna elements to one TXRU and controlling a beam direction using an analog phase shifter is considered. Such an analog beamforming method cannot provide frequency selective beaming because only one beam direction can be generated in the entire band.

As an intermediate form of digital beamforming and analog beamforming, hybrid beamforming having B transceivers fewer than Q antenna elements may be considered. In this case, the number of directions of beams that can be simultaneously transmitted is limited to B or less although it depends on methods of connecting the B transceivers and the Q antenna elements.

Physical channel structures of NR and/or characteristics related thereto may differ from those of legacy LTE according to inherent characteristics of NR. For efficient operations of NR, various methods can be proposed.

SUMMARY

The present disclosure provides a method for performing an initial access procedure in an unlicensed band in a wireless communication system and a user equipment using the method.

In an aspect, a method for performing an initial access procedure in an unlicensed band is provided. The method performed by a user equipment (UE) may comprise performing the initial access procedure with a base station (BS) and performing a transmission of a Physical Uplink Shared Channel (PUSCH) based on performing the initial access procedure, the UE obtains information for a listen before talk (LBT) type and information for a PUSCH starting position from the BS, the UE performs the PUSCH transmission based on the information for an LBT type and the information for a PUSCH starting position, the information for a PUSCH starting position is information informing a position among a plurality of PUSCH starting position candidates, the information for an LBT type informs one of LBT type 1, LBT type 2, and LBT type 3, the UE performs an LBT with a random back-off in LBT type 1, the UE performs an LBT without a random back-off in LBT type 2, and the UE does not perform an LBT in LBT type 3.

A downlink and an uplink may be alternately scheduled within a channel occupancy time (COT) obtained by the UE.

A first downlink may be scheduled after a first uplink is scheduled within the COT, and a second uplink is scheduled after the first downlink is scheduled, and the LBT type is determined based on whether a transmission of the first downlink is performed.

When multiple uplink and downlink transmissions are scheduled within the channel occupancy time (COT), a transmission bandwidth of an uplink or a downlink which may be subsequently transmitted is restricted based on a size of the transmission bandwidth of a previous uplink or downlink.

A first downlink, a first uplink, and a second downlink may be scheduled sequentially on a time domain within the COT, and the transmission bandwidth of the first uplink is determined based on a size of the transmission bandwidth of the first downlink.

A CP extension may be applied to a gap between the PUSCH starting position and a next symbol boundary based on a subcarrier spacing.

A first uplink and a second uplink may be scheduled for the UE, and the UE performs the LBT based on the spacing between the first uplink and the second uplink.

The information for an LBT type and the information for a PUSCH starting position may be transmitted through a UL grant, start and length indicator value (SLIV) information is included in the UL grant, the SLIV information indicates an index of the starting symbol and a number of symbols included in the PUSCH, the symbol indicated by the SLIV information is symbol #K, and the K is a positive integer.

The plurality of PUSCH starting position candidates may be at least one of a first PUSCH starting position candidate set or a second PUSCH starting position candidate set, the first PUSCH starting position candidate set includes symbol #(K−N)+16 us, symbol #(K−N)+16 us+TA, symbol #(K−N)+25 us, symbol #(K−N)+25 us+TA, and symbol #K, the second PUSCH starting position candidate set includes symbol #K, symbol #K+16 us, symbol #K+16 us+TA, symbol #K+25 us, and symbol #K+25 us+TA, and the N is a value based on a subcarrier spacing.

Based on the relation between the starting symbol index indicated by the SLIV information and a reference symbol index when the PUSCH starting position is indicated, the UE may determine a transport block size (TBS) of the PUSCH.

When the PUSCH starting position is positioned between symbol #(K−N) and symbol #K, the reference symbol index may be symbol #(K−N), and when the PUSCH starting position is positioned between symbol #K and symbol #(K+N), the reference symbol index is symbol #K.

The UE may implement at least one Advanced Driver Assistance System (ADAS) function based on a signal for controlling a motion of the UE, and/or the UE receives a user input and switches a driving mode of the UE from an autonomous driving mode to a manual driving mode or switches a driving mode of the UE from a manual driving mode to an autonomous driving mode.

The UE may drive autonomously based on external object information, and the external object information includes at least one of information on an existence of the object, position information of the object, distance information between the UE and the object and relative velocity information between the UE and the object.

In another aspect, a user equipment (UE) is provided. The UE may comprise a memory, a transceiver and a processor operably coupled with the memory and the transceiver, the processor is configured to: perform the initial access procedure with a base station (BS) and perform a transmission of a Physical Uplink Shared Channel (PUSCH) based on performing the initial access procedure, the UE obtains information for a listen before talk (LBT) type and information for a PUSCH starting position from the BS, the UE performs the PUSCH transmission based on the information for an LBT type and the information for a PUSCH starting position, the information for a PUSCH starting position is information informing a position among a plurality of PUSCH starting position candidates, the information for an LBT type informs one of LBT type 1, LBT type 2, and LBT type 3, the UE performs an LBT with a random back-off in LBT type 1, the UE performs an LBT without a random back-off in LBT type 2, and the UE does not perform an LBT in LBT type 3.

In other aspects, a processor for a wireless communication device in a wireless communication system is provided. The processor controls the wireless communication device and configured to: perform an initial access procedure with a base station (BS) and perform a transmission of a Physical Uplink Shared Channel (PUSCH) based on performing the initial access procedure, the UE obtains information for a listen before talk (LBT) type and information for a PUSCH starting position from the BS, the UE performs the PUSCH transmission based on the information for an LBT type and the information for a PUSCH starting position, the information for a PUSCH starting position is information informing a position among a plurality of PUSCH starting position candidates, the information for an LBT type informs one of LBT type 1, LBT type 2, and LBT type 3, the UE performs an LBT with a random back-off in LBT type 1, the UE performs an LBT without a random back-off in LBT type 2, and the UE does not perform an LBT in LBT type 3.

According to the present disclosure, it may be indicated whether a base station performs an LBT, and in the case that a base station performs an LBT, a type of LBT to be performed may be explicitly indicated to a user equipment. As a result, a PUSCH transmission based on various LBT types (e.g., LBT type 1, LBT type 2, and LBT type 3) may be stably indicated.

BRIEF DESCRIPTION OF THE DRAWINGS

FIG. 37 illustrates a parity check matrix represented by a protograph.

DESCRIPTION OF EXEMPLARY EMBODIMENTS

Hereinafter, undefined terms or abbreviations may be defined in 3GPP TS 36 series or TS 38 series.

The embodiments of the present disclosure to be described below may be applied to the following situation.

Figure 1:
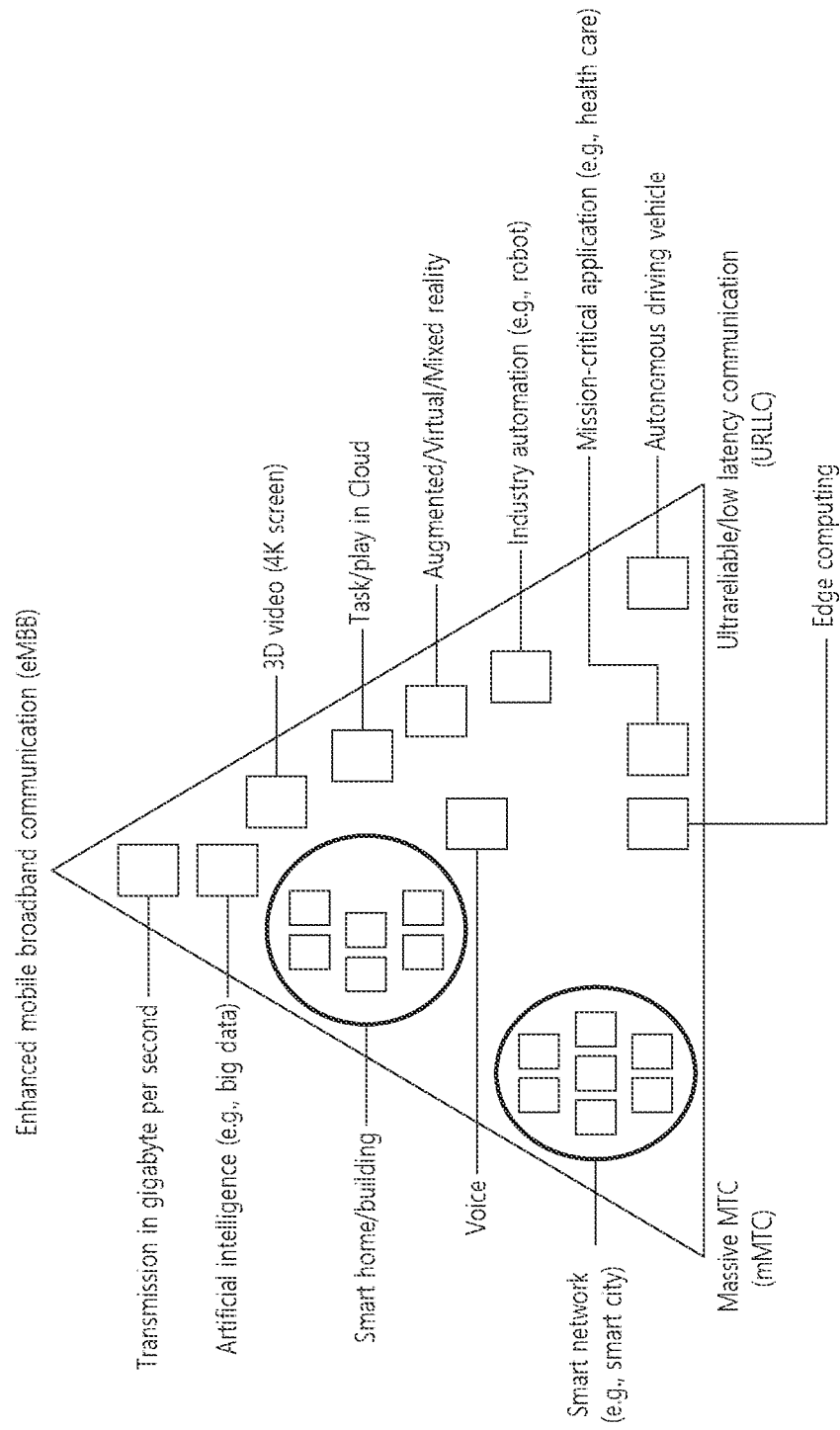
FIG. 1 illustrates an example of 5G use scenarios to which the technical feature of the present disclosure may be applied.

FIG. 1 illustrates an example of 5G use scenarios to which the technical feature of the present disclosure may be applied.

The 5G usage scenarios shown in FIG. X are only exemplary, and the technical features of the present document can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 25 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Meanwhile, the above-described device may be a base station, a network node, a transmitting terminal, a receiving terminal, a wireless device, a wireless communication device, a vehicle, a vehicle equipped with an autonomous driving function, a connected car, a unmanned aerial vehicle (UAV), an Artificial Intelligence (AI) module, a robot, an augmented reality (AR) device, a virtual reality (VR) device, a mixed reality (MR) device, a hologram device, a public safety device, an machine type communication (MTC) device, an Internet of Things (IoT) device, a medical device, a pin-tec device (or financial device), a security device, a climate/environmental device, devices related to 5G services, or other devices related to fourth industrial revolution fields.

For example, terminals may include a cellular phone, a smart phone, a laptop computer, a digital broadcasting terminal, a personal digital assistants (PDA), a portable multimedia player (PMP), a navigation device, a slate PC, a tablet PC, an ultrabook, a wearable device (e.g., a smart-watch, a smart glass, or a head mounted display (HMD)), etc. For example, the HMD may be a display device worn on a head. For example, the HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be devices which do not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The above-described embodiments of the present disclosure may also be applied to the following technologies.

<Artificial Intelligence (AI)>

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

<Robot>

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields.

A robot may include an actuator or a driver including a motor to perform various physical operations, such as moving a robot joint. In addition, a movable robot may include a wheel, a brake, a propeller, and the like in a driver to run on the ground or fly in the air through the driver.

<Self-Driving, Autonomous-Driving>

Self-driving refers to autonomous driving and a self-driving vehicle refers to a vehicle that travels without user operation or with minimum operation of a user.

For example, self-driving may include a technique of keeping a current lane, a technique of automatically controlling a speed, such as adaptive cruise control, a technique of automatically traveling along a set route, a technique of automatically setting a route and traveling along the route when a destination is set, etc.

Vehicles include vehicles equipped with only an internal combustion engine, hybrid vehicles equipped with an internal combustion engine and an electric motor, and electric vehicles equipped with only an electric motor and may also include trains, motorcycles, etc.

Here, self-driving vehicles may be regarded as robots having a self-driving function.

<Extended Reality (XR)>

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Figure 2:
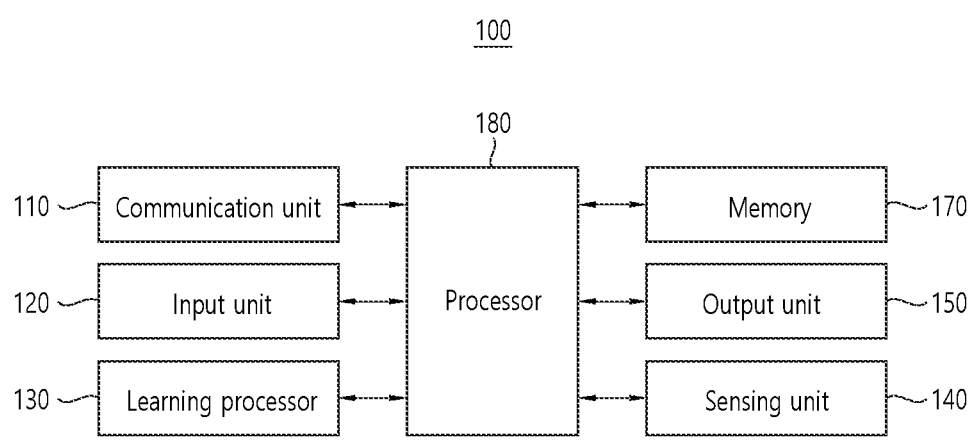
FIG. 2 illustrates an AI device 100 according to an embodiment of the present disclosure.

FIG. 2 illustrates an AI device 100 according to an embodiment of the present disclosure.

The AI device 100 may be implemented by a fixed device or a mobile device such as a TV, a projector, a cellular phone, a smartphone, a desktop computer, a notebook computer, a digital broadcasting terminal, a personal digital assistant (PDA), a portable multimedia player (PMP), a navigation system, a table PC, a wearable device, a set-top box (STB), a DMB receiver, a radio receiver, a washing machine, a refrigerator, a digital signage, a robot, or a vehicle.

Referring to FIG. 2, the AI device 100 may include a communication unit 110, an input unit 120, a learning processor 130, a sensing unit 140, an output unit 150, a memory 170, a processor 180, and the like.

The communication unit 110 may transmit/receive data to/from external devices such as other AI devices 100a to 100e or an AI server 200 using wired and wireless communication technologies. For example, the communication unit 110 may transmit/receive sensor information, user input, learning models, control signals, and the like to/from the external devices.

Here, communication technologies used by the communication unit 110 may include GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), IrDA (Infrared Data Association), ZigBee, NFC (Near Field Communication), etc.

The input unit 120 may acquire various types of data.

Here, the input unit 120 may include a camera for receiving image signal input, a microphone for receiving audio signals, a user input unit for receiving information from a user, and the like. Here, the camera or the microphone may be handled as a sensor and a signal acquired through the camera or the microphone may be referred to as sensing data or sensing information.

The input unit 120 may acquire input data to be used when an output is obtained using learning data and a learning model for model learning. The input unit 120 may acquire unprocessed input data. In this case, the processor 180 or the learning processor 130 may extract input features by pre-processing the input data.

The learning processor 130 may train a model composed of an artificial neural network using learning data. Here, a trained artificial neural network may be referred to as a learning model. The learning model may be used to infer result values with respect to new input data instead of learning data, and inferred values may be used as a basis of determination for performing a certain operation.

Here, the learning processor 130 may perform AI processing along with a learning processor 240 of the AI server 200.

Here, the learning processor 130 may include a memory that is integrated into the AI device 100 or implemented. Alternatively, the learning processor 130 may be implemented using the memory 170, an external memory directly connected to the AI device 100, or a memory maintained by an external device.

The sensing unit 140 may acquire at least one of internal information of the AI device 100, surrounding environment information of the AI device 100, and user information using various sensors.

Here, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a lidar, a radar, etc.

The output unit 150 may generate outputs associated with vision, hearing or tactile sensation.

Here, the output unit 150 may include a display for outputting visual information, a speaker for outputting auditory information, a haptic module for outputting tactile information, etc.

The memory 170 may store data supporting various functions of the AI device 100. For example, the memory 170 can store input data, learning data, a learning model, and a learning history acquired through the input unit 120.

The processor 180 may determine at least one executable operation of the AI device 100 on the basis of information determined or generated using a data analysis algorithm or a machine learning algorithm. In addition, the processor 180 may perform the determined operation by controlling components of the AI device 100.

To this end, the processor 180 may request, search, receive or use data of the learning processor 130 or the memory 170 and control components of the AI device 100 such that a predicted operation or an operation determined to be desirable among the at least one executable operation is executed.

Here, when association with an external device is necessary to execute the determined operation, the processor 180 may generate a control signal for controlling the external device and transmit the generated control signal to the external device.

The processor 180 may acquire intention information with respect to a user input and determine requirements of a user on the basis of the acquired intention information.

Here, the processor 180 can acquire the intention information corresponding to the user input using at least one of a speech-to-text (STT) engine for converting a speech input into text and a natural language processing (NLP) engine for acquiring intention information of a natural language.

Here, at least a part of at least one of the STT engine and the NLP engine may be composed of an artificial neural network trained according to a machine learning algorithm. In addition, at least one of the STT engine and the NLP engine may be trained by the learning processor 130, trained by the learning processor 240 of the AI server 200, or trained through distributed processing of the learning processor 130 and the learning processor 240.

The processor 180 may collect history information including details of operations of the AI device 100 or user feedback with respect to operations and store the history information in the memory 170 or the learning processor 130 or transmit the history information to an external device such as the AI server 200. The collected history information can be used to update the learning model.

The processor 180 may control at least some of the components of the AI device 100 in order to execute an application program stored in the memory 170. Furthermore, the processor 180 may combine at least two of the components included in the AI device 100 and operate the same in order to execute the application program.

Figure 3:
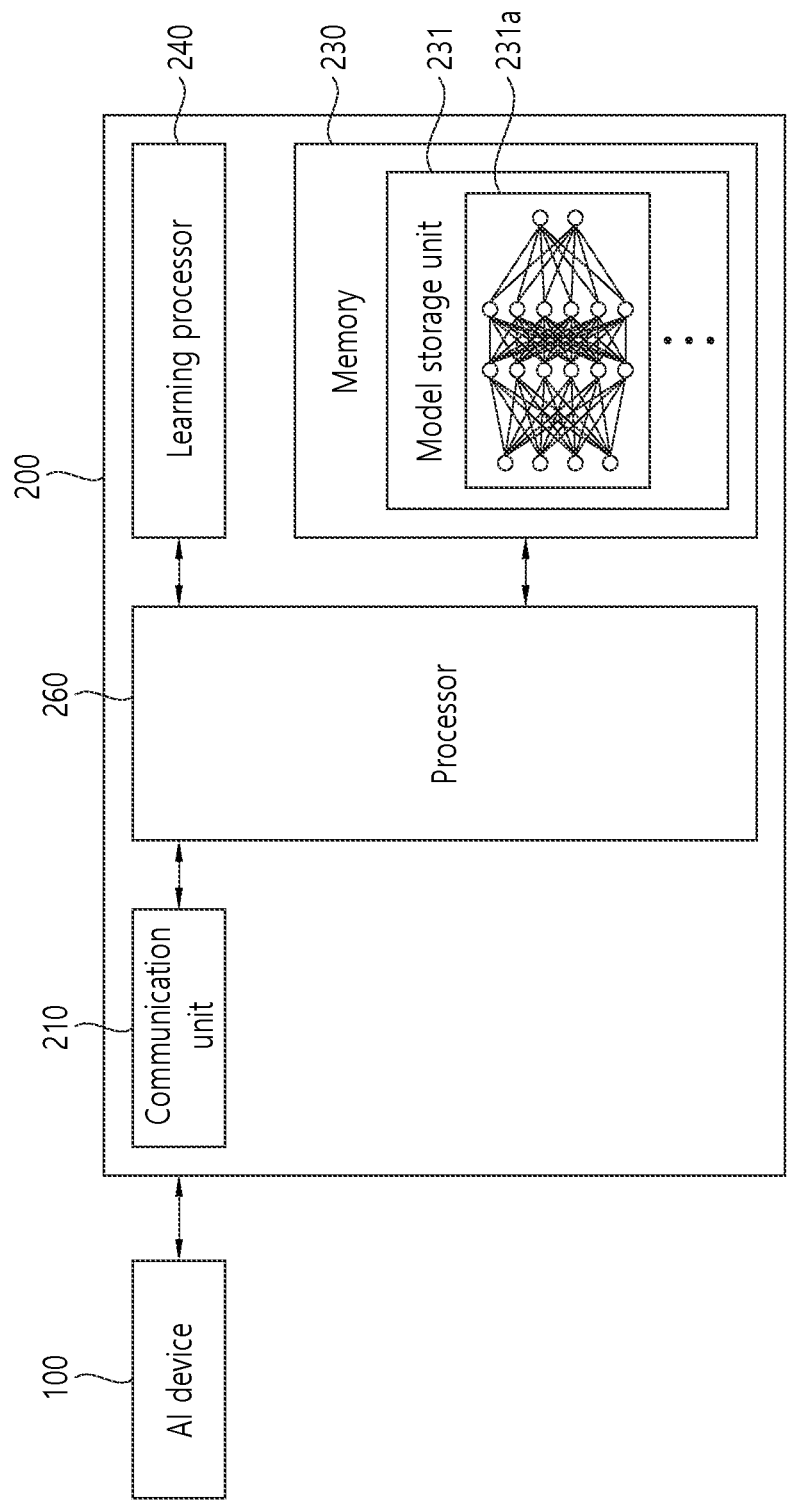
FIG. 3 illustrates an AI server 200 according to an embodiment of the present disclosure.

FIG. 3 illustrates an AI server 200 according to an embodiment of the present disclosure.

Referring to FIG. 3, the AI server 200 may refer to a device that trains an artificial neural network using a machine learning algorithm or uses a trained artificial neural network. Here, the AI server 200 may be composed of multiple servers to perform distributed processing and may be defined as a 5G network. Here, the AI server 200 may be included in the AI device 100 as a part of components thereof to perform at least a part of AI processing.

The AI server 200 may include a communication unit 210, a memory 230, the learning processor 240, and a processor 260.

The communication unit 210 may transmit/receive data to/from external devices such as the AI device 100.

The memory 230 may include a model storage unit 231. The model storage unit 231 may store a model (or an artificial neural network 231*a*) that is being trained or has been trained through the learning processor 240.

The learning processor 240 may train the artificial neural network 231*a* using learning data. A learning model may be used in a state in which it is installed in the AI server 200 or used by being installed in an external device such as the AI device 100.

The learning model may be implemented by hardware, software, or a combination of hardware and software. When a part or all of the learning model is implemented by software, one or more instructions constituting the learning model may be stored in the memory 230.

The processor 260 may infer result values with respect to new input data using the learning model and generate a response or a control instruction based on the inferred result values.

Figure 4:
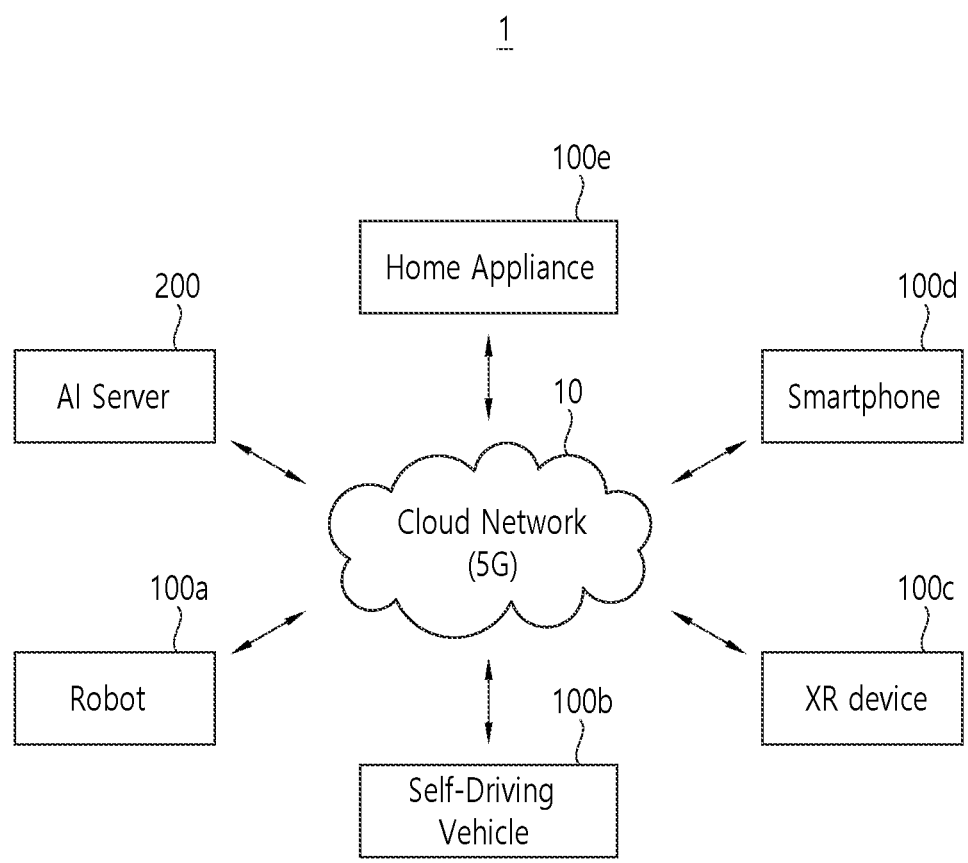
FIG. 4 illustrates an AI system 1 according to an embodiment of the present disclosure.

FIG. 4 illustrates an AI system 1 according to an embodiment of the present disclosure.

Referring to FIG. 4, in the AI system 1, at least one of the AI server 200, a robot 100*a*, a self-driving vehicle 100*b*, an XR device 100*c*, a smartphone 100*d*, and a household electric appliance 100*e* is connected to a cloud network 10. Here, the robot 100*a*, the self-driving vehicle 100*b*, the XR device 100*c*, the smartphone 100*d*, and the household electric appliance 100*e* to which the AI technology is applied may be referred to as AI devices 100*a* to 100*e*.

The cloud network 100 may refer to a network that constitutes a part of a cloud computing infrastructure or is present in the cloud computing infrastructure. Here, the cloud network 10 may be configured using a 3G network, a 4G or LTE (Long Term Evolution) network, or a 5G network.

That is, the devices 100*a* to 100*e* and 200 constituting the AI system 1 can be connected through the cloud network 10. In particular, the devices 100*a* to 100*e* and 200 may communicate with each other through a base station or directly communicate with each other without a base station.

The AI server 200 may include a server performing AI processing and a server performing arithmetic operations with respect to big data.

The AI server 200 may be connected to at least one of the robot 100*a*, the self-driving vehicle 100*b*, the XR device 100*c*, the smartphone 100*d* and the household electric appliance 100*e* which are AI devices constituting the AI system 1 through the cloud network 10 and may assist at least a part of AI processing of the connected AI devices 100*a* to 100*e*.

Here, the AI server 200 may train an artificial neural network according to a machine learning algorithm instead of the AI devices 100*a* to 100*e* and directly store a learning model or transmit the learning model to the AI devices 100*a* to 100*e*.

Here, the AI server 200 may receive input data from the AI devices 100*a* to 100*e*, infer result values with respect to the received input data using the learning model, generate responses or control instructions based on the inferred result values, and transmit the responses or the control instructions to the AI devices 100*a* to 100*e*.

Alternatively, the AI server 200 may directly infer result values with respect to input data using the learning model and generate responses or control instructions based on the inferred result values.

Hereinafter, various embodiments of the AI devices 100*a* to 100*e* to which the techniques described above are applied will be described. Here, the AI devices 100*a* to 100*e* shown in FIG. 4 may be a particular embodiment of the AI device 100 shown in FIG. 1.

<AI+Robot>

The robot 100*a* may be implemented as a guide robot, a transport robot, a cleaning robot, a wearable robot, an entertainment robot, a pet robot, an unmanned aircraft robot, or the like by employing the AI technology.

The robot 100*a* may include a robot control module for controlling operations, and the robot control module may refer to a software module or a chip that implements the software module as hardware.

The robot 100*a* may acquire state information of the robot 100*a*, detect (recognize) surrounding environments and objects, generate map data, determine a movement route and a traveling plan, determine a response to a user interaction, or determine an operation using sensor information obtained from various types of sensors.

Here, the robot 100*a* may use sensor information obtained from at least one sensor of a lidar, a radar and a camera in order to determine a movement route and a traveling plan.

The robot 100*a* may perform the aforementioned operations using a learning model composed of at least one artificial neural network. For example, the robot 100*a* can recognize surrounding environments and objects using the learning model and determine an operation using recognized surrounding environment information or object information. Here, the learning model may be directly trained in the robot 100*a* or trained in an external device such as the AI server 200.

Here, although the robot 100*a* may directly generate results using the learning model and perform an operation, the robot 100*a* may transmit sensor information to an external device such as the AI server 200, receive results generated thereby and perform an operation.

The robot 100*a* may determine a movement route and a traveling plan using at least one of object information detected from sensor information and object information acquired from an external device and travel along the determined movement route according to the determined traveling plan by controlling a driver.

Map data may include object identification information about various objects disposed in a space in which the robot 100*a* moves. For example, the map data may include object identification information about fixed objects such as walls and doors and movable objects such as pots and desks. In addition, object identification information may include names, types, distances, and positions.

In addition, the robot 100*a* may perform an operation or travel by controlling the driver on the basis of control/interaction of a user. Here, the robot 100*a* may acquire intention information of an interaction according to motions or speech of the user, determine a response on the basis of the acquired intention information and perform an operation.

<AI+Self-Driving>

The self-driving vehicle 100*b* may be implement as a movable robot, a vehicle, an unmanned aircraft, or the like by employing the AI technology.

The self-driving vehicle 100*b* may include a self-driving control module for controlling a self-driving function, and the self-driving control module may refer to a software module or a chip that implements the software module as hardware. The self-driving control module may be included in the self-driving vehicle 100b as a component thereof or may be configured as separate external hardware and connected to the self-driving vehicle 100b.

The self-driving vehicle 100b may acquire state information thereof, detect (recognize) surrounding environments and objects, generate map data, determine a movement route and a traveling plan, or determine an operation using sensor information acquired from various types of sensors.

Here, like the robot 100a, the self-driving vehicle 100b may use sensor information obtained from at least one sensor of a lidar, a radar and a camera in order to determine a movement route and a traveling plan.

In particular, the self-driving vehicle 100b may recognize an environment or an object with respect to an unseen area or an area at a certain distance or longer by receiving sensor information from external devices or information directly recognized by the external devices.

The self-driving vehicle 100b may perform the aforementioned operations using a learning model composed of at least one artificial neural network. For example, the self-driving vehicle 100b can recognize surrounding environments and objects using the learning model and determine a traveling route using recognized surrounding environment information or object information. Here, the learning model may be directly trained in the self-driving vehicle 100b or trained in an external device such as the AI server 200.

Here, although the self-driving vehicle 100b may directly generate results using the learning model and perform an operation, the self-driving vehicle 100b may transmit sensor information to an external device such as the AI server 200, receive results generated thereby and perform an operation.

The self-driving vehicle 100b may determine a movement route and a traveling plan using at least one of object information detected from sensor information and object information acquired from an external device and travel along the determined movement route according to the determined traveling plan by controlling a driver.

Map data may include object identification information about various objects disposed in a space (e.g., roads) in which the self-driving vehicle 100b travels. For example, the map data may include object identification information about fixed objects such as streetlamps, rocks, and buildings and movable objects such as vehicles and pedestrians. In addition, object identification information may include names, types, distances, and positions.

In addition, the self-driving vehicle 100b may perform an operation or travel by controlling the driver on the basis of control/interaction of a user. Here, the self-driving vehicle 100b may acquire intention information of an interaction according to motions or speech of the user, determine a response on the basis of the acquired intention information and perform an operation.

<AI+XR>

The XR device 100c may be implemented as a head-mount display (HMD), a head-up display (HUD) included in a vehicle, a TV, a cellular phone, a smartphone, a computer, a wearable device, a household electric appliance, a digital signage, a vehicle, a fixed robot, or a movable robot by employing the AI technology.

The XR device 100c may analyze three-dimensional point cloud data or image data acquired from an external device through various sensors and generate position data and attribute data with respect to three-dimensional points to obtain information about a surrounding space or a real object, render an XR object to be output, and output the XR object. For example, the XR device 100c may output an XR object including additional information about a recognized object in association with the recognized object.

The XR device 100c may perform the aforementioned operations using a learning model composed of at least one artificial neural network. For example, the XR device 100c can recognize a real object from three-dimensional point cloud data or image data using the learning model and provide information corresponding to the recognized real object. Here, the learning model may be directly trained in the XR device 100c or trained in an external device such as the AI server 200.

Here, although the XR device 100c may directly generate results using the learning model and perform an operation, the XR device 100c may transmit sensor information to an external device such as the AI server 200, receive results generated thereby and perform an operation.

<AI+Robot+Self-Driving>

The robot 100a may be implemented as a guide robot, a transport robot, a cleaning robot, a wearable robot, an entertainment robot, a pet robot, an unmanned aircraft robot, or the like by employing the AI technology and the self-driving technology.

The robot 100a to which the AI technology and the self-driving technology may refer to a robot having the self-driving function, the robot 100a that interacts with the self-driving vehicle 100b, or the like.

The robot 100a having the self-driving function may commonly refer to devices that move by themselves along given moving lines without control of users or determine moving lines and move by themselves.

The robot 100a having the self-driving function and the self-driving vehicle 100b may use a common sensing method in order to determine at least one of a movement route and a traveling plan. For example, the robot 100a having the self-driving function and the self-driving vehicle 100b can determine at least one of a movement route and a traveling plan using information sensed through a lidar, a radar and a camera.

The robot 100a that interacts with the self-driving vehicle 100b may be present separately from the self-driving vehicle 100b and perform an operation associated with the self-driving function or a user in the self-driving vehicle 100b inside or outside the self-driving vehicle 100b.

Here, the robot 100a that interacts with the self-driving vehicle 100b may control or assist the self-driving function of the self-driving vehicle 100b by acquiring sensor information instead of the self-driving vehicle 100b and providing the sensor information to the self-driving vehicle 100b or acquiring sensor information, generating surrounding environment information or object information and providing the generated information to the self-driving vehicle 100b.

Alternatively, the robot 100a that interacts with the self-driving vehicle 100b may control functions of the self-driving vehicle 100b by monitoring a user in the self-driving vehicle 100b or through an interaction with the user. For example, when it is determined that a driver is in a drowsy state, the robot 100a may activate the self-driving function of the self-driving vehicle 100b or assist control of a driver of the self-driving vehicle 100b. Here, functions of the self-driving vehicle 100b controlled by the robot 100a may include not only the self-driving function but also functions provided by a navigation system and an audio system included in the self-driving vehicle 100b.

Alternatively, the robot 100a that interacts with the self-driving vehicle 100b may provide information to the self-driving vehicle 100b or assist functions of the self-driving vehicle 100b outside the self-driving vehicle 100b. For example, the robot 100b may provide traffic information including signal information, such as smart traffic lights, to the self-driving vehicle 100b or automatically connect an electric charger to a charging port by interacting with the self-driving vehicle 100b like an automatic electric charger of an electric vehicle.

<AI+Robot+XR>

The robot 100a may be implemented as a guide robot, a transport robot, a cleaning robot, a wearable robot, an entertainment robot, a pet robot, an unmanned aircraft robot, or the like by employing the AI technology and the XR technology.

The robot 100a to which the XR technology is applied may refer to a robot that is a control/interaction target in an XR image. In this case, the robot 100a may be associated with the XR device 100c while being distinguished from the XR device 100c.

When the robot 100a that is a control/interaction target in an XR image obtains sensor information from sensors including a camera, the robot 100a or the XR device 100c may generate an XR image based on the sensor information and the XR device 100c may output the generated XR image. In addition, the robot 100a may operate on the basis of control signals input through the XR device 100c or interactions of a user.

For example, the user may check an XR image corresponding to a view of the robot 100a remotely associated with an external device such as the XR device 100c, adjust a self-driving route of the robot 100a through an interaction, control operations or traveling, or check information on surrounding objects.

<AI+Self-Driving+XR>

The self-driving vehicle 100b may be implemented as a movable robot, a vehicle, an unmanned aircraft, or the like by employing the AI technology and the XR technology.

The self-driving vehicle 100b to which the XR technology is applied may refer to a self-driving vehicle including a means for providing XR images or a self-driving vehicle that is a control/interaction target in an XR image. In particular, the self-driving vehicle 100b that is a control/interaction target in an XR image may be associated with the XR device 100c while being distinguished from the XR device 100c.

The self-driving vehicle 100b including a means for providing XR images may acquire sensor information from sensors including a camera and output XR images generated on the basis of the acquired sensor information. For example, the self-driving vehicle 100b can provide an XR object corresponding to a real object or an object in an image to a passenger by including an HUD and outputting XR images.

Here, when the XR object is output through the HUD, the XR object may be output such that at least a part thereof is overlaid on the real object at which the passenger gazes. On the other hand, when the XR object is output to a display included in the self-driving vehicle 100b, the XR object may be output such that at least a part thereof overlaps an object in an image. For example, the self-driving vehicle 100b may output XR objects corresponding to objects such as roads, other vehicles, traffic lights, traffic signs, two-wheeled vehicles, pedestrians, and buildings.

When the self-driving vehicle 100b that is a control/interaction target in an XR image obtains sensor information from sensors including a camera, the self-driving vehicle 100b or the XR device 100c may generate an XR image based on the sensor information and the XR device 100c may output the generated XR image. In addition, the self-driving vehicle 100b may operate on the basis of control signals input through an external device such as the XR device 100c or interactions of a user.

Finally, the claims of the present disclosure may be combined in various manners. For example, technical features of the method claim of the present disclosure may be combined to implement a device, and technical features of the device claim of the present disclosure may be combined to implement a method. In addition, the technical features of the method claim and the technical features of the device claim of the present disclosure may be combined to implement a device, and technical features of the method claim and the technical features of the device claim of the present disclosure may be combined to implement a method.

Figure 5:
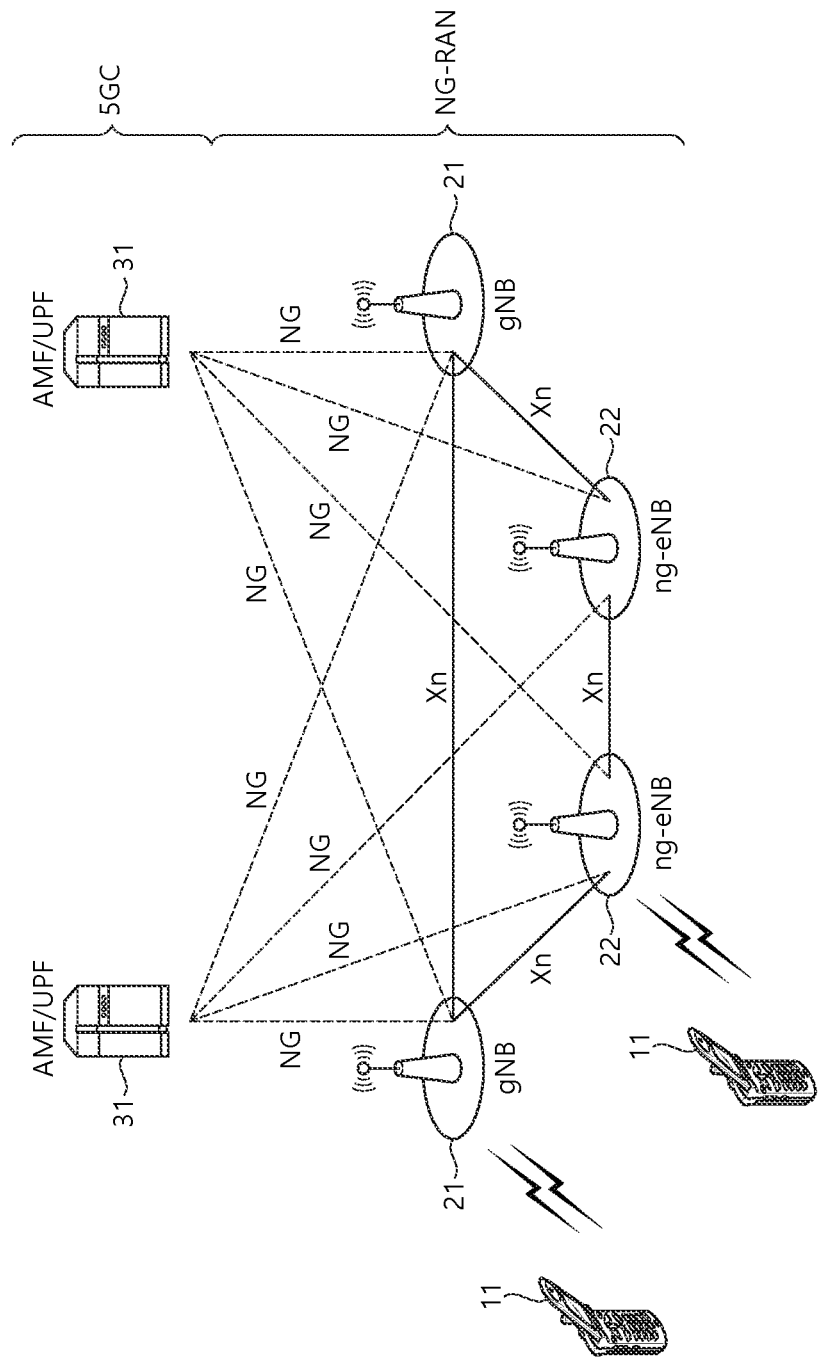
FIG. 5 illustrates another example of a wireless communication system to which the technical feature of the present disclosure may be applied.

FIG. 5 illustrates another example of a wireless communication system to which the technical feature of the present disclosure may be applied.

Specifically, FIG. 5 shows a system architecture based on a 5G new radio access technology (NR) system. The entity used in the 5G NR system (hereinafter, simply referred to as "NW") may absorb some or all of the functions of the entities introduced in FIG. 1 (e.g. eNB, MME, S-GW). The entity used in the NR system may be identified by the name "NG" for distinction from the LTE.

Referring to FIG. 5, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g., μ=0, 1 . . . 4) may be represented as a first subcarrier spacing, a second subcarrier spacing . . . Nth subcarrier spacing.

Referring to Table 1, transmission of user data (e.g., physical uplink shared channel (PUSCH), physical downlink shared channel (PDSCH)) may not be supported depending on the subcarrier spacing. That is, transmission of user data may not be supported only in at least one specific subcarrier spacing (e.g., 240 kHz).

In addition, referring to Table 1, a synchronization channel (e.g., a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g., 60 kHz).

In NR, a number of slots and a number of symbols included in one radio frame/subframe may be different according to various numerologies, i.e., various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to μ=0 is applied, one radio frame includes 10 subframes, one subframe corresponds to one slot, and one slot consists of 14 symbols. In the present disclosure, a symbol refers to a signal transmitted during a specific time interval. For example, a symbol may refer to a signal generated by OFDM processing. That is, a symbol in the present disclosure may refer to an OFDM/OFDMA symbol, or SC-FDMA symbol, etc. A CP may be located between each symbol. FIG. 3 shows an example of a frame structure to which technical features of the present disclosure can be applied. In FIG. 3, a subcarrier spacing is 15 kHz, which corresponds to μ=0.

<Self-Contained Subframe Structure>

For the purpose of minimizing latency in 5G NR, a structure in which a control channel and a data channel are TDMed, as illustrated in the following figure, may be considered as a frame structure.

Figure 6:
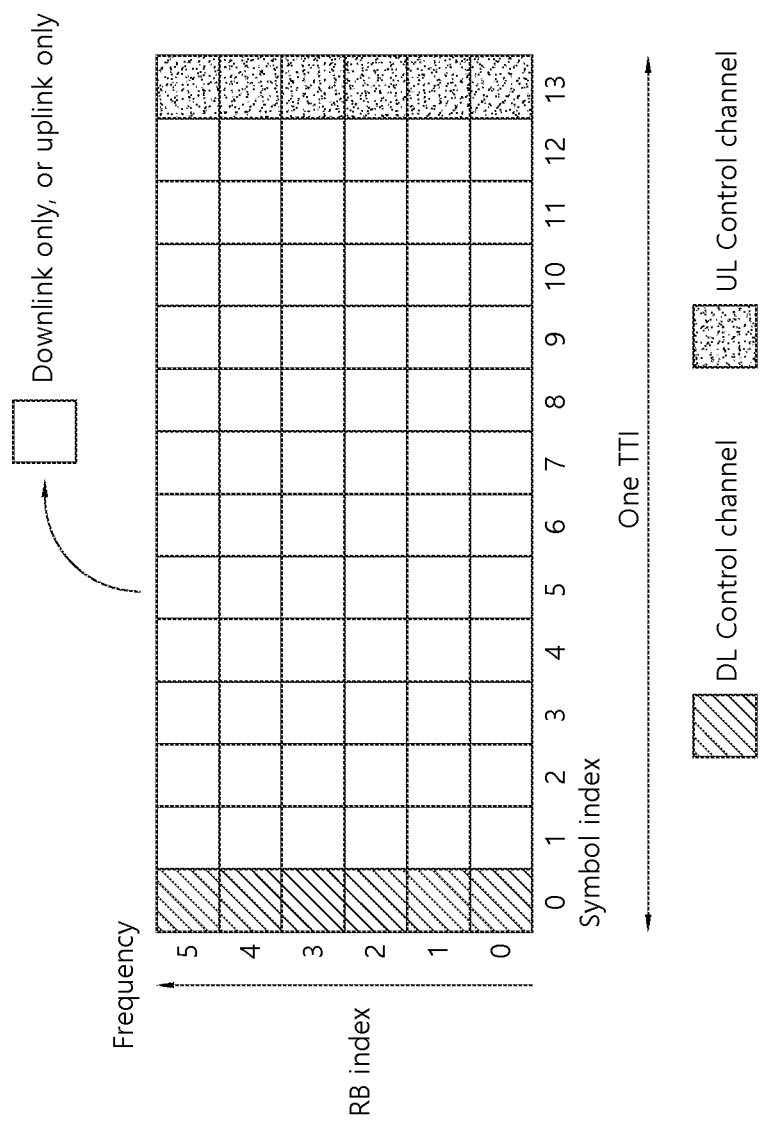
FIG. 6 schematically illustrates an example of a frame structure based on a structure in which a data channel and a control channel are time-division-multiplexed (TDMed).

FIG. 6 schematically illustrates an example of a frame structure based on a structure in which a data channel and a control channel are time-division-multiplexed (TDMed).

Referring to FIG. 6, as an example of a frame structure, a single subframe (here, a subframe can be used interchangeably with a transmission time interval (TTI) can be represented on the basis of an index of a resource block (RB) and an index of a symbol. Here, a single TTI may include a region related to a downlink control channel, a region related to an uplink control channel, and a downlink or uplink region.

For example, a TTI structure is described on the basis of FIG. 6. A shaded region represents a downlink control region and a black region represents an uplink control region. A blank region may be used for downlink data transmission or uplink data transmission. This structure is characterized in that downlink (DL) transmission and uplink (UL) transmission are sequentially performed in a single subframe so that DL data can be transmitted and UL ACK/NACK (Acknowledged/Not Acknowledged) can be received in the subframe. Consequently, a time taken to retransmit data when a data transmission error is generated is reduced, and thus final data delivery latency can be minimized.

In this data and control TDMed subframe structure, a time gap for switching from a transmission mode to a reception mode or switching from the reception mode to the transmission mode between a base station and a UE is required. To this end, some OFDM symbols at a time when DL switches to UL in a subframe structure is set to a guard period (GP).

<Analog Beamforming>

In mmW, wavelengths decrease and thus a plurality of antennas can be installed in the same area. That is, the wavelength in 30 GHz is 1 cm and a total of 100 antenna elements can be installed in a 2-dimensional arrangement on a panel in 5×5 cm at intervals of 0.5λ (wavelength). Accordingly, coverage is increased or throughput is improved by increasing a beamforming (BF) gain using a plurality of antenna elements in mmW.

In this case, if a TXRU (transceiver unit) is provided for each antenna element such that transmission power and phase can be controlled, beamforming independent for each frequency resource is possible. However, installation of TXRUs for all of 100 antenna elements is inefficient in terms of price. Accordingly, a method of mapping a plurality of antenna elements to one TXRU and controlling a beam direction using an analog phase shifter is considered. Such an analog beamforming method cannot provide frequency selective beaming because only one beam direction can be generated in the entire band.

As an intermediate form of digital BF and analog BF, a hybrid BF having B TXRUs fewer than Q antenna elements can be considered. In this case, the number of directions of beams that can be simultaneously transmitted is limited to B or less although it depends on a method of connecting B TXRUs and Q antenna elements.

<Analog Beamforming—2>

When multiple antennas are used in the NR system, hybrid beamforming that is a combination of digital beamforming and analog beamforming is proposed. Here, analog beamforming (or RF beamforming) means an operation of performing precoding (or combining) in an RF stage.

In the aforementioned hybrid beamforming, a baseband stage and an RF stage perform precoding (or combining), and thus it is possible to achieve performance close to digital beamforming while reducing the number of RF chains and the number of D/A (or A/D) converters.

For convenience, the aforementioned hybrid beamforming structure can be represented by N transceiver units (TXRUs) and M physical antennas. Then, digital beamforming for L data layers to be transmitted by a transmitting stage can be represented by an N×L matrix, and N converted digital signals are converted into analog signals through TXRU and then analog beamforming represented by an M×N matrix is applied thereto.

For convenience of understanding, the hybrid beamforming structure is schematically illustrated below in terms of TXRUs and physical antennas.

Figure 7:
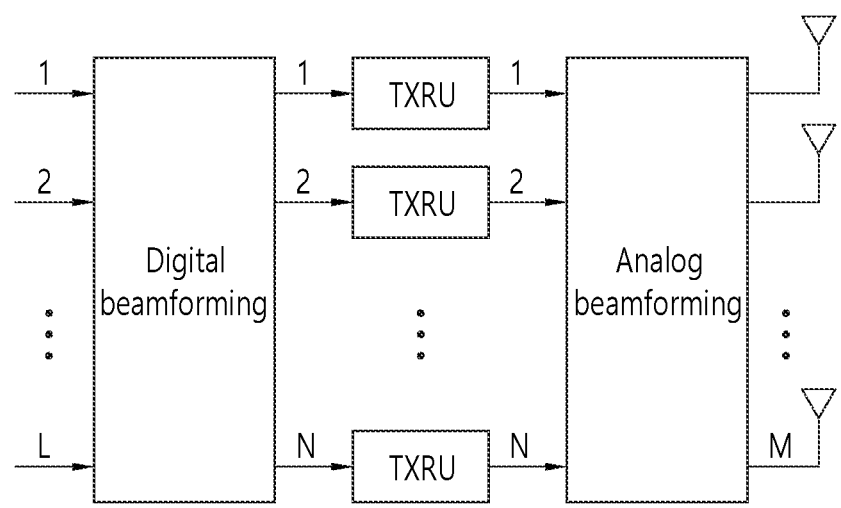
FIG. 7 schematically illustrates the hybrid beamforming structure in terms of TXRUs and physical antennas.

FIG. 7 schematically illustrates the hybrid beamforming structure in terms of TXRUs and physical antennas.

According to the example of FIG. 7, the number of digital beams is L and the number of analog beams is N. Furthermore, the NR system considers support of more efficient beamforming for UEs located in a specific area by designing analog beamforming such that a base station can change analog beamforming in units of symbol.

Moreover, the NR system also considers introduction of a plurality of antenna panels to which independent hybrid beamforming is applicable when N specific TXRUs and N RF antennas are defined as a single antenna panel in the example of FIG. 7.

When a base station uses a plurality of analog beams as described above, an analog beam suitable for signal reception may be different for UEs, and thus a beam sweeping operation through which a plurality of analog beams to be applied by a base station are changed for respective symbols in a specific subframe (SF) for at least a synchronization signal, system information, and paging such that all UEs can have reception opportunities is considered.

Hereinafter, the beam sweeping operation for the synchronization signal and system information in a downlink transmission process will be described in more detail with reference to the drawing.

Figure 8:
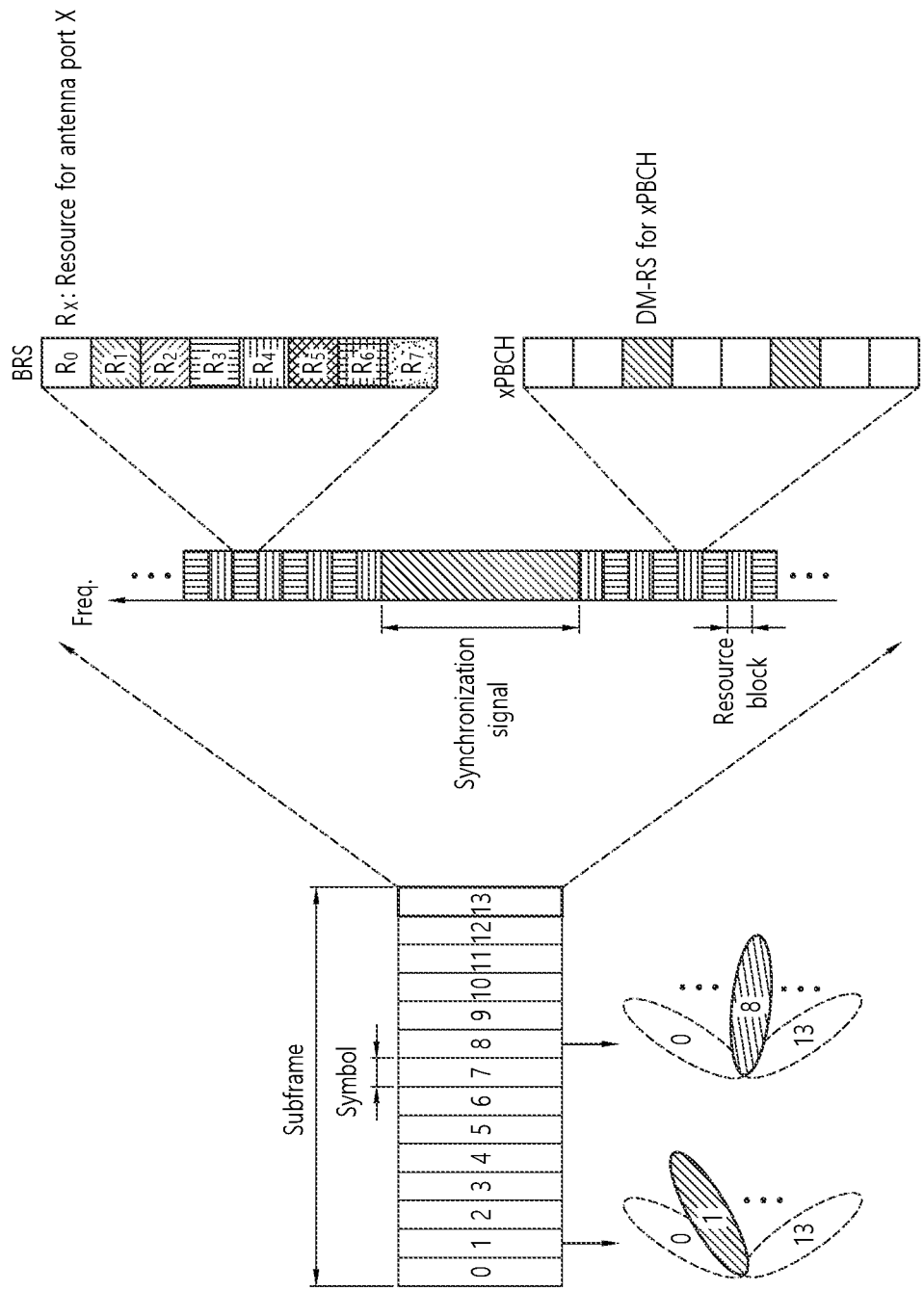
FIG. 8 schematically illustrates an example of the beam sweeping operation for the synchronization signal and system information in a downlink transmission process.

FIG. 8 schematically illustrates an example of the beam sweeping operation for the synchronization signal and system information in a downlink transmission process.

Referring to FIG. 8, physical resources (or a physical channel) through which system information of the NR system is transmitted in a broadcasting manner may be referred to as a physical broadcast channel (xPBCH).

Analog beams belonging to different antenna panels can be simultaneously transmitted in one symbol, and a beam reference signal (BRS) that is transmitted with a single analog beam (corresponding to a specific antenna panel) applied thereto in order to measure a channel per analog beam may be introduced.

The BRS can be defined for a plurality of antenna ports and each antenna port of the BRS can correspond to a single analog beam. Here, unlike the BRS, the synchronization signal or xPBCH can be transmitted with all analog beams in an analog beam group applied thereto such that an arbitrary UE can correctly receive the same.

<Bandwidth Part (BWP)>

In the NR system, a maximum of 400 MHz can be supported per component carrier (CC). If a UE operating in such wideband CCs operates with RF for all CCs turned on all the time, UE battery consumption may increase. Otherwise, when various use cases (e.g., eMBB, URLLC, mMTC, etc.) operating in a single wideband CC are considered, different numerologies (e.g., subcarrier spacings) may be supported for respective frequency bands in the corresponding CC. Otherwise, capability for a maximum bandwidth may be different for UEs.

In consideration of this, a base station can instruct a UE to operate only in a part of a bandwidth instead of the entire bandwidth, and the corresponding part of the bandwidth is defined as a bandwidth part (BWP). A BWP may be composed of resource blocks (RBs) consecutive in the frequency domain and can correspond to one numerology (e.g., a subcarrier spacing, a CP length, and a slot/mini-slot duration).

Meanwhile, a base station can configure a plurality of BWPs even in one CC configured for a UE. For example, a BWP that occupies a relatively small frequency domain may be configured in a PDCCH monitoring slot, and a PDSCH indicated by a PDCCH may be scheduled on a BWP greater than the BWP. Alternatively, when UEs are concentrated on a specific BWP, some UEs may be set to another BWP for load balancing.

Alternatively, some spectra at the center of a bandwidth may be excluded and BWPs on both sides of the bandwidth may be configured in the same slot in consideration of frequency domain inter-cell interference cancellation between neighbor cells.

That is, a base station may configure at least one DL/UL BWP for a UE associated with a wideband CC and activate at least one of configured DL/UL BWPs at a specific time (through L1 signaling or MAC CE or RRC signaling), and switching to another configured DL/UL BWP may be indicated (through L1 signaling or MAC CE or RRC signaling) or switching to a configured DL/UL BWP may be performed when a timer value expires on the basis of a timer.

Here, an activated DL/UL BWP is defined as an active DL/UL BWP. However, when a UE is in an initial access procedure or in a situation before RRC connection is set up, the UE may not receive a configuration with respect to a DL/UL BWP. A DL/UL BWP assumed by the UE in such a situation is defined as an initial active DL/UL BWP.

<Initial Access>

In order to perform the description described above (and below)/proposed procedure and/or methods, a UE may perform a network access procedure. For example, while a UE accesses a network (e.g., a BS), the UE may receive system information and configuration information required to perform the description described above (and below)/proposed procedure and/or methods and store the system information and the configuration information in a memory. The configuration information required in the present disclosure may be received through a higher layer (e.g., RRC layer, Medium Access Control (MAC) layer, etc.) signaling.

Figure 9:
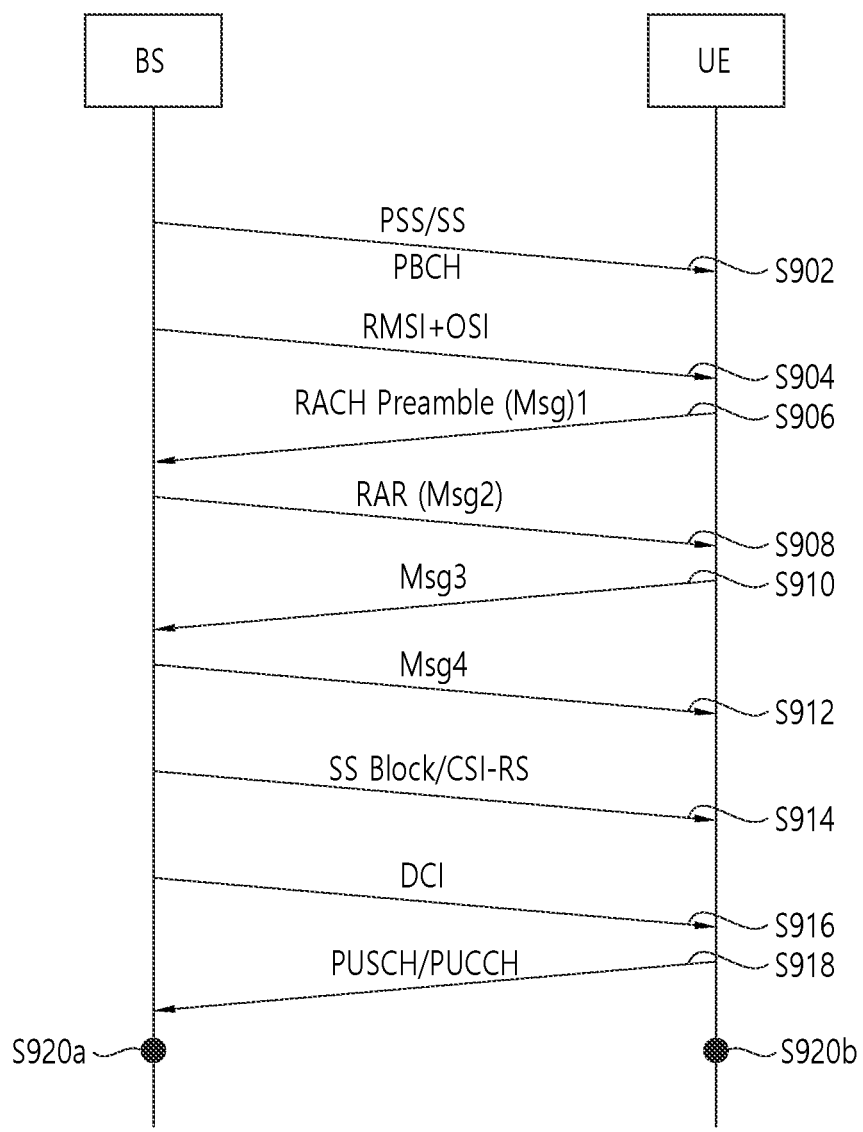
FIG. 9 illustrates a network initial access and the later communication procedure.

FIG. 9 illustrates a network initial access and the later communication procedure.

In NR, a physical channel and a reference signal may be transmitted by using beam-forming. In the case that a signal transmission based on beam-forming is supported, a beam management procedure may be accompanied to arrange a beam between a BS and a UE. In addition, the signal proposed in the present disclosure may be transmitted/received by using beam-forming. In a Radio Resource Control (RRC) IDLE mode, a beam arrangement may be performed based on an SSB. On the other hand, in an RRC CONNECTED mode, a beam arrangement may be performed based on a CSI-RS (in DL) and an SRS (in UL). Meanwhile, in the case that a signal transmission based on beam-forming is not supported, in the following description, an operation related to a beam may be omitted.

Referring to FIG. 9, a base station (e.g., BS) may transmit an SSB periodically (step, S902). Here, the SSB includes PSS/SSS/PBCH. The SSB may be transmitted by using a beam sweeping.

Thereafter, the BS may transmit Remaining Minimum System Information (RMSI) and Other System Information (OSI) (step, S904). The RMSI may include information (e.g., PRACH configuration information) required for a UE to initially access the BS. Meanwhile, the UE performs an SSB detection, and then, identifies the best SSB.

Later, the UE may transmit a RACH preamble (Message 1; Msg 1) to the BS by using a PRACH resource linked/corresponding to an index (e.g., beam) of the best SSB (step, S906). A beam direction of the RACH preamble is associated with the PRACH resource. The association between the PRACH resource (and/or RACH preamble) and the SSB (index) may be configured through system information (e.g., RMSI).

Thereafter, as a way of the RACH procedure, the BS may transmit a Random Access Response (RAR) (Msg2) in response to the RACH preamble (step, S908), and the UE may transmit Msg3 (e.g., RRC Connection Request) by using a UL grant in the RAR (step, S910). Then, the BS may transmit a contention resolution message (Msg4) (step, S912). Msg4 may include an RRC Connection Setup.

When an RRC connection is established between the BS and the UE through the RACH procedure, a subsequent beam arrangement may be performed based on an SSB/CSI-RS (in DL) and an SRS (in UL). For example, the UE may receive an SSB/CSI-RS (step, S914). The SSB/CSI-RS may be used for the UE to generate a beam/CSI reporting.

Meanwhile, the BS may request a beam/CSI reporting to the UE through DCI (step, S916). In this case, the UE may generate a beam/CSI reporting based on the SSB/CSI-RS and transmit the generated beam/CSI reporting to the BS through PUSCH/PUCCH (step, S918). As a result of a beam measurement, the beam/CSI reporting may include information for a preferred beam.

The BS and the UE may switch a beam based on the beam/CSI reporting (steps, S920a and S920b).

Later, the BS and the UE may perform the description described above (and below)/proposed procedure and/or methods. For example, based on the configuration information obtained in the network access procedure (e.g., system information acquisition procedure, RRC connection procedure through RACH, etc.), the BS and the UE may transmit a radio signal by processing information stored in a memory according to the proposal of the present disclosure or may process the received radio signal and store the radio signal in a memory. Here, the radio signal may include at least one of a PDCCH, a PDSCH, and an RS (Reference Signal) for DL and include at least one of a PUCCH, a PUSCH, and an SRS for UL.

Figure 10:
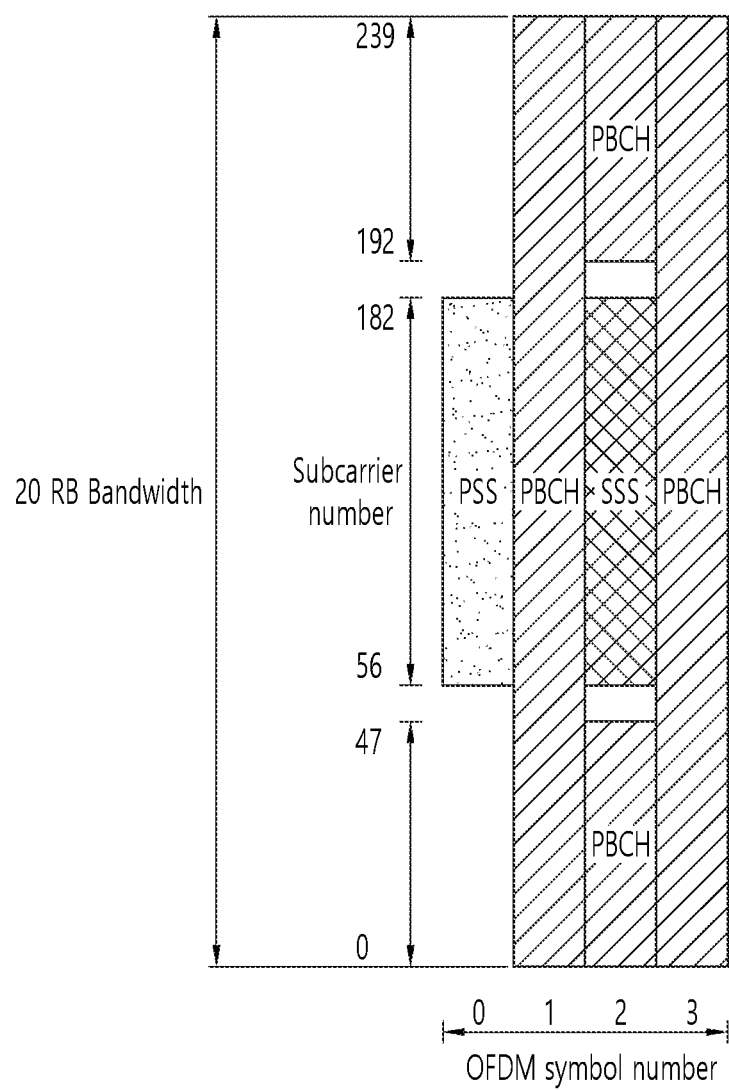
FIG. 10 illustrates an example of a synchronization channel to which the technical feature of the present disclosure may be applied.

FIG. 10 illustrates an example of a synchronization channel to which the technical feature of the present disclosure may be applied.

Referring to FIG. 10, a PSS and an SSS may include a single symbol and 127 subcarriers. A PBCH may include 3 symbols and 240 subcarriers.

A PSS is used to acquire synchronization signal (SS)/PBCH block symbol timing. A PSS indicates three types of hypotheses for a cell ID identification. An SSS is used to identify a cell ID. An SSS indicates 336 hypotheses. Consequently, 1008 physical layer cell IDs may be configured by a PSS and an SSS.

The SS/PBCH block may be repeatedly transmitted according to a predetermined pattern in a 5 ms window. For example, in the case that L SS/PBCH blocks are transmitted, all of SS/PBCH block #1 to SS/PBCH block #L may include the same information but may be transmitted through beams of different directions. That is, quasi co-located (QCL) relation may not be applied to the SS/PBCH block in a 5 ms window. The beam used to receive the SS/PBCH block may be used for a subsequent operation (e.g., random access operation) between the UE and a network. The SS/PBCH block may be repeated for a specific period. A repetition period may be individually configured according to a numerology.

Referring to FIG. 10, a PBCH has a bandwidth of 20 RBs for the second symbol/the fourth symbol and 8 RBs for the third symbol. A PBCH includes a demodulation reference signal (DM-RS) for decoding the PBCH. A frequency region for a DM-RS is determined according to a cell ID. Different from LTE/LTE-A, since a cell-specific reference signal (CRS) is not defined in NR, a specific DM-RS for decoding a PBCH (i.e., PBCH-DMRS) is defined. The PBCH-DMRS may include information representing an index of SS/PBCH block.

A PBCH performs various functions. For example, a PBCH may perform the function of broadcasting a master information block (MIB). System information (SI) is divided into minimum SI and other SI. The minimum SI may be divided into MIB and system information block type 1 (SIB1). The minimum SI except the MIB may be referred to as remaining minimum SI (RMSI). That is, the RMSI may be referred to as SIB 1.

The MIB includes information required to decode SIB 1. For example, the MIB may include information for a subcarrier spacing applied to SIB1 (and MSG 2/4 used for a random access procedure, other SI), information for a frequency offset between SS/PBCH block and subsequently transmitted RB), information for a bandwidth of PDCCH/SIB, and information for decoding a PDCCH (e.g., information of search space/control resource set (CORESET)/DM-RS, etc. to be described below). The MIB may be repeatedly transmitted, and the same information may be repeatedly transmitted for a time interval of 80 ms. SIB1 may be repeatedly transmitted through a PDSCH. SIB1 includes control information for an initial access of the UE and information for decoding other SIB.

A PDCCH decoding in NR is described. A search space for a PDCCH corresponds to a region for the UE to perform a blind decoding for a PDCCH. In LTE/LTE-A, a search space for a PDCCH is distinguished into a common search space (CSS) and a UE-specific search space (US S). A size of each search space and/or a size of control channel element (CCE) included in a PDCCH are determined according to a PDCCH format.

In NR, a resource element group (REG) and a CCE for a PDCCH are defined. In NR, the concept of CORESET is defined. Particularly, a single REG corresponds to 12 REs, that is, a single RB transmitted through a single OFDM symbol. Each REG includes a DM-RS. A single CCE includes multiple REGs (e.g., 6 REGs). A PDCCH may be transmitted through a resource configured with 1, 2, 4, 8, or 16 CCEs. The number of CCEs may be determined according to an aggregation level. That is, in the case that an aggregation level is 1, 1 CCE may be included in a PDCCH for a specific UE, in the case that an aggregation level is 2, 2 CCEs may be included in a PDCCH for a specific UE, in the case that an aggregation level is 4, 4 CCEs may be included in a PDCCH for a specific UE, in the case that an aggregation level is 8, 8 CCEs may be included in a PDCCH for a specific UE, and in the case that an aggregation level is 16, 16 CCEs may be included in a PDCCH for a specific UE.

A CORESET may be defined in 1/2/3 OFDM symbols and in multiple RBs. In LTE/LTE-A, the number of symbols used for a PDCCH is defined by a physical control format indicator channel (PCFICH). However, the PCFICH is not used in NR. Instead, the number of symbols used in a CORESET may be defined by an RRC message (and/or PBCH/SIB1). In addition, since the frequency bandwidth of a PDCCH is the same as the entire system bandwidth in LTE/LTE-A, there is no signaling for the frequency bandwidth of a PDCCH. In NR, the frequency region of a CORESET may be defined by an RRC message (and/or PBCH/SIB1) in an RB unit.

In NR, a search space of a PDCCH is distinguished into a CSS and a USS. Since a USS may be indicated by an RRC message, in order for a UE to decode a USS, an RRC connection may be required. A USS may include the control information for a PDSCH decoding which is allocated to a UE.

Even in the case that an RRC configuration is not completed, a PDCCH needs to be decoded. Accordingly, a CSS needs to be defined. For example, a CSS may be defined when a PDCCH for decoding a PDSCH that transfers SIB1 is configured or when a PDCCH for receiving MSG 2/4 is configured in a random access procedure. In NR, like in LTE/LTE-A, a PDCCH may be scrambled for a radio network temporary identifier (RNTI) for a specific purpose.

A resource allocation scheme in NR is described. In NR, a bandwidth part (BWP) of a specific number (e.g., up to 4) may be defined. A BWP (or carrier BWP) is a set of consecutive PRBs and may be represented as a consecutive subset of common RBs (CRBs). Each RB in a CRB may be represented by CRB1, CRB2, and so on, starting from CRB0.

Figure 11:
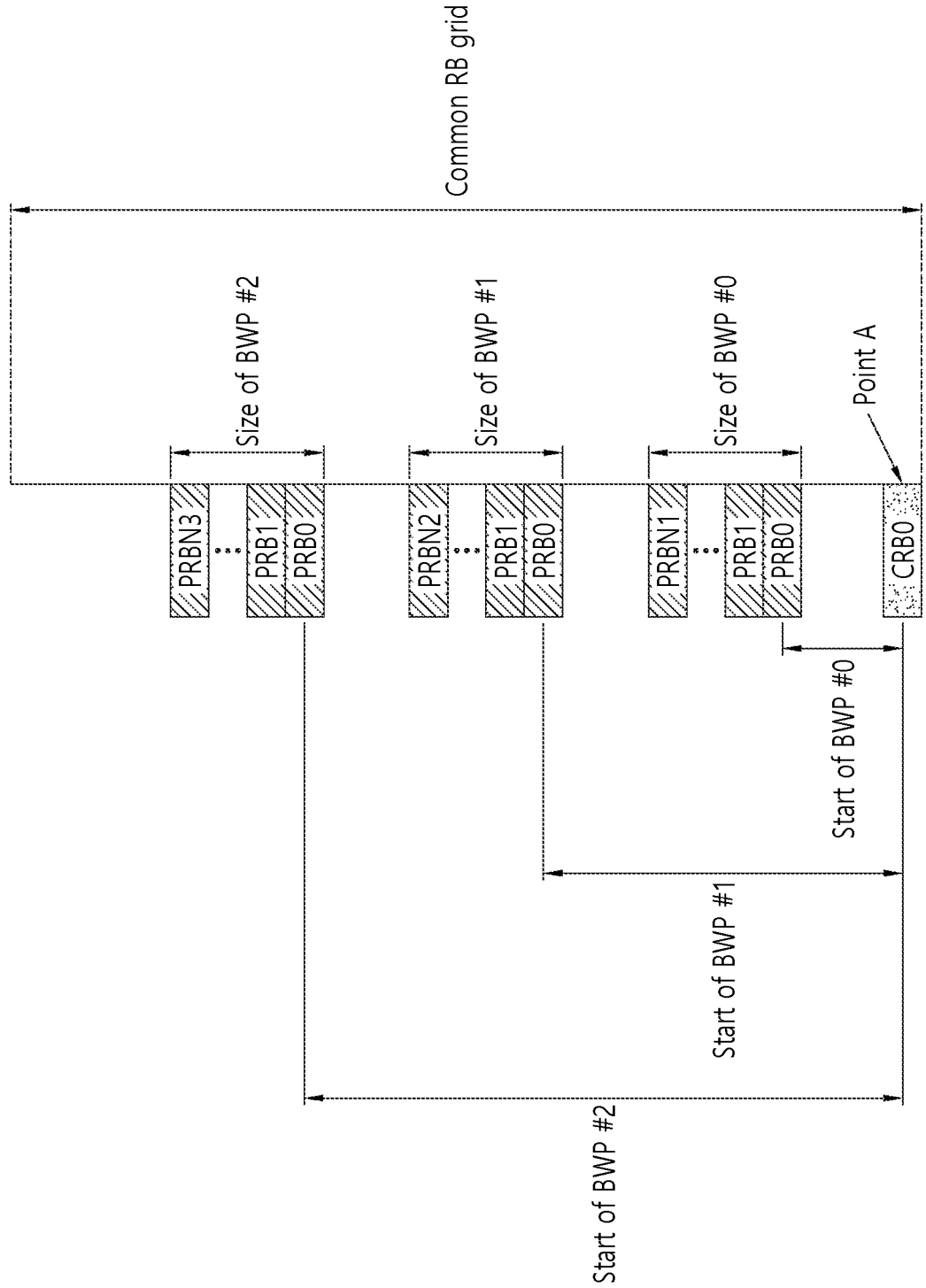
FIG. 11 illustrates an example of a frequency allocation scheme to which the technical feature of the present disclosure may be applied.

FIG. 11 illustrates an example of a frequency allocation scheme to which the technical feature of the present disclosure may be applied.

Referring to FIG. 11, multiple BWPs may be defined in a CRB grid. A reference point (may be referred to as a common reference point, a starting point, etc.) of a CRB grid may be called "point A" in NR. Point A is indicated by RMSI (i.e., SIB1). Particularly, a frequency offset between a frequency band through which SS/PBCH block is transmitted and point A may be indicated through RMSI. Point A corresponds to a center frequency of CRB0. In addition, point A may be a point on which a variable "k" indicating a frequency band of an RE is set to 0 in NR. The multiple BWPs shown in FIG. 11 include a single cell (e.g., primary cell (PCell)). The multiple BWPs may be configured individually or commonly for each cell.

Referring to FIG. 11, each of the BWPs may be defined by a size and a starting point from CRB0. For example, the first BWP, that is, BWP #0 may be defined by a starting point through an offset from CRB0, and the size of BWP #0 may be determined through the size of BWP #0.

A specific number (e.g., up to 4) of BWPs may be configured by a UE. In a specific timing, only a specific number (e.g., 1) of BWPs may be activated in each cell. The number of configurable BWPs or the number of activated BWPs may be configured commonly or individually for UL and DL. The UE may receive a PDSCH, a PDCCH and/or channel state information (CSI) RS only in a DL BWP. Furthermore, the UE may transmit a PUSCH and/or a physical uplink control channel (PUCCH) only in an activated BWP.

Figure 12:
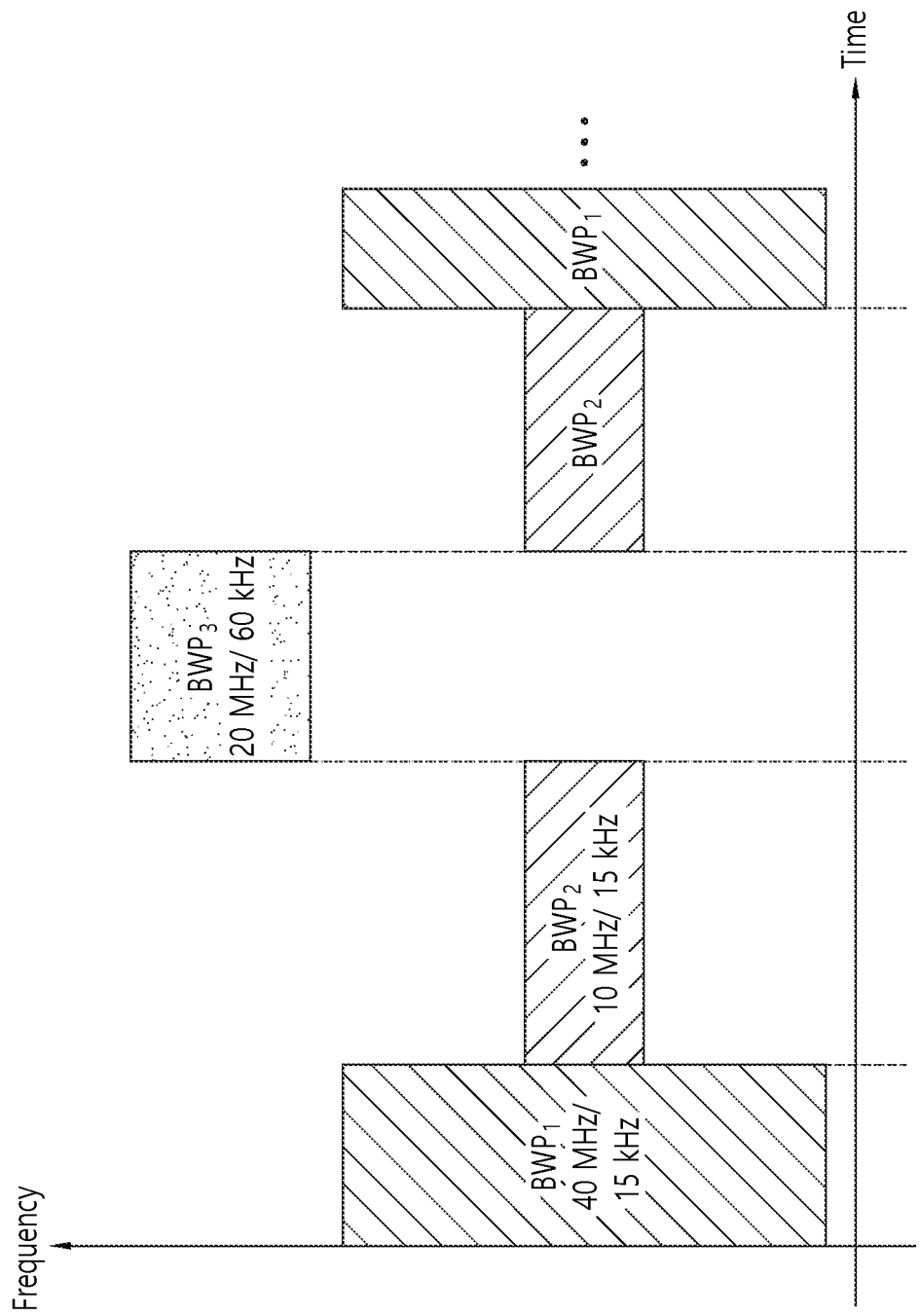
FIG. 12 illustrates an example of multiple BWPs to which the technical feature of the present disclosure may be applied.

FIG. 12 illustrates an example of multiple BWPs to which the technical feature of the present disclosure may be applied.

Referring to FIG. 12, three BWPs may be configured. A first BWP may be located throughout a 40 MHz band and a subcarrier spacing of 15 kHz may be applied. A second BWP may be located throughout a 10 MHz band and a subcarrier spacing of 15 kHz may be applied. A third BWP may be located throughout a 20 MHz band and a subcarrier spacing of 60 kHz may be applied. A UE may configure at least one BWP among three BWPs as an activated BWP and perform UL and/or DL data communication through the activated BWP.

A time resource may be indicated in the scheme that a time difference/offset is indicated based on a transmission timing of a PDCCH that allocates a DL or UL resource. For example, a starting point of PDSCH/PUSCH corresponding to a PDCCH and the number of symbols occupied by PDSCH/PUSCH may be indicated.

The carrier aggregation (CA) is described. Like in LTE/LTE-A, the CA may be supported in NR. That is, consecutive or non-consecutive component carriers (CCs) are aggregated, and a bandwidth is increased, and consequently, a bit rate may be increased. Each of CCs may correspond to a (serving) cell, and each of CCs/cells may be divided into primary serving cell (PSC)/primary CC (PCC) or secondary serving cell (SSC)/secondary CC (SCC).

Hereinafter, the present disclosure will be described.

As more communication devices require larger communication capacity, efficient utilization of a limited frequency band in future wireless communication systems becomes more important.

In cellular communication systems such as LTE/NR systems, methods of using unlicensed bands such as 2.4 GHz mainly used in the legacy Wi-Fi system or unlicensed bands such as 5 GHz and 60 GHz which newly attract attention for traffic offloading are under discussion. Since unlicensed bands basically assume wireless transmission and reception through contention between communication nodes, each communication node needs to check that other communication nodes do not transmit signals by performing channel sensing before signal transmission.

This operation may be called listen before talk (LBT) or a channel access procedure (CAP) for convenience. In particular, an operation of checking whether other communication nodes transmit signals may be called carrier sensing (CS), and when it is checked that other communication nodes do not transmit signals, it can be determined that clear channel assessment has been checked.

eNBs or UEs of LTE/NR systems need to perform LBT for signal transmission in an unlicensed band (referred to as a U-band for convenience), and other communication nodes also need to perform LBT when eNBs or UEs of the LTE/NR systems transmit signals such that interference does not occur.

For example, a CCA threshold is defined as −62 dBm for non-WiFi signals and −82 dBm for WiFi signals in WiFi standard (801.11ac), which may mean that an STA or an AP does not transmit a signal such that interference does not occur when a signal other than WiFi signals is received with power of −62 dBm or more.

In LTE eLAA, two types of channel access procedure for UL data transmission are defined.

LBT type 1 is a mechanism based on random back-off similar to a channel access procedure used for DL data transmission, and LBT type 2 regards a channel as idle when an energy measured through short channel measurement (CCA) of at least 25 us immediately before UL transmission starts is lower than a threshold and can start UL transmission.

ETSI EN 301 893 describes that a UE (or a responding device) can perform UL transmission without CCA if the UE can start UL transmission within 16 us after reception of a UL grant of an eNB (or an initiating device), and a procedure of performing UL transmission without LBT because a gap between DL and UL is less than 16 us will be referred to as LBT type 3 or no LBT in the present disclosure.

Channel access schemes with respect to NR based access for an unlicensed spectrum may be classified into categories below. Hereinafter, LBT types and categories may be described in a combined manner for convenience of description.

Category 1 (hereinafter, CAT 1): Immediate transmission after a short switching gap. Here, category 1 may refer to LBT type 3.

Category 2 (hereinafter, CAT 2): LBT without random back-off. Here, category 2 may refer to LBT type 2.

Category 3 (hereinafter, CAT 3): LBT with random back-off with a contention window of fixed size.

Category 4 (hereinafter, CAT 4): LBT with random back-off with a contention window of variable size. Here, category 4 may refer to LBT type 1.

Transmission of uplink data such as a PUSCH is indicated by DCI (i.e., a UL grant) transmitted through a PDCCH, and this DCI includes an LBT type to be used by a UE when the UE performs a channel access procedure and information about a PUSCH starting position.

Specifically, a 1-bit field in the DCI indicates whether an LBT type to be used for a channel access procedure is type 1 or type 2, and another 2-bit field indicates one of four available PUSCH starting positions {symbol 0, symbol 0+25p, symbol 0+25 µs+timing advance (TA), symbol 1}.

In the present disclosure, a position of a PUSCH transmission starting symbol may be flexibly indicated as one of symbols constituting a slot as in NR, and a new UL scheduling indication method when LBT type 3 is introduced as an additional channel access procedure in addition to LBT type 1 and LBT type 2 in an NR unlicensed band (NR-U) and an LBT execution method according to UL slot spacing during multiple UL slot scheduling are proposed. In addition, a method of setting a margin in consideration of a processing time of a UE depending on an LBT type is also proposed.

Hereinafter, a method of setting a margin in a processing time depending on an LBT type, a multiple UL slot scheduling method, and a method of indicating an LBT type and a PUSCH starting position during UL scheduling will be described with reference to the drawings.

Here, respective items do not necessarily independently operate. That is, technical features described in the specification may be combined unless they are contrary to each other. Furthermore, technical features described in the specification may separately operate.

Figure 13:
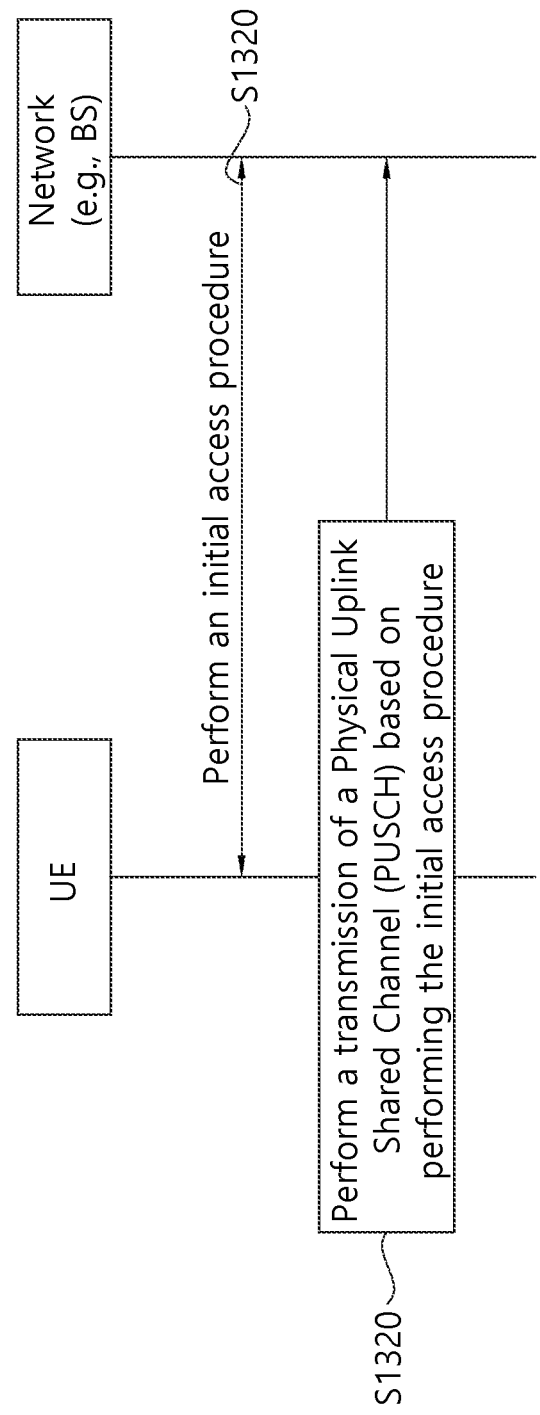
FIG. 13 is a flowchart illustrating a method for performing an initial access procedure according to an embodiment of the present disclosure.

FIG. 13 is a flowchart illustrating a method for performing an initial access procedure according to an embodiment of the present disclosure.

Referring to FIG. 13, a UE performs the initial access procedure with a BS (step, S1310).

Here, the detailed example for the initial access procedure is as described above. However, the content for the initial access procedure described above is just an example of the initial access procedure to which the present disclosure is applicable, and the initial access procedure in an unlicensed band may be different from the initial access procedure described above.

The UE may perform a transmission of a Physical Uplink Shared Channel (PUSCH) based on performing the initial access procedure (step, S1320). In this case, the UE may obtain information for a listen before talk (LBT) type and information for a PUSCH starting position from the BS, and the UE may perform the PUSCH transmission based on the information for an LBT type and the information for a PUSCH starting position. Herein, the information for a PUSCH starting position may be information informing a position among a plurality of PUSCH starting position candidates, and the information for an LBT type may inform one of LBT type 1, LBT type 2, and LBT type 3. The UE may perform an LBT with a random back-off in LBT type 1, and the UE may perform an LBT without a random back-off in LBT type 2, and the UE may not perform an LBT in LBT type 3.

As described below, for example, a DL and a UL may be alternately scheduled in a channel occupancy time (COT) obtained by the UE. More specific examples therefor will be described below for the convenience of description.

As described below, for example, a first DL may be scheduled after a first UL is scheduled within the COT, and a second UL may be scheduled after the first DL is scheduled. And, based on the fact whether a transmission of the first DL is performed, the LBT type may be determined. More specific examples therefor will be described below for the convenience of description.

As described below, for example, in the case that multiple UL and DL transmissions are scheduled within the channel occupancy time (COT), a transmission bandwidth of a UL or a DL which is subsequently transmitted may be restricted based on a size of the transmission bandwidth of a previous UL or a DL. More specific examples therefor will be described below for the convenience of description.

As described below, for example, the first DL, the first UL, and the second DL are scheduled sequentially on a time domain within the COT, and the transmission bandwidth of the first UL may be determined based on a size of the transmission bandwidth of the first DL. More specific examples therefor will be described below for the convenience of description.

As described below, for example, a CP extension may be applied to a gap between the PUSCH starting position and the next symbol boundary based on a subcarrier spacing. More specific examples therefor will be described below for the convenience of description.

As described below, for example, the first UL and the second UL are scheduled for the UE, and the UE may perform the LBT based on the spacing between the first UL and the second UL. More specific examples therefor will be described below for the convenience of description.

As described below, for example, the information for an LBT type and the information for a PUSCH starting position are transmitted through a UL grant, and start and length indicator value (SLIV) information is included in the UL grant. Further, the SLIV information may indicate an index of the starting symbol and the number of symbols included in the PUSCH, and the symbol indicated by the SLIV information may be symbol #K, herein, the K may be a positive integer. More specific examples therefor will be described below for the convenience of description.

As described below, for example, the plurality of PUSCH starting position candidates may be one of a first PUSCH starting position candidate set or a second PUSCH starting position candidate set. The first PUSCH starting position candidate set may include symbol #(K−N)+16 us, symbol #(K−N)+16 us+TA, symbol #(K−N)+25 us, symbol #(K−N)+25 us+TA, and symbol #K, and the second PUSCH starting position candidate set may include symbol #K, symbol #K+16 us, symbol #K+16 us+TA, symbol #K+25 us, and symbol #K+25 us+TA; herein, the N may be a value based on a subcarrier spacing. More specific examples therefor will be described below for the convenience of description.

As described below, for example, based on the relation between the starting symbol index indicated by the SLIV information and a reference symbol index when the PUSCH starting position is indicated, the UE may determine a transport block size (TBS) of the PUSCH. More specific examples therefor will be described below for the convenience of description.

As described below, for example, in the case that the PUSCH starting position is positioned between symbol #(K−N) and symbol #K, the reference symbol index may be symbol #(K−N), and in the case that the PUSCH starting position is positioned between symbol #K and symbol #(K+N), the reference symbol index may be symbol #K. More specific examples therefor will be described below for the convenience of description.

As described below, for example, the UE may implement at least one Advanced Driver Assistance System (ADAS) function based on a signal for controlling a motion of the UE, and/or the UE may receive a user input and switch a driving mode of the UE from an autonomous driving mode to a manual driving mode or switch a driving mode of the UE from a manual driving mode to an autonomous driving mode. More specific examples therefor will be described below for the convenience of description.

As described below, for example, the UE may drive autonomously based on external object information, and the external object information may include at least one of information on an existence of the object, position information of the object, distance information between the UE and the object, and relative velocity information between the UE and the object. More specific examples therefor will be described below for the convenience of description.

Hereinafter, the example of FIG. 13 is described in more detail.

<Method of Setting Margin in Processing Time Depending on LBT Type>

1. First Method:

A method of setting a margin in a processing time of a UE depending on an LBT type when an eNB instructs the UE to transmit a PUCCH or a PUSCH may be provided.

The UE instructed by the eNB to transmit a PUCCH or a PUSCH may need a processing time for UL transmission after the corresponding UL scheduling.

In the case of a PUCCH, for example, the UE needs to generate HARQ-ACK that is a decoding result for received DL data and transmit the PUCCH, and a time required for this may be regarded as a processing time.

However, in an unlicensed band, the UE can start transmission only when the UE has successfully performed BLT before UL transmission according to the size of a gap between DL and UL.

Since LBT is not performed when a gap between DL and UL transmission such as PUCCH or PUSCH transmission is 16 us or less, the eNB can perform UL scheduling on the basis of corresponding information depending on processing capability of the UE reported by the UE when the UE initially accesses the eNB.

However, when the gap exceeds 16 μs, LBT must be performed before UL transmission and thus a time taken to perform LBT may be additionally required in addition to processing time capability of the UE.

Accordingly, when the eNB indicates UL transmission such as PUCCH or PUSCH transmission with a gap of 16 μs or more (or when an LBT type other than LBT type 3 is indicated for UL transmission), a margin required to perform LBT may be added to the processing time capability of the UE.

A margin value may be set to 25 μs or max (one symbol duration, 25 μs) when an LBT type is one-shot LBT.

For example, a minimum value of a gap that can be accomplished by the UE for a gap between a time at which the last symbol of a PDSCH is received and a time at which the first symbol of a PUCCH is transmitted may be defined as a processing time capability of the UE for PUCCH transmission, and if the corresponding value is N1 symbol, PUCCH transmission can be indicated on the assumption that N1 symbol spacing is a processing time capability of the UE for PUCCH transmission as in the conventional method with respect to a PUCCH for which LBT type 3 is indicated.

If the corresponding value is N1 symbol, PUCCH transmission can be indicated on the assumption that N1 symbol+25 μs (or max(one symbol duration, 25 μs)) spacing is a processing time capability of the UE for PUCCH transmission with respect to a PUCCH for which LBT type 2 is indicated.

When an LBT type is LBT based on random back-off, the margin value may be determined in consideration of an LBT execution time. Typically, the margin value may be set differently for priority classes of data to be transmitted.

TABLE 3

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

That is, a margin value suitable for a priority class of data to be transmitted by the UE is required because a time required to perform LBT is different for priority classes defined in Table 3.

Here, a larger margin value can be set for a larger priority class value. For example, when data of a PUSCH to be transmitted has a priority class of 1 (i.e., p=1), a minimum of 16+2×9 μs may be needed. Further, a margin value may be set in consideration of allowed CW values in the corresponding priority class.

The LBT operation may be performed in parallel with an operation of processing a PUCCH and/or a PUSCH. In this case, a processing time margin in consideration of the LBT operation may not be considered. Accordingly, the corresponding method can be applied according to whether the LBT operation and the operation of processing a PUCCH and/or a PUSCH can be performed in parallel (e.g., UE capability), that is, only when the parallel operation cannot be performed.

Meanwhile, the present disclosure is not limited to direct communication between UEs and may be used for uplink or downlink. Here, eNBs or relay nodes can use the above-proposed method.

The above-described examples of the proposed method may be included as one of methods implemented by the present disclosure and thus can be regarded as proposed methods. In addition, although the above-described proposed methods may be independently implemented, some of the proposed methods may be combined (or aggregated). A rule may be defined such that information about whether the proposed methods are applied (or information about rules of the proposed methods) is signaled by an eNB to a UE or signaled by a transmitting UE to a receiving UE through a predefined signal (e.g., a physical layer signal or a higher layer signal).

<Multiple UL Slot Scheduling Method>

Meanwhile, the eNB may schedule multiple UL slots for the UE and the UE may perform LBT on the basis of a spacing between the multiple UL slots.

Hereinafter, specific examples will be described.

1. First Method

An LBT execution method in response to a spacing between UL slots when an eNB schedules multiple UL slots for a UE may be provided.

Figure 14:
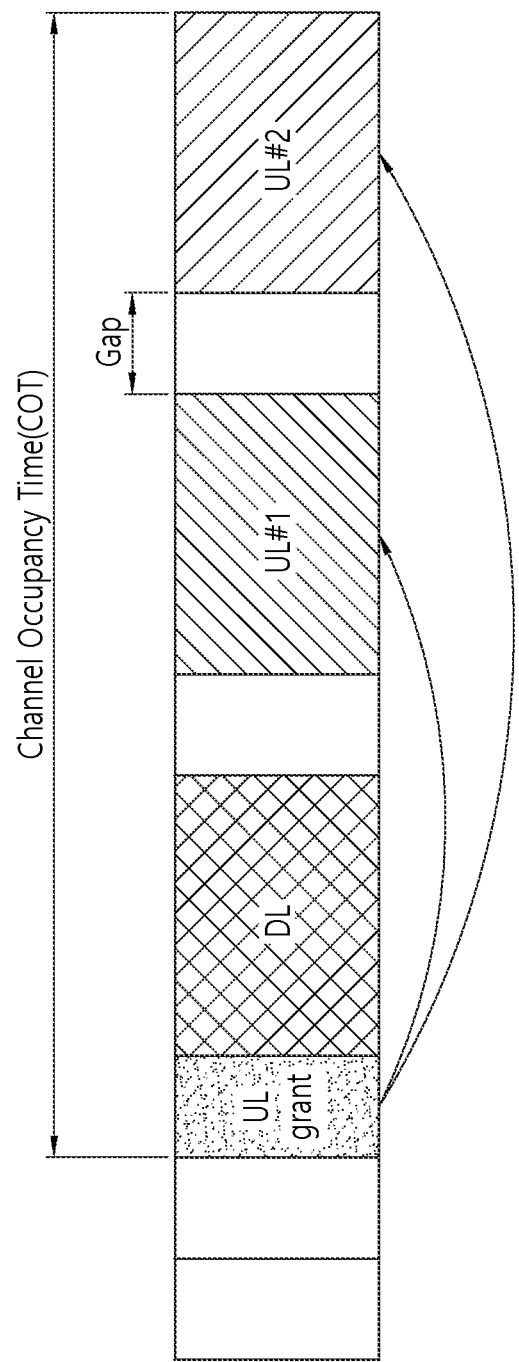
FIG. 14 schematically illustrates an example of UL #1 and UL #2 scheduled as consecutive UL bursts having a time-domain gap within a COT.

FIG. 14 schematically illustrates an example of UL #1 and UL #2 scheduled as consecutive UL bursts having a time-domain gap within a COT.

The first UL scheduling UL #1 is indicated as one-shot LBT (i.e., LBT type 2) and the second UL scheduling UL #2 is indicated as no LBT (i.e., LBT type 3) in a UL grant, and thus the following methods may be provided when UL #1 and UL #2 are consecutive UL bursts having a time-domain gap therebetween as illustrated in FIG. 14.

(1) When UL #1 and UL #2 are Scheduled for the Same UE,

When UL #1 and UL #2 are scheduled for the same UE, whether the UE has successfully performed LBT of UL #1 can be ascertained. Accordingly, the following methods may be provided.

1) A method of automatically dropping UL #2 when LBT of UL #1 has failed may be provided.

2) A method of attempting LBT type 2 for UL #2 even when LBT type 3 is indicated for UL #2 when LBT of UL #1 has failed may be provided.

3) A method of transmitting UL #2 without LBT when LBT of UL #1 has failed may be provided.

4) A method of performing LBT type 2 for UL #2 if LBT of UL #1 has failed when LBT type 2 is indicated for UL #1 may be provided.

5) A method of applying LBT type 3 only to UL scheduling immediately after DL may be provided.

6) A method of indicating an LBT type as follows through DCI for scheduling UL #n (n=1 or 2) transmission may be provided.

A. Unconditional LBT type 3
 B. Conditional LBT type 3

Here, when unconditional LBT type 3 of A is indicated, the UE may unconditionally perform UL #n transmission as indicated. When conditional LBT type 3 of B is indicated, methods of performing UL #n transmission may be provided as follows.

When transmission of another UL #k (e.g., k may be 1 when n=2) is indicated/performed within 16 μs from a time at which transmission of UL #n starts (or when DL transmission or a part thereof, e.g., a DM-RS and a CSI-RS, is received within 16 μs from the time at which transmission of UL #n starts), the UE can perform UL #n transmission on the basis of LBT type 3.

When transmission of another UL #k (e.g., k may be 1 when n=2) is not indicated/performed within 16 μs from a time at which transmission of UL #n starts (or when DL transmission or a part thereof, e.g., a DM-RS and a CSI-RS, is not received within 16 μs from the time at which transmission of UL #n starts), the UE can perform UL #n transmission on the basis of an LBT type defined or set in advance (e.g., LBT type 1).

7) A method of indicating an LBT type as follows through DCI for scheduling UL #n (n=1 or 2) transmission may be provided.

A. Unconditional LBT type 2
 B. Conditional LBT type 2

Here, when unconditional LBT type 2 of A is indicated, the UE may unconditionally perform UL #n transmission on the basis of LBT type 3 as indicated. When conditional LBT type 2 of B is indicated, methods of performing UL #n transmission may be provided as follows.

When transmission of another UL #k (e.g., k may be 1 when n=2) is indicated/performed within T (e.g., 25) μs from a time at which transmission of UL #n starts (or when DL transmission or a part thereof, e.g., a DM-RS and a CSI-RS, is received within T (e.g., 25) μs from the time at which transmission of UL #n starts), the UE can perform UL #n transmission on the basis of LBT type 2.

When transmission of another UL #k (e.g., k may be 1 when n=2) is not indicated/performed within T (e.g., 25) μs from a time at which transmission of UL #n starts (or when DL transmission or a part thereof, e.g., a DM-RS and a CSI-RS, is received within T (e.g., 25) μs from the time at which transmission of UL #n starts), the UE can perform UL #n transmission on the basis of an LBT type defined or set in advance (e.g., LBT type 1).

(2) When UL #1 and UL #2 are Scheduled for Different UEs,

A method by which this scheduling is not allowed may be provided because a UE for which UL #2 is scheduled cannot be aware of whether a UE for which UL #1 is scheduled successfully performs LBT or fails to perform LBT.

2) A method of always indicating the same LBT type when UL #1 and UL #2 are scheduled for different UEs. That is, a method of indicating and scheduling LBT type 2 for UL #2 when LBT type 2 is indicated for UL #1 and indicating and scheduling LBT type 3 for UL #2 when LBT type 3 is indicated for UL #1 may be provided.

However, the methods of (2) are also applicable to a case in which no LBT is indicated for UL #1 and one-shot LBT is indicated for UL #2 when UL #1 and UL #2 are scheduled for different UEs.

Figure 15:
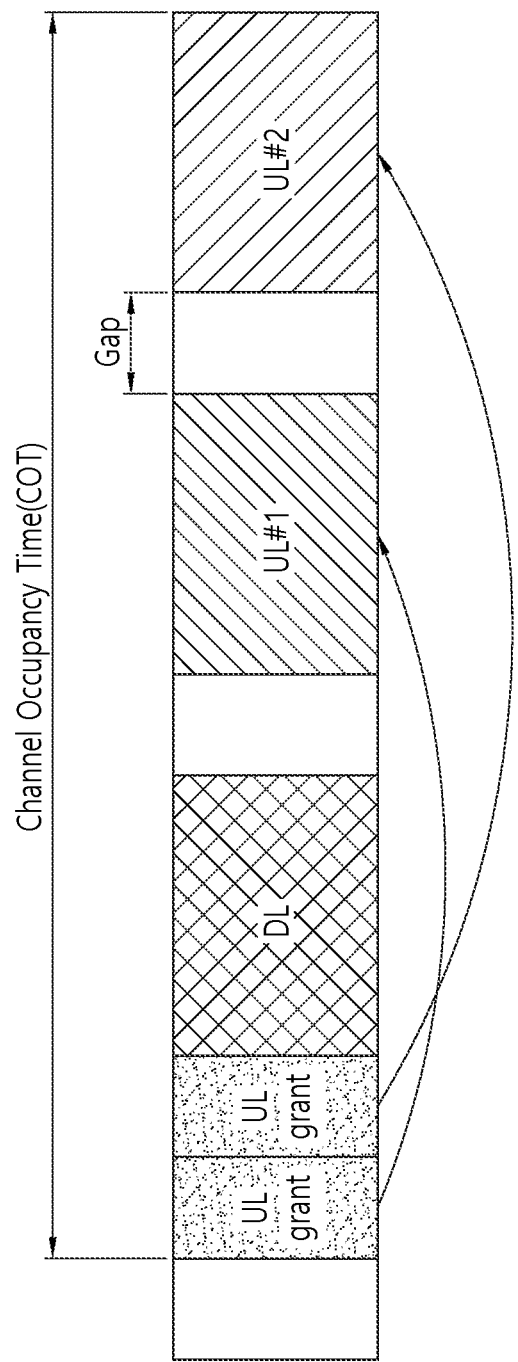
FIG. 15 schematically illustrates an example of UL #1 and UL #2 scheduled as consecutive UL bursts having a time-domain gap within a COT with different grants.

FIG. 15 schematically illustrates an example of UL #1 and UL #2 scheduled as consecutive UL bursts having a time-domain gap within a COT with different grants.

This illustrates a method by which indication of LBT type 3 is applicable only to UL #1 scheduling and LBT type 2 is applied to UL #2 scheduling when UL #1 and UL #2 are scheduled for different UEs in (2).

Here, UL #1 and UL #2 may be a PUCCH or a PUSCH. UL #1 and UL #2 may be UL transmission scheduled for the same UE or UL transmission scheduled for different UEs. Although a case of different UEs is described for convenience, the same method can be applied to a case of the same UE.

For example, when UE A misses or mis-detects DCI for scheduling UL #1 and thus cannot perform UL transmission, UE B for which UL #2 is scheduled cannot ascertain whether UE A misses or mis-detects UL #1 scheduling and thus cannot perform UL #2 transmission without LBT because a gap between DL and UL exceeds 16 μs when there is no UL #1 transmission. If UE B transmits UL #2 through LBT type 3, collision with other UEs may occur.

Accordingly, LBT type 3 is a method applied/indicated for UL scheduling immediately following DL (specifically, when a gap between a last DL transmission time and a scheduled UL or UL transmission starting time is 16 μs or less).

In other words, with respect to UL transmissions (e.g., PUSCH or PUCCH) sharing a COT acquired by the eNB, a scheduling restriction that LBT type 3 cannot be indicated for following UL transmission when the UL transmissions are TDMed and a gap is present between UL transmissions may be applied.

LBT type 3 is an LBT method applicable when a gap between UL #1 and UL #2 of FIG. 14 is 16 μs or less, and when the gap exceeds 16 μs and is equal to or less than 25 μs, LBT type 2 may be applied to transmit UL #2.

In addition, UL #1 and UL #2 TDMed as described above may be scheduled with different grants, as illustrated in FIG. 15, or UL #1 and UL #2 may be scheduled with a single UL grant, as illustrated in FIG. 14. If UL #1 and UL #2 are scheduled with a single UL grant, as illustrated in FIG. 14, LBT type 3 may also be applied to UL #2 because a situation in which scheduling DCI is missed or mis-detected does not occur even when UL #1 and UL #2 are scheduled for different UEs.

2. Second Method

A method through which multiple DL transmissions and UL transmissions are scheduled during multiple DL/UL switching within a COT acquired by an eNB (in a case where LBT type 3 is indicated for all UL transmissions because a gap between transmissions is 16 μs or less or a case in which LBT type 2 is indicated because the gap is equal to or greater than 16 μs and equal to or less than 25 μs), and an LBT type performed immediately before DL transmission is varied according to whether a (scheduled) UE performs UL transmission before the DL transmission of the eNB may be provided.

(1) When the eNB detects that UL transmission scheduled for the UE has been successfully performed (or the UL transmission or a part thereof, e.g., DM-RS, SRS and PRACH, has been successfully received), A. A method through which the eNB performs DL transmission through LBT type 3 when a gap between the scheduled UL transmission and following DL transmission is 16 μs or less may be provided.

B. A method through which the eNB performs DL transmission through LBT type 2 when a gap between the scheduled UL transmission and following DL transmission exceeds 16 μs and is equal to or less than 25 μs.

(2) When the eNB detects that UL transmission scheduled for the UE has not been performed (or the UL transmission or a part thereof, e.g., DM-RS, SRS and PRACH, has not been successfully received), A. A method of performing LBT type 1 or 2 and performing DL transmission because a gap between immediately previous DL or immediately successfully received UL transmission is 16 μs or more in a case where a UE misses or mis-detects UL scheduling so that UL transmission is not performed. For example, LBT type 2 may be performed if the gap is 25 μs or less and LBT type 1 may be performed if the gap exceeds 25 μs.

Here, the aforementioned gap between transmission means a gap between transmissions when DL transmission switches to UL transmission or UL transmission switches to DL transmission.

In addition, the eNB may detect whether UL transmission is performed through detection of a DMRS sequence in a PUSCH or energy detection. In consideration of a time taken for the eNB to sufficiently detect whether UL transmission is performed and prepare the next DL transmission, UL transmission of the UE may be performed using interlace in which a PUSCH BW (or the number of RBs) is X or more, and UL transmission including a DMRS may need to be indicated/configured before a specific Y symbol from an ending slot boundary in the time domain (or immediately before the next DL transmission) (in order for the eNB to secure a gap between UL and DL).

Figure 16:
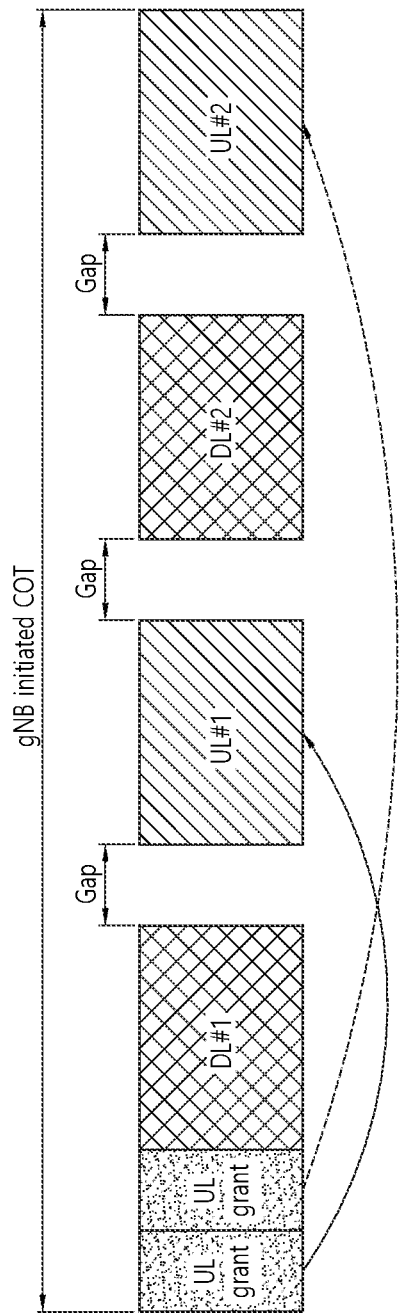
FIG. 16 schematically illustrates an example of multiple DL or UL transmissions during multiple DL/UL switching within a COT acquired by a gNB.

FIG. 16 schematically illustrates an example of multiple DL or UL transmissions during multiple DL/UL switching within a COT acquired by a gNB.

For example, consider a case in which all gaps between transmissions when multiple DL and UL transmissions are performed during multiple DL/UL switching within a COT acquired by a gNB through LBT type 1, that is, gaps when DL switches to UL or UL switches to DL, are 16 μs or less so that all transmissions are performed through LBT type 3.

If a UE misses or mis-detects UL #1 scheduling and UL grant, the gNB cannot perform DL #2 transmission through LBT type 3 because UL #1 transmission is not detected. In this case, the gNB can perform LBT type 1 or LBT type 2 and then transmit DL #2 when LBT type 1 or LBT type 2 has been successfully performed.

3. Third Method

Figure 17:
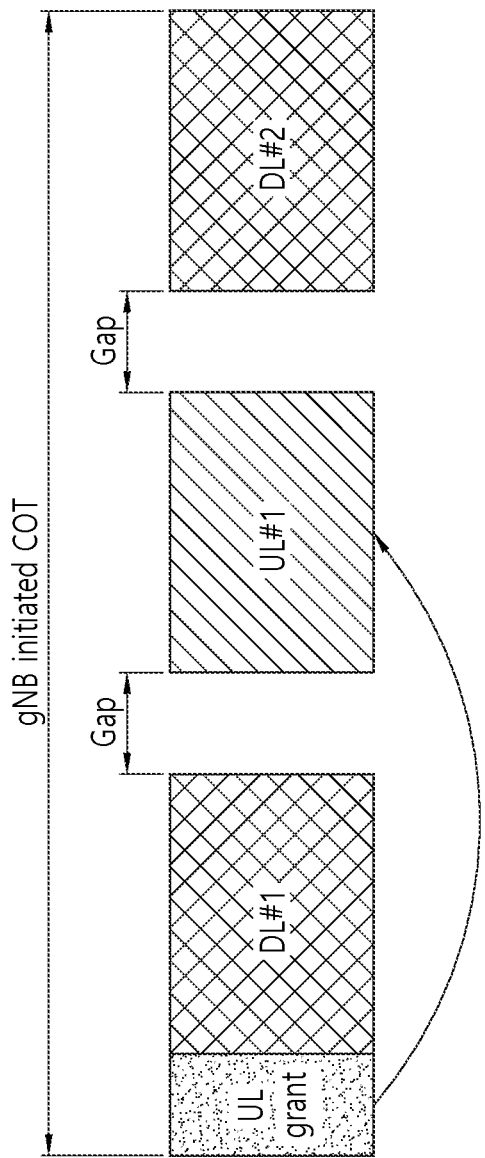
FIG. 17 schematically illustrates an example of transmission during multiple DL/UL switching in a DL #1-UL #1-DL #2 structure within a COT acquired by a gNB.

A method through which a PRACH and a specific UL signal/channel are combined and transmission thereof is configured/indicated in UL #1 and an eNB checks presence or absence of UL #2 transmission and transmit DL #2 when a UL #1 slot is a RACH transmission slot in a DL #1-UL #1-DL #2 structure and all gaps between transmissions are 16 μs or less so that no LBT is scheduled for DL #2 after UL #1 transmission or the gaps are equal to or greater than 16 μs and equal to or less than 25 μs so that LBT type 2 is scheduled FIG. 17 schematically illustrates an example of transmission during multiple DL/UL switching in a DL #1-UL #1-DL #2 structure within a COT acquired by a gNB.

As illustrated in FIG. 17, if all transmissions are performed as scheduled when LBT type 3 is scheduled for UL #1 and DL #2 having a time gap of 16 μs or less within a gNB-initiated COT in which transmission of a UL grant and DL #1 starts, UL #1 and DL #2 can be consecutively transmitted through LBT type 3 because the gap therebetween is less than 16 μs.

However, when a UE misses or mis-detects UL #1 scheduling, UL #1 is not transmitted and thus the gap between DL #1 and DL #2 increases to be greater than 16 μs. Accordingly, to safely transmit DL #2 through LBT type 3 after UL #1 transmission, the gNB needs to transmit DL #2 in order to determine whether UL #1 has been successfully transmitted.

However, in a case where UL #1 is a RACH transmission slot, a processing time may be insufficient when the gNB transmits DL #2 without LBT immediately after detection of a PRACH sequence.

Accordingly, specific UL signals/channels may be combined into a package and transmission of the packet may be configured/indicated immediately after a PRACH such that the gNB can detect a sequence part in advance to ascertain presence or absence of UL transmission.

For example, transmission of MsgA (PRACH sequence+ Msg3 PUSCH) for 2-step RACH is configured/indicated in a short PUCCH conveying an SR or a CSI report, or an SRS, more typically, the corresponding RACH transmission slot such that the gNB can easily ascertain presence or absence of UL transmission (in order to allow the gNB to successfully perform detection).

Furthermore, to allow the gNB to obtain information about a transport BW with low complexity, different DM-RS sequence resources may be configured in advance for transport BWs such that the gNB can ascertain a transport BW only through DM-RS detection.

Here, the gap between transmissions means a gap between transmissions when DL transmission switches to UL transmission or when UL transmission switches to DL transmission.

In addition, the gNB can detect whether UL transmission is performed through sequence detection or energy detection. In consideration of a time taken for the gNB to sufficiently detect whether UL transmission is performed and prepare the next DL transmission, UL transmission of the UE may be performed using interlace in which a BW (or the number of RBs) is X or more, and UL transmission including a DMRS may need to be indicated/configured before a specific Y symbol from an ending slot boundary in the time domain (or immediately before the next DL transmission) (in order for the eNB to secure a gap between UL and DL).

4. Fourth Method

A method through which multiple DL transmissions and UL transmissions are scheduled during multiple DL/UL switching within a COT acquired by a UE, and an LBT type performed immediately before UL transmission is varied according to whether (scheduled) DL transmission of an eNB is performed before the UL transmission of the UE (in a case where a gap between transmissions is 16 µs or less so that LBT type 3 is scheduled for all DL transmissions or a case where the gap is equal to or greater than 16 µs and equal to or less than 25 µs so that LBT type 2 is scheduled)

In other words, downlink and uplink can be scheduled while switching within the channel occupancy time (COT) acquired by the UE. Here, based on whether downlink transmission of the gNB, scheduled before uplink transmission of the UE, has been performed, the LBT type performed immediately before the uplink transmission may be differently determined. Hereinafter, this will be described with reference to the drawings for convenience of description.

Figure 18:
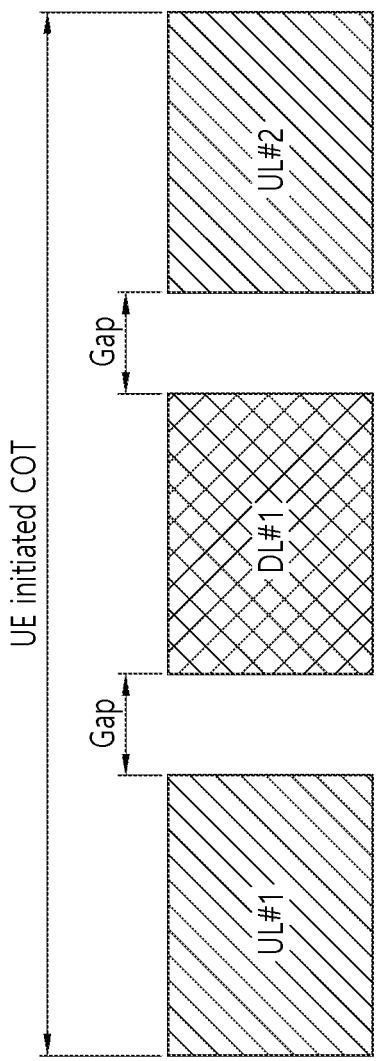
FIG. 18 schematically illustrates an example of transmission during multiple DL/UL switching in a UL #1-DL #1-UL #2 structure within a COT acquired by a UE.

FIG. 18 schematically illustrates an example of transmission during multiple DL/UL switching in a UL #1-DL #1-UL #2 structure within a COT acquired by a UE.

(1) When the UE detects that DL transmission scheduled before UL transmission thereof has been successfully performed (or the DL transmission or a part thereof, e.g., a PDCCH DM-RS, a PDSCH DM-RS, a CSI-RS, and SS/PBCH block, is successfully received)

A. A method through which the UE performs UL transmission through LBT type 3 when a gap between scheduled DL transmission and following UL transmission is 16 µs or less B. A method through which the UE performs UL transmission through LBT type 2 when a gap between scheduled DL transmission and following UL transmission exceeds 16 µs and equal to or less than 25 µs (2) When the UE detects that DL transmission scheduled before UL transmission thereof has not been performed (or the DL transmission or a part thereof, e.g., a PDCCH DM-RS, a PDSCH DM-RS, a CSI-RS, and SS/PBCH block, is not successfully received)

A. A method through which a gNB performs LBT type 1 or 2 and performs DL transmission because a gap between immediately previous ULs or immediately successfully received DL transmissions is 16 µs or more when the gNB cannot receive information about COT sharing from the UE. For example, LBT type 2 can be performed if the gap is 25 µs or less and LBT type 1 can be performed if the gap exceeds 25 µs.

Here, the gap between transmissions means a gap between transmissions when DL transmission switches to UL transmission or UL transmission switches to DL transmission. In addition, the UE can detect whether DL transmission is performed through detection of a DMRS sequence in a PUCCH or a PDSCH or energy detection. In consideration of a time taken for the UE to sufficiently detect whether UL transmission is performed and prepare the next UL transmission, DL transmission of the gNB may be performed using interlace in which a PDSCH BW (or the number of RBs) is X or more, and DL transmission including a DMRS may need to be indicated/configured before a specific Y symbol from an ending slot boundary in the time domain (or immediately before the next UL transmission).

5. Fifth Method

When a BW of a DL/UL BWP configured for a gNB and a UE is 20 MHz or more, and a COT acquired by the gNB (or UE) through LBT is shared with the UE (or gNB) and multiple DL/UL transmissions are scheduled within the COT of the gNB (or UE), a method of limiting a size of a transport BW of following DL or UL within the COT in response to a size of a transport BW of previous DL or UL or not allowing DL transmission following corresponding UL transmission (allowing COT sharing only once when a BW of following transmission is less than a BW of COT initiated transmission when the COT is shared) may be provided.

In other words, when multiple link transmissions are scheduled between the UE and the gNB, a transport bandwidth of a following link may be limited on the basis of a size of a transport bandwidth of a previous link. Here, the links may be uplink or downlink, and the uplink and the downlink may be alternately scheduled between the UE and the gNB.

For example, the gNB (or UE) may share a COT remaining after DL (or UL) transmission in a COT acquired through Cat-4 LBT with the UE (or gNB). Here, a transport BW of a DL/UL signal and channel to be transmitted by the UE (or gNB) sharing the COT may be equal to or less than a transport BW of an immediately previously transmitted DL/UL signal and channel.

Figure 19:
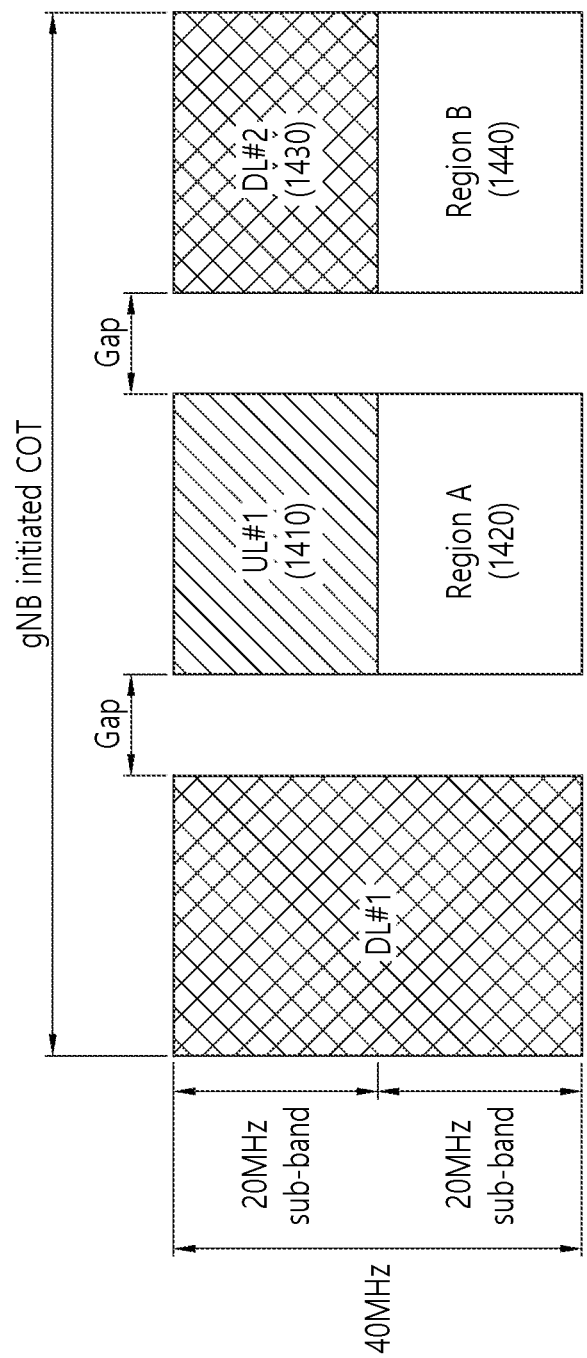
FIG. 19 schematically illustrates an example of transmission during multiple DL/UL switching in a DL #1-UL #1-DL #2 structure within a COT of a gNB.

FIG. 19 schematically illustrates an example of transmission during multiple DL/UL switching in a DL #1-UL #1-DL #2 structure within a COT of a gNB.

For example, the gNB may successfully performs LBT in both of two 20 MHz LBT sub-bands in a BWP having a BW of 40 MHz and share a COT remaining after DL #1 transmission through 40 MHz with a UE, as illustrated in FIG. 19.

When a gap between DL #1 and UL #1 is greater than 16 µs and less than 25 µs, the UE may attempt LBT type 2 in the two LBT sub-bands before UL #1 transmission and perform transmission only through a sub-band in which LBT type 2 has been successfully performed.

This is because, when transmission is performed through 20 MHz in UL #1 1410, another gNB (or another UE) determines that other communication nodes do not transmit signals through LBT in area A 1420 of FIG. 19 and then the other UE can perform DL (or UL) transmission in area B 1440.

Accordingly, when the UE successfully performs LBT only in the upper 20 MHz LBT sub-band and performs UL transmission in a transport BW of 20 MHz, as illustrated in the figure, DL #2 following the UL transmission can be transmitted only in a BW of 20 MHz or less because the transport BW of immediately previously transmitted UL #1 is 20 MHz.

Accordingly, the gNB needs to check presence or absence of UL #1 transmission performed immediately before DL #2 transmission and ascertain a transport BW before DL #2 transmission.

The gNB needs to detect a DM-RS sequence of UL #1 as in the above-described second method or third method or transmit information about the transport BW to check presence or absence of UL #1 and the transport BW and then transmit DL #2. In the case of UL #1-DL #1-UL #2, the UE may check presence or absence of DL #1 transmission and a transport BW through detection of a DMRS in a PDCCH or a PDSCH before UL #2 transmission and then transmit UL #2 as in the fourth method.

To allow the gNB or the UE sharing a COT to rapidly obtain information about a transport BW with low complexity, different DM-RS sequence resources may be configured in advance for transport BWs such that the gNB or the UE can ascertain a transport BW only through DM-RS detection.

<Method of Indicating LBT Type and PUSCH Starting Position During UL Scheduling>

1. First Method

When LBT type 1 is referred to as back-off based LBT, LBT type 2 is referred to as one-shot LBT, and LBT type 3 is referred to as no LBT, a method of indicating an LBT type and a PUSCH starting position in consideration of multiple subcarrier spacings (SCS) may be provided.

An eNB may indicate, to a UE, a time-domain resource of a PUSCH, that is, a starting symbol position and the number of symbols constituting the PUSCH through a start and length indicator value (SLIV) in a UL grant.

For example, the UL grant (e.g., DCI) may include SLIV information, and the SLIV information may indicate a starting symbol index and the number of symbols constituting the PUSCH. Here, the symbol indicated by the SLIV information may be symbol #K and K may be a positive integer.

In addition to the SLIV, the eNB may indicate, to the UE, a PUSCH starting position in consideration of an LBT type to be used in a channel access procedure and an LBT execution time.

When the symbol indicated through SLIV is #K, available PUSCH starting position candidates may be defined as {symbol #(K−N)+16 μs, symbol #(K−N)+16 μs+TA, symbol #(K−N)+25 μs, symbol #(K−N)+25 μs+TA, symbol #K} or {symbol #K, symbol #K+16 μs, symbol #K+16 μs+TA, symbol #K+25 μs, symbol #K+25 μs+TA}. Here, {symbol #(K−N)+16 μs+TA} or {symbol #K+16 μsTA} may be replaced with {symbol #(K−1)+max(16 μs, TA)} or {symbol #K+max(16 μs, TA)}.

In other words, the PUSCH starting position candidates may be symbol #(K−N)+16 μs, symbol #(K−N)+16 μs+TA, symbol #(K−N)+25 μs, symbol #(K−N)+25 μs+TA, or symbol #K, or the PUSCH starting position candidates may be symbol #K, symbol #K+16 μs, symbol #K+16 μs+TA, symbol #K+25 μs, or symbol #K+25 μs+TA and N may be a value based on s subcarrier spacing. Here, information about the PUSCH starting position can indicate any one of the PUSCH starting position candidates.

When DL transmission is performed until a symbol immediately before a PUSCH transmission starting symbol and then TA is present in the first symbol of the next slot (e.g., when UL transmission starts immediately after (16 μs−TA) from DL reception), {symbol #(K−1)+16 μs+TA} or {symbol #K+16 μs+TA} may be excluded from the PUSCH starting position candidates.

Meanwhile, one of four PUSCH starting candidates may be indicated to the UE using 2 bits in a UL grant.

Here, TA may represent timing advance. N may be predefined as a specific value (e.g., N=1), additionally set/indicated through RRC signaling (or through DCI or a combination of RRC and DCI), or scalably set by an eNB for a UE as different values according to numerologies.

For example, N may be 1 in the case of a subcarrier spacing (SCS) of 15 kHz and 2 in the case of an SCS of 30 kHz.

Alternatively, when the SCS is greater than 15 kHz, a starting position passing the next symbol boundary of symbol #K from among {symbol #K+16 μs, symbol #K+25 μs, symbol #K+25 μs+TA} and a starting position passing the previous symbol boundary of symbol #(K−1) from among {symbol #(K−1)+16 μs, symbol #(K−N)+25 μs, symbol #(K−N)+25 μs+TA, symbol #K} may be excluded.

Meanwhile, although LBT type 1 or 2 is indicated in eLAA so that an LBT type can be indicated using 1 bit, a method of increasing an LBT type indication field in the UL grant to 2 bits and indicating one of three LBT types may also be provided in order to indicate LBT types including LBT type 3 to a UE. In this case, a PUSCH starting position may be differently interpreted as follows depending on indicated LBT types.

(1) A method of indicating a PUSCH starting position as one of {symbol #(K−N)+25 μs, symbol #(K−N)+25 μs+TA, symbol #K} or {symbol #K, symbol #K+25 μs, symbol #K+25 μs+TA} when LBT type 1 or 2 is indicated (2) A method of indicating a PUSCH starting position as one of {symbol #(K−N)+16 μs, symbol #(K−N)+16 μs+TA, symbol #K} or {symbol #K, symbol #K+16 μs, symbol #K+16 μs+TA} when LBT type 3 is indicated As another method, a method of indicating LBT type 1 or 2 using a 1-bit LBT type indication field by applying joint coding in order to reduce the size of the LBT type indication field and parsing a case in which a PUSCH starting position is {symbol #(K−N)+16 μs}, {symbol #K+16 μs}, {symbol #(K−N)+16 μs+TA}, or {symbol #K+16 μs+TA} as indication of LBT type 3 is possible.

Furthermore, the following proposed method may also be provided.

2. Second Method

A method of determining a transport block size (TBS) of a PUSCH according to association between a starting symbol index indicated by a start and length indicator value (SLIV) in a UL grant (PUSCH scheduling DCI) and a reference symbol index when a PUSCH starting position considering an LBT type and a subcarrier spacing may be provided.

That is, the UE can determine the TBS of the PUSCH on the basis of association between the starting symbol index indicated by the SLIV information and the reference symbol index when the PUSCH starting position is indicated.

Here, the reference symbol index may be symbol #(K−N) when the PUSCH starting position is between symbol #(K−N) and symbol #K and symbol #K when the PUSCH starting position is between symbol #K and symbol #(K+N).

Here, a reference symbol is determined as symbol #(K−N) when the PUSCH starting position is disposed between symbol #(K−N) and symbol #K and as symbol #K when the PUSCH starting position is disposed between symbol #K and symbol #(K+N).

This is because PUSCH transmission can start in any symbol constituting a slot through an SLIV in NR although the aforementioned situation need not be considered in conventional systems (e.g., LAA) because there are four PUSCH starting positions between Symbol #0 and Symbol #1 and thus a starting position before Symbol #0 is a symbol in a previous subframe passing a subframe boundary.

Here, a TBS may be determined depending on whether the reference symbol is identical to a symbol indicated by SLIV. The TBS can be determined on the basis of Symbol #(K+N) when the symbols are identical and determined on the basis of Symbol #K when the symbols are different. Here, the TBS can be determined on the basis of Symbol #K if the starting position is Symbol #K.

Basically, whether an eNB indicates a starting position between Symbol #(K−N) and Symbol #K or a starting position between Symbol #K and Symbol #(K+N) is not dynamically changed, and an accurate starting position may be indicated through DCI in a state in which starting position candidates are semi-statically determined (The claims of the present disclosure may include dynamic change of whether an eNB indicates a starting position between Symbol #(K−N) and Symbol #K or a starting position between Symbol #K and Symbol #(K+N)).

More specifically, the following examples can be provided.

(1) When a starting symbol index indicated by SLIV is symbol #K which is identical to a reference symbol index when a PUSCH starting position is indicated, the UE can determine a TBS of a PUSCH on the basis of symbol #(K+N).

In other words, when the starting symbol index indicated by SLIV is symbol #K and the reference symbol index is symbol #K (because the PUSCH starting position is between symbol #K and symbol #(K+N)) and thus the starting symbol index and the reference symbol index correspond to each other, the UE can determine the TBS of the PUSCH on the basis of symbol #(K+N).

(2) When a starting symbol index indicated by SLIV is symbol #K and a reference symbol index when a PUSCH starting position is indicated is symbol #(K−N), the UE may determine the TBS of the PUSCH on the basis of symbol #K.

In other words, when the starting symbol index indicated by SLIV is symbol #K and the reference symbol index is symbol #(K−N) (because the PUSCH starting position is between symbol #(K−N) and symbol #K), the UE can determine the TBS of the PUSCH on the basis of symbol #K.

(3) When a starting symbol index indicated by SLIV is symbol #K, a length (transmission duration) is 'L', and the starting symbol index is identical to a reference symbol index when a PUSCH starting position is indicated, the UE may determine the TBS of the PUSCH on the basis of symbol #K and transmit the PUSCH by a length to symbol #(K+L+N) (however, this method may be applicable only when at least one symbol available after symbol #(K+L) is present in a slot).

In other words, when the starting symbol index indicated by SLIV is symbol #K, the length (transmission duration) is L, and the reference symbol index is symbol #K (because the PUSCH starting position is between symbol #K and symbol #(K+N)) and thus the starting symbol index and the reference symbol index correspond to each other, the UE can determine the TBS of the PUSCH on the basis of symbol #(K+N) and transmit the PUSCH by a length to symbol #(K+L+N).

However, the reference symbol index may be symbol #(K−N) or symbol #K when the starting symbol index indicated by SLIV is symbol #K, and this method may be applicable only when at least one symbol available after symbol #K is present in a slot when the reference symbol index is symbol #(K−N).

In addition, N may be predefined as a specific value (e.g., N=1), additionally set/indicated through RRC signaling (or through DCI or a combination of RRC and DCI), or scalably set by an eNB for a UE as different values according to numerologies.

Figure 20:
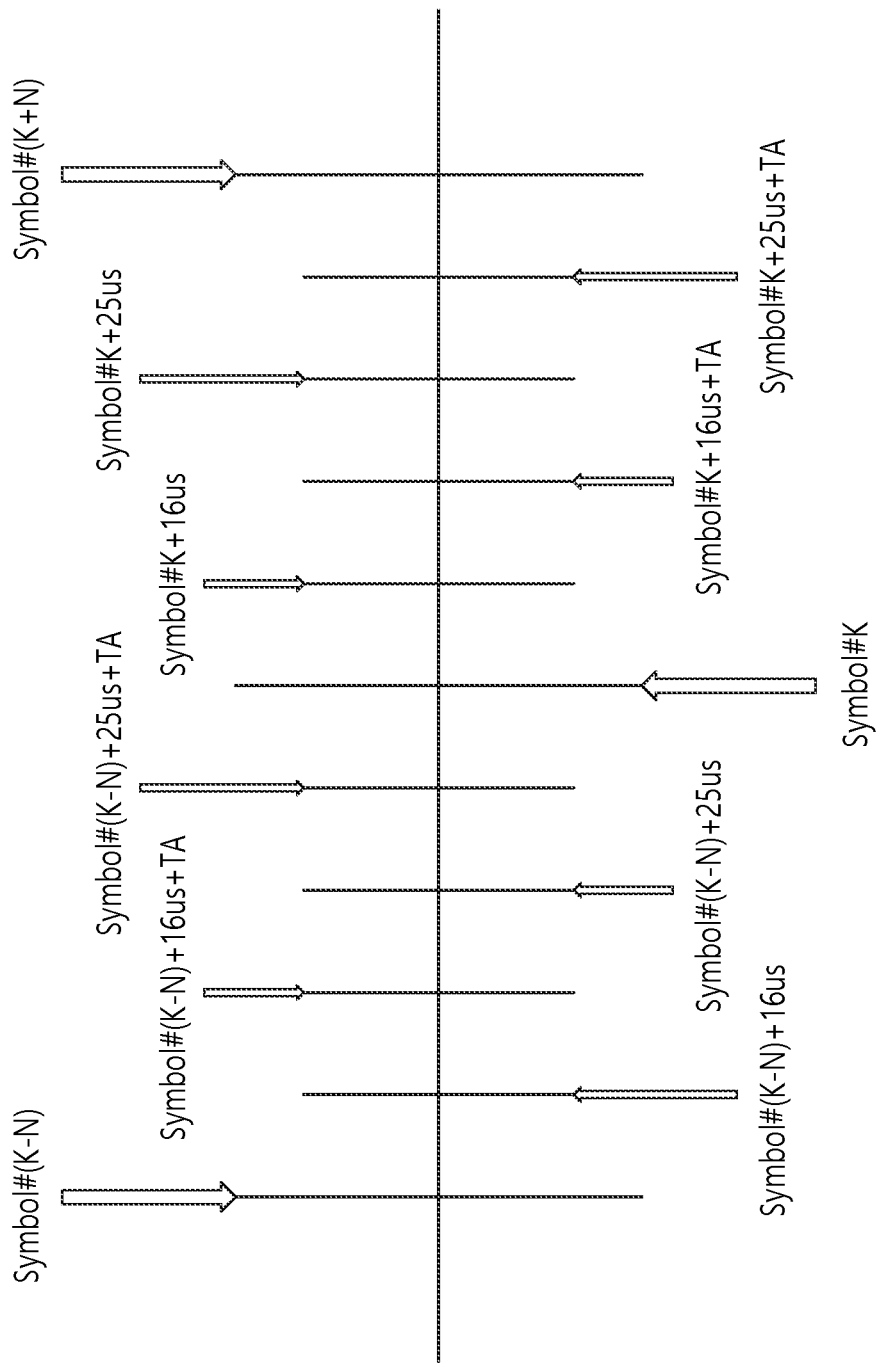
FIG. 20 schematically illustrates an example of PUSCH starting position candidates considering an LBT type and a subcarrier spacing.

FIG. 20 schematically illustrates an example of PUSCH starting position candidates considering an LBT type and a subcarrier spacing.

When a starting symbol index indicated by SLIV is symbol #K, PUSCH starting position candidates considering an LBT type and a subcarrier spacing may be defined as {symbol #(K−N)+16 μs, symbol #(K−N)+16 μs+TA, symbol #(K−N)+25 μs, symbol #(K−N)+25 μs+TA, symbol #K} or {symbol #K, symbol #K+16 μs, symbol #K+16 μs+TA, symbol #K+25 μs, symbol #K+25 μs+TA}, as illustrated in FIG. 13.

Here, N may be predefined, additionally set/indicated through RRC signaling (or through DCI or a combination of RRC and DCI), or scalably set by an eNB for a UE as different values according to numerologies.

For example, N may be 1 when a subcarrier spacing is 15 kHz or 30 kHz and N may be 2 when the subcarrier spacing is 60 kHz. In addition, starting position candidates passing 1 or 2 symbol boundaries from the starting symbol index indicated by SLIV may be excluded depending on a subcarrier spacing.

In this case, the reference symbol index is symbol #(K−N) or symbol #K, and a PUSCH transmission starting time is determined between symbol #(K−N) and symbol #K in the former case and determined as one of candidates between symbol #K and symbol #(K+N) depending on an LBT type and SCS in the latter case.

Meanwhile, when symbol (0+25p) or symbol (0+25 μs+TA) (except symbol 0 and symbol 1) is indicated as a PUSCH starting position, for example, and LBT is successfully performed, a gap between the PUSCH starting position and symbol 1 may be filled by CP extension copying CP of symbol 1.

The above embodiment may be extended and applied in NR-U. CP extension may be required in a gap between an actual PUSCH starting position and the next symbol boundary depending on a subcarrier spacing. Here, CP extension cannot exceed 1 symbol length on the basis of the SCS, for example.

In other words, CP extension can be applied to a gap between a PUSCH starting position and the next symbol boundary on the basis of a subcarrier spacing. That is, a UE may copy CP (with respect to the first symbol of the PUSCH) and fill CP extension in the gap between the actual PUSCH starting position (from among multiple PUSCH starting position candidates) and the next symbol boundary. Here, CP extension can exceed 1 symbol length as described above.

More specifically, when the reference symbol index is symbol #(K−N), a gap between a position determined as an actual starting position from among candidates between #(K−N) and symbol #K (or between symbol #K and symbol #(K+N) when the reference symbol index is symbol #K) and symbol #K (or symbol #(K+N)) is filled through CP extension (etc.) of the first symbol of the PUSCH. Here, the PUSCH symbol length and the value N may depend on a subcarrier spacing, as described above.

Accordingly, the TBS of the PUSCH may be determined based on time-frequency resources from symbol #(K+N) to symbol #(K+N+L) when the starting symbol index indicated by SLIV is identical to the reference symbol index as in (1), and the TBS of the PUSCH may be determined based on time-frequency resources from symbol #K to symbol #(K+L) in the case of (2). Alternatively, the PUSCH TBS may be determined on the basis of symbol #K and the PUSCH may be transmitted by a length to symbol #(K+L+N) as in (3). However, this method may be applicable only when at least one symbol available after symbol #(K+L) is present in a slot.

In addition, the PUSCH symbol length and the value N may depend on a subcarrier spacing, as described above. Accordingly, if N is greater than 1 and CP extension equal to or greater than 1 symbol length of the PUSCH is required at a specific subcarrier spacing, an actual PUSCH starting position may be regarded as a closest starting candidate that does not exceed 1 symbol length and rate matching or TBS calculation may be performed.

For example, in the case of a PUSCH with a subcarrier spacing of 60 kHz, N=2 and the reference symbol index is symbol #(K−2). Here, when the PUSCH starting position becomes symbol #(K−2)+16 μs, actual CP extension becomes greater than 1 symbol length of the PUSCH, and thus symbol #(K−1) may be regarded as an actual PUSCH starting position and rate-matching or TBS calculation may be performed.

As another example, when the reference symbol index is symbol #K, if the actual PUSCH starting position is symbol #K+16 μs since N=2 when SCS=60 kHz, rate matching or TBS may be determined on the basis of symbol #(K+1) instead of symbol #(K+2).

3. Third Method

A method through which a UE performs LBT depending on an LBT type indicated by a gNB and performs UL transmission in a gap between two consecutive transmissions (UL-to-UL or DL-to-UL) when the gap is X μs (X=16 μs or 25 μs) in a gNB-initiated channel occupancy time (CPT) may be provided.

If LBT type 2 or 3 is possible in a 16 μs gap in addition to four PUSCH starting candidates (symbol 0, symbol 0+25 μs, symbol 0+25 μs+TA, symbol 1) and two LBT types (type 1 and type 2) that can be indicated in legacy eLAA, PUSCH starting position candidates that can be indicated through a UL grant are as follows as in the aforementioned [proposed method #1].

That is, when a symbol indicated through SLIV is #K, available PUSCH starting position candidates may be defined as {symbol #(K−N)+16 μs, symbol #(K−N)+16 μs+TA, symbol #(K−N)+25 μs, symbol #(K−N)+25 μs+TA, symbol #K} or {symbol #K, symbol #K+16 μs, symbol #K+16 μs+TA, symbol #K+25 μs, symbol #K+25 μs+TA}, and {symbol #(K−1)+16 μs+TA} or {symbol #K+16 μs+TA} may be replaced with {symbol #(K−1)+max(16 μs, TZ)} or {symbol #K+max(16 μs, TA)}.

Here, when DL transmission is performed until a symbol immediately before a PUSCH transmission starting symbol and then TA is present in the first symbol of the next slot (e.g., when UL transmission starts immediately after (16 μs−TA) from DL reception), {symbol #(K−1)+16 μs+TA} or {symbol #K+16 μs+TA} may be excluded from the PUSCH starting position candidates.

An example of a field configuration may be as shown in Table 4 and Table 5.

TABLE 4

| State | LBT type or symbol #K |
|---|---|
| 1 | LBT type 1 |
| 2 | LBT type 2 |
| 3 | LBT type 3 |
| 4 | Symbol #K |

TABLE 5

| State | PUSCH starting position | LBT type parsing when symbol #K is indicated |
|---|---|---|
| 1 | Symbol #K + 25 μs | LBT type 1 |
| 2 | Symbol #K + 25 μs + TA | LBT type 2 |
| 3 | Symbol #K + 16 μs | LBT type 2 |
| 4 | Symbol #K + 16 μs + TA | LBT type 3 |

As shown in Table 4 and Table 5, all LBT types can be indicated for symbol #K among the PUSCH starting position candidates, LBT types 2 and 3 can be indicated for {symbol #K+16 μs, symbol #K+16 μs+TA}, and LBT types 1 and 2 can be indicated for {symbol #K+25 μs, symbol #K+25 μs+TA}, and thus three LBT types and five PUSCH starting positions can be indicated to a UE using a total of four bits if the three LBT types or symbol #K are indicated using a 2-bit field in a UL grant and one of the four PUSCH starting positions is indicated using another 2-bit field.

That is, a PUSCH starting position is interpreted as indicated when the LBT type field indicates LBT type 1, 2, or 3 and a PUSCH starting position field is reinterpreted as an LBT type when the LBT type field indicates symbol #K so that, when the second field indicates 'state 1', the UE can interpret this as LBT type 1, interpret symbol #K+25 μs+TA as LBT type 2, interpret symbol #K+16 μs as LBT type 2, and interpret symbol #K+16 μs+TA as LBT type 3.

Further, the UE does not expect indication of a PUSCH starting position that does not correspond to an LBT type. That is, when a PUSCH starting point is {symbol #K+25 μs} or {symbol #K+25 μs+TA} although LBT type 3 is indicated, the UE can regard the corresponding UL grant as invalid and ignore or drop the corresponding scheduling.

Similarly, when a PUSCH starting position is {symbol #(K−N)+16 μs, symbol #(K−N)+16 μs+TA, symbol #(K−N)+25 μs, symbol #(K−N)+25 μs+TA}, UL grant fields may be configured as shown in Table 6 and Table 7 as follows to indicate LBT types.

TABLE 6

| State | LBT type or symbol #K |
|---|---|
| 1 | LBT type 1 |
| 2 | LBT type 2 |
| 3 | LBT type 3 |
| 4 | Symbol #K |

TABLE 7

| State | PUSCH starting position | LBT type parsing when symbol #K is indicated |
|---|---|---|
| 1 | Symbol #(K − N) + 25 μs | LBT type 1 |
| 2 | Symbol #(K − N) + 25 μs + TA | LBT type 2 |
| 3 | Symbol #(K − N) + 16 μs | LBT type 2 |
| 4 | Symbol #(K − N) + 16 μs + TA | LBT type 3 |

The eNB can indicate or set in advance, to the UE, whether a PUSCH starting position is {symbol #(K−N)+16 μs, symbol #(K−N)+16 μs+TA, symbol #(K−N)+25 μs, symbol #(K−N)+25 μs+TA, symbol #K} or {symbol #K, symbol #K+16 μs, symbol #K+16 μs+TA, symbol #K+25 μs, symbol #K+25 μs+TA} on the basis of symbol #K indicated through SLIV.

As another method, a combination of an LBT type and a PUSCH starting position may be defined as a state and indicated to the UE through a 4-bit field in the UL grant, as shown in Table 8.

TABLE 8

| State | LBT type | PUSCH starting position |
|---|---|---|
| 0 | 1 (Cat4) | Symbol #K |
| 1 | 1 | Symbol #K + 16 μs |
| 2 | 1 | Symbol #K + 16 μs + TA |
| 3 | 1 | Symbol #K + 25 μs |
| 4 | 1 | Symbol #K + 25 μs + TA |
| <u>5</u> | <u>1</u> | <u>Symbol #(K + N)</u> |
| 6 | 2 (Cat2) | Symbol #K |
| 7 | 2 | Symbol #K + 16 μs |
| 8 | 2 | Symbol #K + 16 μs + TA |
| 9 | 2 | Symbol #K + 25 μs |
| 10 | 2 | Symbol #K + 25 μs + TA |
| <u>11</u> | <u>2</u> | <u>Symbol #(K + N)</u> |
| 12 | 3 (Cat1) | Symbol #K |
| 13 | 3 | Symbol #K + 16 μs |
| *14* | *3* | *symbol #K + 16 μs + TA* |
| <u>15</u> | <u>3</u> | <u>Symbol #(K + N)</u> |

In Table 8, states 1, 7, and 13 expressed in thick letters may be omitted because the length of one OFDM symbol is 16.67 μs when a subcarrier spacing of the PUSCH is 60 kHz.

In addition, transmission is immediately performed without CCA in the case of LBT type 3, and thus {symbol #K+16 μs+TA} of state 14 expressed in italic letters may not be required.

Further, the value N of underlined states 5, 11, and 15 may be predefined as a specific value (e.g., N=1), additionally set/indicated through RRC signaling (or through DCI or a combination of RRC and DCI), or scalably set by an eNB for a UE as different values according to numerologies.

For example, N=1 when a subcarrier spacing (SCS) is 15 kHz and N=2 when the SCS is 30 kHz.

Alternatively, when the SCS is greater than 15 kHz, a starting position passing the next symbol boundary of symbol #K from among {symbol #K+16 μs, symbol #K+25 μs, symbol #K+25 μs+TA} and a starting position passing the previous symbol boundary of symbol #(K−1) from among {symbol #(K−1)+16 μs, symbol #(K−N)+25 μs, symbol #(K−N)+25 μs+TA, symbol #K} may be excluded.

The content of FIG. 13 described above is described in the aspect of UE as below.

Figure 21:
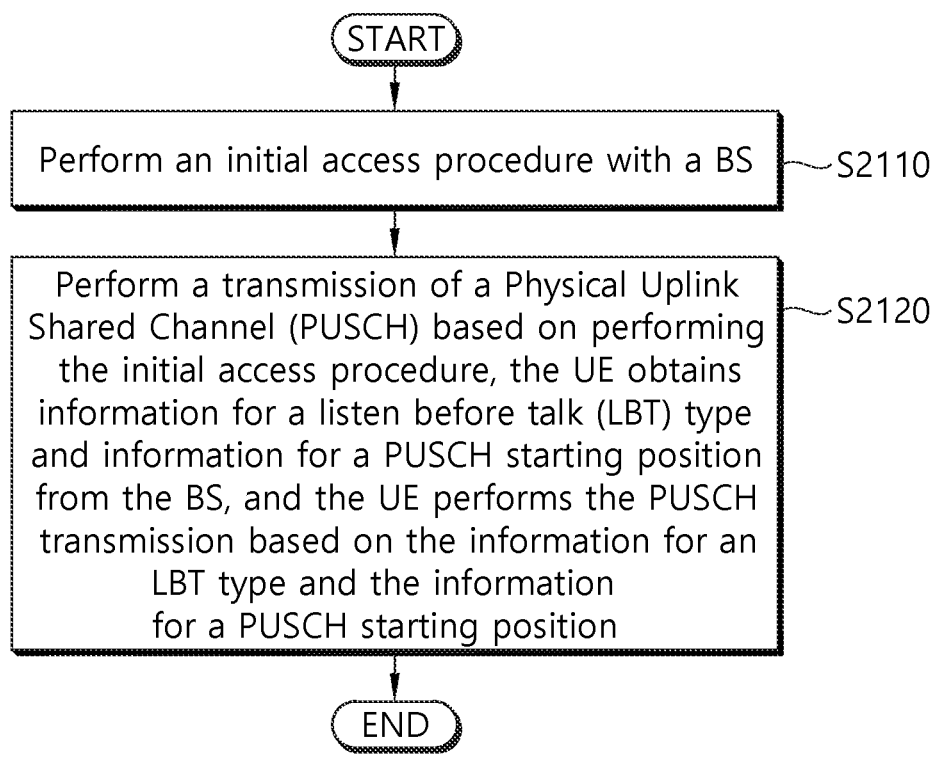
FIG. 21 is a flowchart illustrating a method for performing an initial access procedure as an aspect of UE according to an embodiment of the present disclosure.

FIG. 21 is a flowchart illustrating a method for performing an initial access procedure as an aspect of UE according to an embodiment of the present disclosure.

Referring to FIG. 21, a UE performs the initial access procedure with a BS (step, S2110).

Here, the detailed example for the initial access procedure is as described above. However, the content for the initial access procedure described above is just an example of the initial access procedure to which the present disclosure is applicable, and the initial access procedure in an unlicensed band may be different from the initial access procedure described above. Here, a specific example therefor is as described above.

The UE may perform a transmission of a Physical Uplink Shared Channel (PUSCH) based on performing the initial access procedure (step, S2120). In this case, the UE may obtain information for a listen before talk (LBT) type and information for a PUSCH starting position from the BS, and the UE may perform the PUSCH transmission based on the information for an LBT type and the information for a PUSCH starting position. Herein, the information for a PUSCH starting position may be information informing a position among a plurality of PUSCH starting position candidates, and the information for an LBT type may inform one of LBT type 1, LBT type 2, and LBT type 3. The UE may perform an LBT with a random back-off in LBT type 1, and the UE may perform an LBT without a random back-off in LBT type 2, and the UE may not perform an LBT in LBT type 3. Here, a specific example therefor is as described above.

Figure 22:
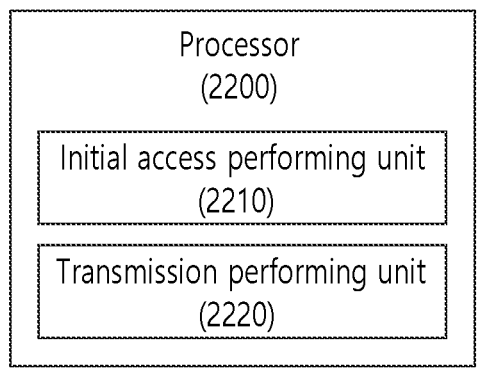
FIG. 22 is a flowchart illustrating an apparatus for performing an initial access procedure as an aspect of UE according to an embodiment of the present disclosure.

FIG. 22 is a flowchart illustrating an apparatus for performing an initial access procedure as an aspect of UE according to an embodiment of the present disclosure.

Referring to FIG. 22, a processor 2200 may include an initial access performing unit 2210 and a transmission performing unit 2220. Here, the processor may mean the processor described above or the processor to be described below.

The initial access performing unit 2210 performs the initial access procedure with a BS.

Here, the detailed example for the initial access procedure is as described above. However, the content for the initial access procedure described above is just an example of the initial access procedure to which the present disclosure is applicable, and the initial access procedure in an unlicensed band may be different from the initial access procedure described above. Here, a specific example therefor is as described above.

The transmission performing unit 2220 may perform a transmission of a Physical Uplink Shared Channel (PUSCH) based on performing the initial access procedure (step, S2120). In this case, the UE may obtain information for a listen before talk (LBT) type and information for a PUSCH starting position from the BS, and the UE may perform the PUSCH transmission based on the information for an LBT type and the information for a PUSCH starting position. Herein, the information for a PUSCH starting position may be information informing a position among a plurality of PUSCH starting position candidates, and the information for an LBT type may inform one of LBT type 1, LBT type 2, and LBT type 3. The UE may perform an LBT with a random back-off in LBT type 1, and the UE may perform an LBT without a random back-off in LBT type 2, and the UE may not perform an LBT in LBT type 3. Here, a specific example therefor is as described above.

The content of FIG. 13 described above is described in the aspect of BS as below.

Figure 23:
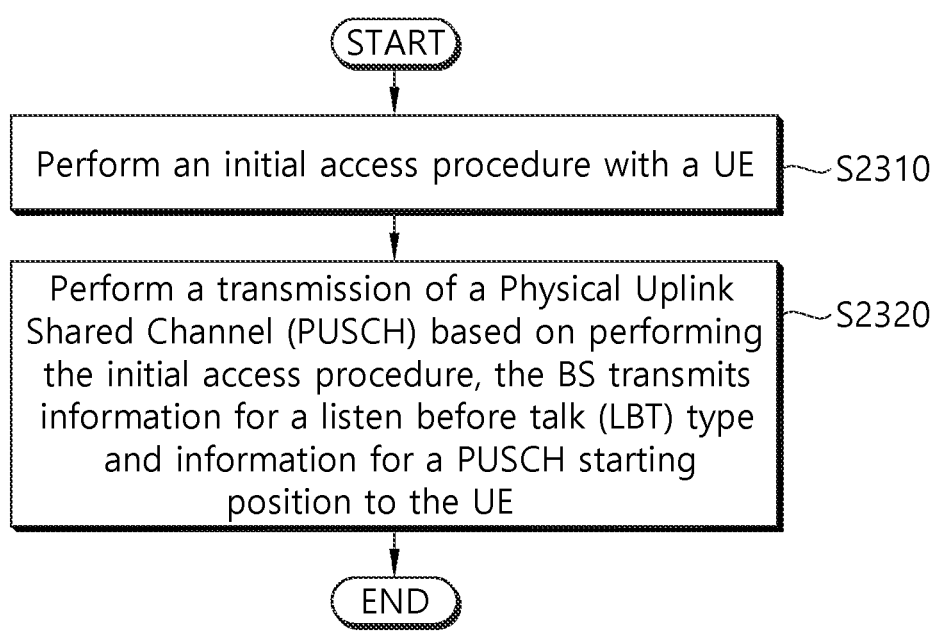
FIG. 23 is a flowchart illustrating a method for performing an initial access procedure as an aspect of BS according to an embodiment of the present disclosure.

FIG. 23 is a flowchart illustrating a method for performing an initial access procedure as an aspect of BS according to an embodiment of the present disclosure.

Referring to FIG. 23, a BS performs the initial access procedure with a UE (step, S2310). Here, the detailed example for the initial access procedure is as described above.

Later, the BS may receive a Physical Uplink Shared Channel (PUSCH) based on performing the initial access procedure (step, S2320). In this case, the BS may transmit information for a listen before talk (LBT) type and information for a PUSCH starting position to the UE. Here, a specific example therefor is as described above.

Figure 24:
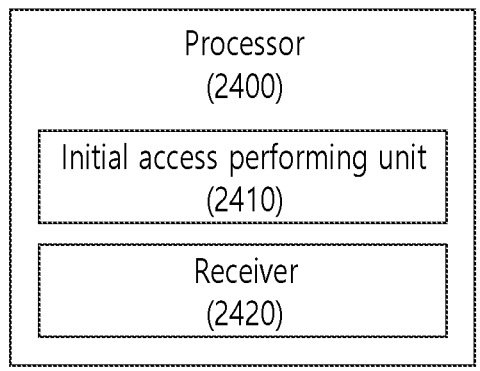
FIG. 24 is a flowchart illustrating an apparatus for performing an initial access procedure as an aspect of BS according to an embodiment of the present disclosure.

FIG. 24 is a flowchart illustrating an apparatus for performing an initial access procedure as an aspect of BS according to an embodiment of the present disclosure.

Referring to FIG. 24, a processor 2400 may include an initial access performing unit 2410 and a receiver 2420. Here, the processor may mean the processor described above or the processor to be described below.

The initial access performing unit 2210 performs the initial access procedure with a UE (step, S2310). Here, the detailed example therefor is as described above.

Later, the receiver 2420 may receive a Physical Uplink Shared Channel (PUSCH) based on performing the initial access procedure (step, S2320). In this case, the BS may transmit information for a listen before talk (LBT) type and information for a PUSCH starting position to the UE. Here, a specific example therefor is as described above.

Figure 25:
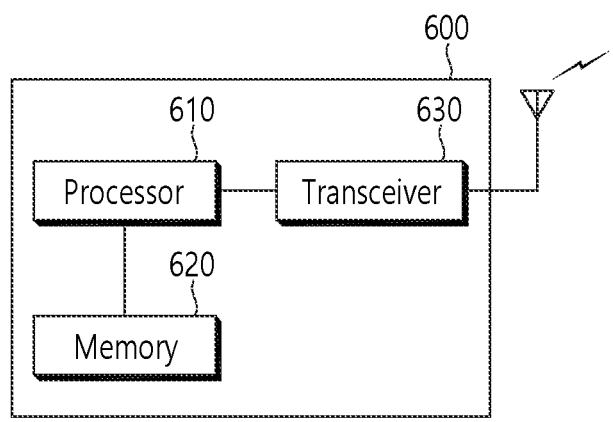
FIG. 25 illustrates a UE for performing an embodiment of the present disclosure.

FIG. 25 illustrates a UE for performing an embodiment of the present disclosure. The present disclosure with respect to the UE described above may be applied to this embodiment.

A UE 600 includes a processor 610, a memory 620, and a transceiver 630. The processor 610 may be configured to implement the proposed function, procedure and/or method described in the present disclosure. Layers of a wireless interface protocol may be implemented in the processor 610.

More particularly, a processor 610 may include an initial access performing unit 2210 and a transmission performing unit 2220. Here, the processor may mean the processor described above or the processor to be described below.

The initial access performing unit 2210 performs the initial access procedure with a BS.

Here, the detailed example for the initial access procedure is as described above. However, the content for the initial access procedure described above is just an example of the initial access procedure to which the present disclosure is applicable, and the initial access procedure in an unlicensed band may be different from the initial access procedure described above. Here, a specific example therefor is as described above.

The transmission performing unit 2220 may perform a transmission of a Physical Uplink Shared Channel (PUSCH) based on performing the initial access procedure (step, S2120). In this case, the UE may obtain information for a listen before talk (LBT) type and information for a PUSCH starting position from the BS, and the UE may perform the PUSCH transmission based on the information for an LBT type and the information for a PUSCH starting position. Herein, the information for a PUSCH starting position may be information informing a position among a plurality of PUSCH starting position candidates, and the information for an LBT type may inform one of LBT type 1, LBT type 2, and LBT type 3. The UE may perform an LBT with a random back-off in LBT type 1, the UE may perform an LBT without a random back-off in LBT type 2, and the UE may not perform an LBT in LBT type 3. Here, a specific example therefor is as described above.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

Figure 26:
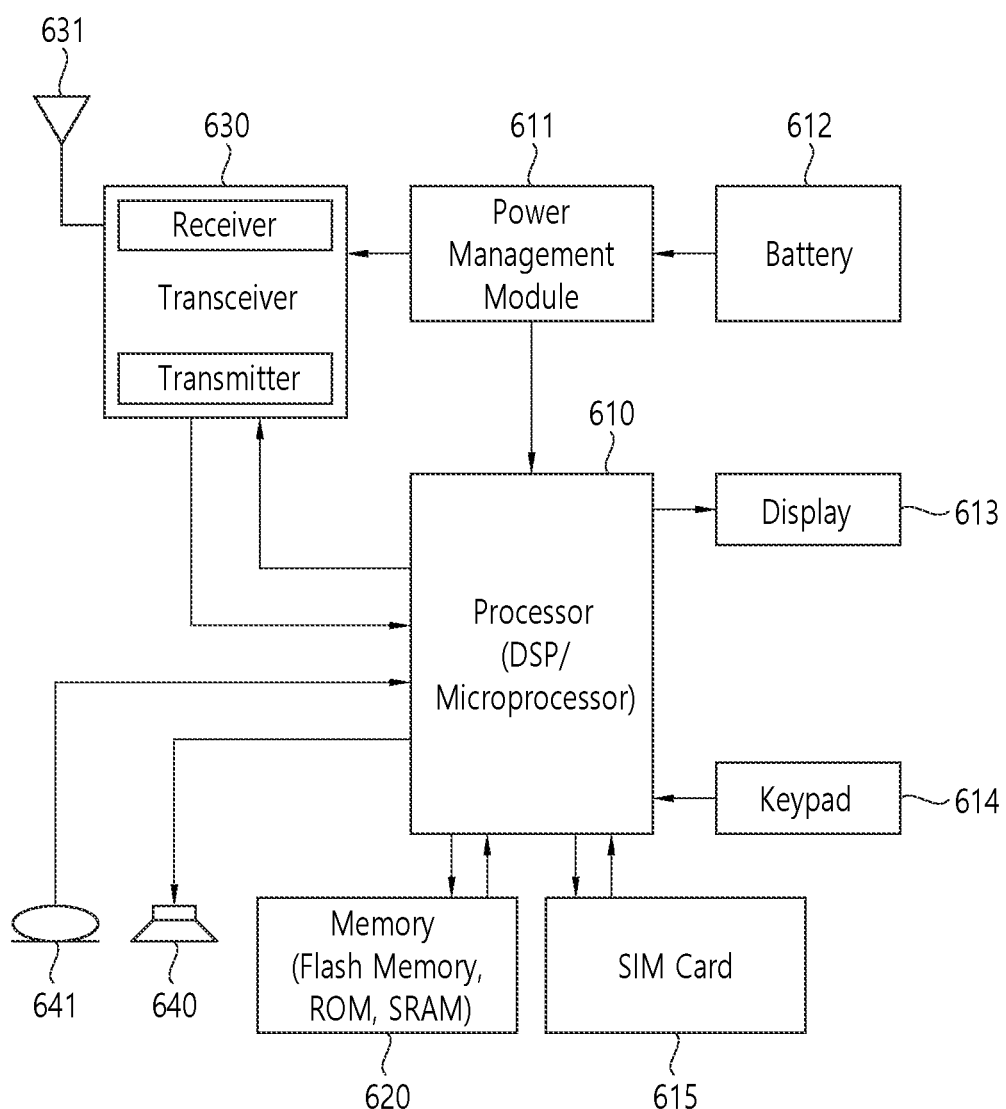
FIG. 26 illustrates a UE for implementing embodiments of the present disclosure in more detail.

FIG. 26 illustrates a UE for implementing embodiments of the present disclosure in more detail.

The present disclosure described above with respect to the UE is applicable to this embodiment.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

More particularly, a processor 610 may include an initial access performing unit 2210 and a transmission performing unit 2220. Here, the processor may mean the processor described above or the processor to be described below.

The initial access performing unit 2210 performs the initial access procedure with a BS.

Here, the detailed example for the initial access procedure is as described above. However, the content for the initial access procedure described above is just an example of the initial access procedure to which the present disclosure is applicable, and the initial access procedure in an unlicensed band may be different from the initial access procedure described above. Here, a specific example therefor is as described above.

The transmission performing unit 2220 may perform a transmission of a Physical Uplink Shared Channel (PUSCH) based on performing the initial access procedure (step, S2120). In this case, the UE may obtain information for a listen before talk (LBT) type and information for a PUSCH starting position from the BS, and the UE may perform the PUSCH transmission based on the information for an LBT type and the information for a PUSCH starting position. Herein, the information for a PUSCH starting position may be information informing a position among a plurality of PUSCH starting position candidates, and the information for an LBT type may inform one of LBT type 1, LBT type 2, and LBT type 3. The UE may perform an LBT with a random back-off in LBT type 1, the UE may perform an LBT without a random back-off in LBT type 2, and the UE may not perform an LBT in LBT type 3. Here, a specific example therefor is as described above.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

Figure 27:
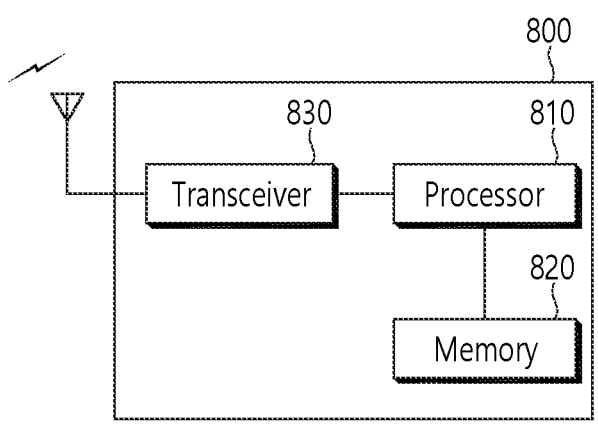
FIG. 27 illustrates a network node for implementing embodiments of the present disclosure.

FIG. 27 illustrates a network node for implementing embodiments of the present disclosure.

The present disclosure described above with respect to a network is applicable to this embodiment.

The network node 800 includes a processor 810, a memory 820, and a transceiver 830. The processor 810 may be configured to implement functions, procedures and/or methods proposed in the present specification. Layers of a wireless interface protocol may be implemented in the processor 810.

More particularly, a processor 810 may include an initial access performing unit 2410 and a receiver 2420. Here, the processor may mean the processor described above or the processor to be described below.

The initial access performing unit 2410 performs the initial access procedure with a UE (step, S2310). Here, the detailed example therefor is as described above.

Later, the receiver 2420 may receive a Physical Uplink Shared Channel (PUSCH) based on performing the initial access procedure (step, S2320). In this case, the BS may transmit information for a listen before talk (LBT) type and information for a PUSCH starting position to the UE. Here, a specific example therefor is as described above.

The memory 820 is operatively coupled with the processor 810 and stores a variety of information to operate the processor 810. The transceiver 830 is operatively coupled with the processor 810, and transmits and/or receives a radio signal.

The processor 810 may include ASIC, other chipset, logic circuit and/or data processing device. The memory 820 may include ROM, RAM, flash memory, memory card, storage medium and/or other storage device. The transceiver 830 may include baseband circuitry to process radio frequency signals. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

Figure 28:
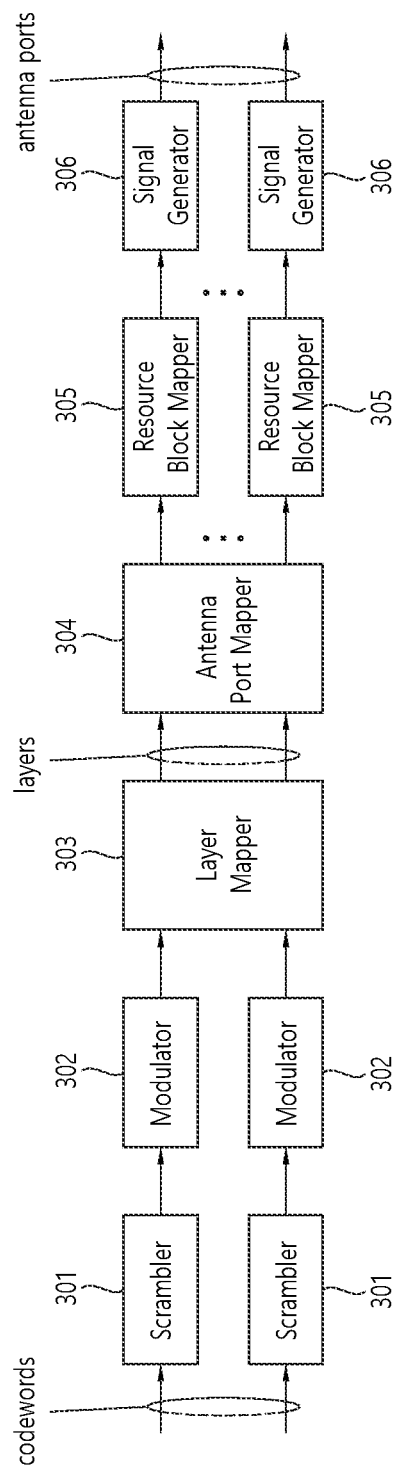
FIG. 28 illustrates an example of a signal processing module structure in a transmission apparatus.

FIG. 28 illustrates an example of a signal processing module structure in a transmission apparatus. Here, the signal processing may be performed by the processor of the BS/UE described above.

Referring to FIG. 28, a transmission apparatus 1810 in a UE or an eNB may include a scrambler 301, a modulator 302, a layer mapper 303, an antenna port mapper 304, a resource block mapper 305, and a signal generator 306.

The transmission apparatus 1810 may transmit one or more codewords. Coded bits in each codeword are scrambled by the scrambler 301 and transmitted on a physical channel. A codeword may be called a data stream and may be equivalent to a transport block that is a data block provided by the MAC layer.

The scrambled bits are modulated into complex-valued modulation symbols by the modulator 302. The modulator 302 may modulate the scrambled bits according to a modulation scheme and dispose them as complex-valued modulation symbols representing positions on a signal constellation. The modulation scheme is not limited, and m-Phase Shift Keying (m-PSK) or m-Quadrature Amplitude Modulation (m-QAM) may be used to modulate the coded data. The modulator may be referred to as a modulation mapper.

The complex-valued modulation symbols may be mapped to one or more transport layers by the layer mapper 303. A complex-valued modulation symbol on each layer may be mapped by the antenna port mapper 304 for transmission on an antenna port.

The resource block mapper 305 may map a complex-valued modulation symbol for each antenna port to an appropriate resource element in a virtual resource block allocated for transmission. The resource block mapper may map the virtual resource block to a physical resource block through an appropriate mapping scheme. The resource block mapper 305 may allocate the complex-valued modulation symbol for each antenna port to an appropriate subcarrier and multiplex it according to a user.

The signal generator 306 may modulate the complex-valued modulation symbol for each antenna port, that is, an antenna-specific symbol through a specific modulation scheme, for example, Orthogonal Frequency Division Multiplexing (OFDM) to generate a complex-valued time domain OFDM symbol signal. The signal generator may perform Inverse Fast Fourier Transform (IFFT) on the antenna-specific symbol, and a cyclic prefix (CP) may be inserted into the time-domain symbol on which IFFT has been performed. OFDM symbols are subjected to digital-to-analog conversion and frequency upconversion and transmitted to a reception apparatus through each transmission antenna. The signal generator may include an IFFT module, a CP insertion unit, a digital-to-analog converter (DAC), and a frequency uplink converter.

Figure 29:
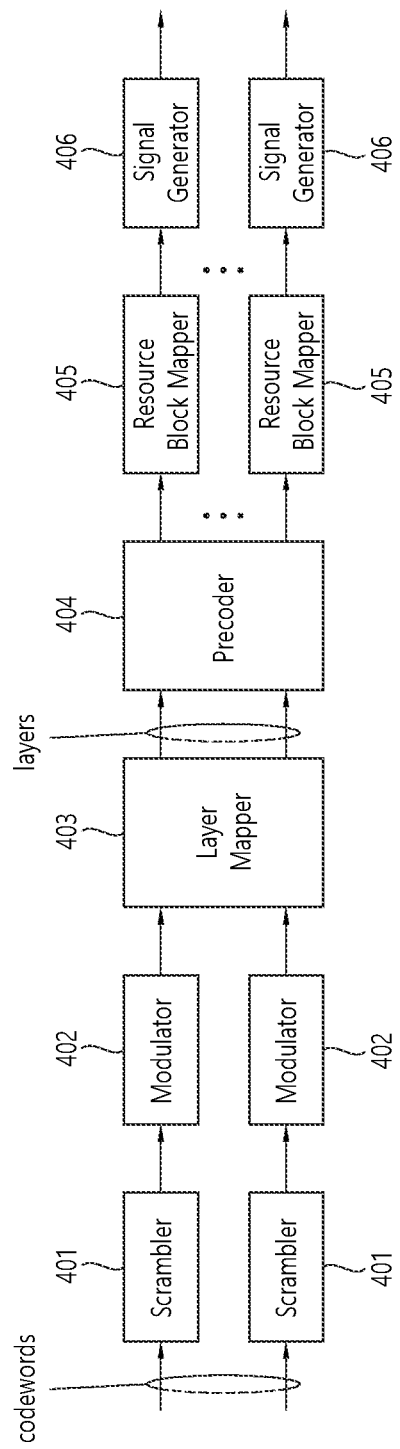
FIG. 29 illustrates another example of a signal processing module structure in a transmission apparatus.

FIG. 29 illustrates another example of a signal processing module structure in a transmission apparatus. Here, a signal processing may be performed by the processor of the UE/BS described above.

Referring to FIG. 24, the transmission apparatus 1810 in a UE or an eNB may include a scrambler 401, a modulator 402, a layer mapper 403, a precoder 404, a resource block mapper 405, and a signal generator 406.

The transmission apparatus 1810 may scramble coded bits in a codeword through the scrambler 401 and then transmit the scrambled coded bits through a physical channel.

The scrambled bits are modulated into complex-valued modulation symbols by the modulator 402. The modulator may modulate the scrambled bits according to a predetermined modulation scheme and dispose them as complex-valued modulation symbols representing positions on a signal constellation. The modulation scheme is not limited, and pi/2-Binary Phase Shift Keying (pi/2-BPSK), m-Phase Shift Keying (m-PSK) or m-Quadrature Amplitude Modulation (m-QAM) may be used to modulate the coded data.

The complex-valued modulation symbols may be mapped to one or more transport layers by the layer mapper 403.

A complex-valued modulation symbol on each layer may be precoded by the precoder 404 for transmission on an antenna port. Here, the precoder may perform transform precoding on the complex-valued modulation symbol and then perform precoding thereon. Alternatively, the precoder may perform precoding without performing transform precoding. The precoder 404 may process the complex-valued modulation symbols through MIMO according to multiple transmission antennas to output antenna-specific symbols and distribute the antenna-specific symbols to the resource block mapper 405. An output z of the precoder 404 can be obtained by multiplying an output y of the layer mapper 403 by an N×M precoding matrix. Here, N is the number of antenna ports and M is the number of layers.

The resource block mapper 405 maps the complex-valued modulation symbol for each antenna port to an appropriate resource element in a virtual resource block allocated for transmission.

The resource block mapper 405 may allocate the complex-valued modulation symbol to an appropriate subcarrier and multiplex it according to a user.

The signal generator 406 may modulate the complex-valued modulation symbols through a specific modulation scheme, for example, OFDM to generate a complex-valued time domain OFDM symbol signal. The signal generator 406 may perform IFFT on antenna-specific symbols, and a CP may be inserted into the time-domain symbols on which IFFT has been performed. OFDM symbols are subjected to digital-to-analog conversion and frequency upconversion and transmitted to a reception apparatus through each transmission antenna. The signal generator 406 may include an IFFT module, a CP insertion unit, a digital-to-analog converter (DAC), and a frequency uplink converter.

A signal processing procedure of a reception apparatus 1820 may be a reverse to the signal processing procedure of the transmission apparatus. Specifically, a processor 1821 of the reception apparatus 1820 performs decoding and demodulation on an RF signal received from the outside through antenna port(s) of a transceiver 1822. The reception apparatus 1820 may include multiple reception antennas, and signals received through the reception antennas are restored to baseband signals and then reconstructed to a data stream originally intended to be transmitted by the transmission apparatus 1810 through multiplexing and MIMO demodulation. The reception apparatus 1820 may include a signal restoration unit for restoring a received signal to a baseband signal, a multiplexer for combining and multiplexing the received signal, and a channel demodulator for demodulating a multiplexed signal sequence into a codeword. The signal restoration unit, the multiplexer, and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FFT module for applying fast Fourier transform (FFT) to the CP-removed signal to output frequency domain symbols, and a resource element demapper/equalizer for restoring the frequency domain symbols to antenna-specific symbols. The antenna-specific symbols are restored to transport layers by the multiplexer, and the transport layers are restored to codewords that the transmission apparatus intends to transmit.

Hereinafter, a physical channel and a signal transmission process are described.

Figure 30:
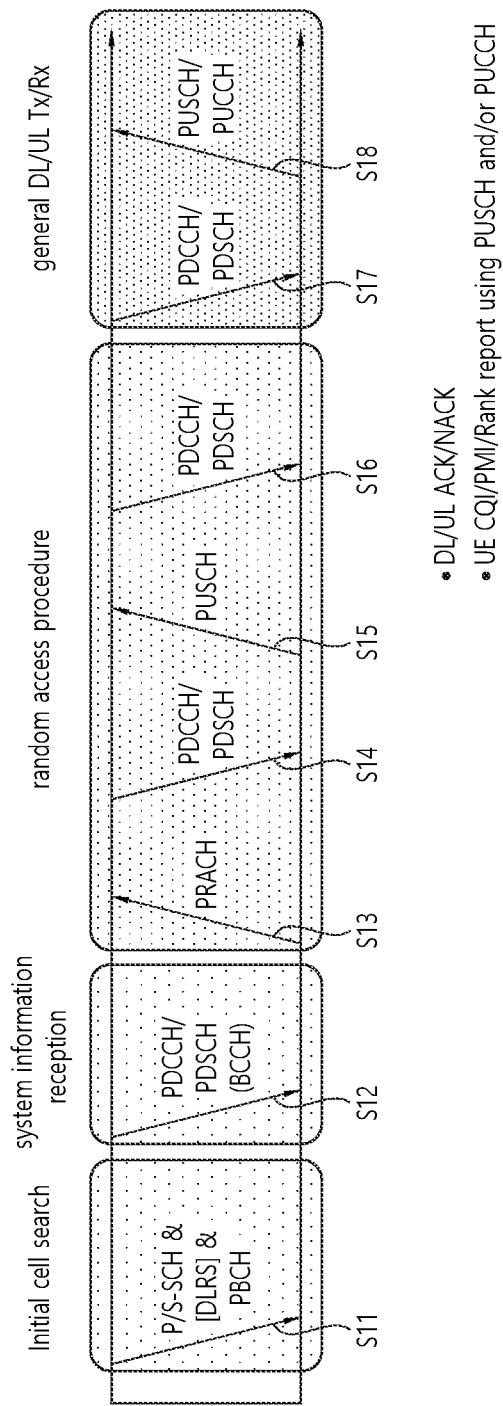
FIG. 30 illustrates physical channels used in the 3GPP system and a general signal transmission.

FIG. 30 illustrates physical channels used in the 3GPP system and a general signal transmission.

In a wireless communication system, a UE receives information from an eNB on downlink and transmits information to the eNB on uplink. Information transmitted/received between the eNB and the UE includes data and various types of control information and there are various physical channels according to types/purposes of information transmitted/received by the eNB and the UE.

A UE performs initial cell search such as synchronization with an eNB when it is powered on or newly enters a cell (S11). To this end, the UE receives a primary synchronization channel (PSCH) and a secondary synchronization channel (SSCH) from the eNB to synchronize with the eNB and acquires information such as cell identity (ID). In addition, the UE may receive a physical broadcast channel (PBCH) from the eNB to acquire broadcast information in the cell. Further, the UE may receive a downlink reference signal (DL RS) in the initial cell search stage to check a downlink channel state.

Upon completion of initial cell search, the UE may receive a physical downlink control channel (PDCCH) and a physical downlink shared channel (PDSCH) corresponding thereto to acquire more specific system information (S12).

Thereafter, the UE may perform a random access procedure to complete access to the eNB (S13 to S16). Specifically, the UE may transmit a preamble through a physical random access channel (PRACH) (S13) and receive a random access response (RAR) for the preamble through the PDCCH and the PDSCH corresponding thereto (S14). Then, the UE may transmit a physical uplink shared channel (PUSCH) using scheduling information in the RAR (S15) and perform a contention resolution procedure with respect to the PDCCH and the PDSCH corresponding thereto (S16).

Upon execution of the above-described procedures, the UE may perform PDCCH/PDSCH reception (17) and PUSCH/PUCCH (Physical Uplink Control Channel) transmission (S18) as a general uplink/downlink signal transmission procedure. Control information transmitted from the UE to the eNB is referred to as uplink control information (UCI). The UCI includes hybrid automatic repeat and request acknowledgement/negative-ACK (HARQ ACK/

NACK), a scheduling request (SR), and channel state information (CSI). The CSI includes a channel quality indicator (CQI), a precoding matrix indicator (PMI), and a rank indication (RI). Although the UCI is transmitted through a PUCCH in general, it may be transmitted through a PUSCH when control information and data need to be simultaneously transmitted. Further, the UE may aperiodically transmit the UCI through the PUSCH in response to a request/instruction of a network.

Hereinafter, cell search will be described.

Cell search is a procedure through which a UE acquires time and frequency synchronization with a cell and detects a physical layer cell ID of the cell. To perform cell search, the UE receives a primary synchronization signal (PSS) and a secondary synchronization signal (SSS).

The cell search procedure of the UE cam be summarized in in Table 9.

TABLE 9

| | Signal type | Operation |
| --- | --- | --- |
| Step 1 | PSS | SS/PBCH block (SSB) symbol timing acquisition<br>Cell ID search in cell ID group (3 hypothesis) |
| Step 2 | SSS | Cell ID group detection (336 hypothesis) |
| Step 3 | PBCH DMRS | SSB index and half frame index (slot and frame boundary detection) |
| Step 4 | PBCH | Time information (80 ms, SFN, SSB index, HF)<br>RMSI CORESET/search space configuration |
| Step 5 | PDCCH and PDSCH | Cell access information<br>RACH configuration |

Figure 31:
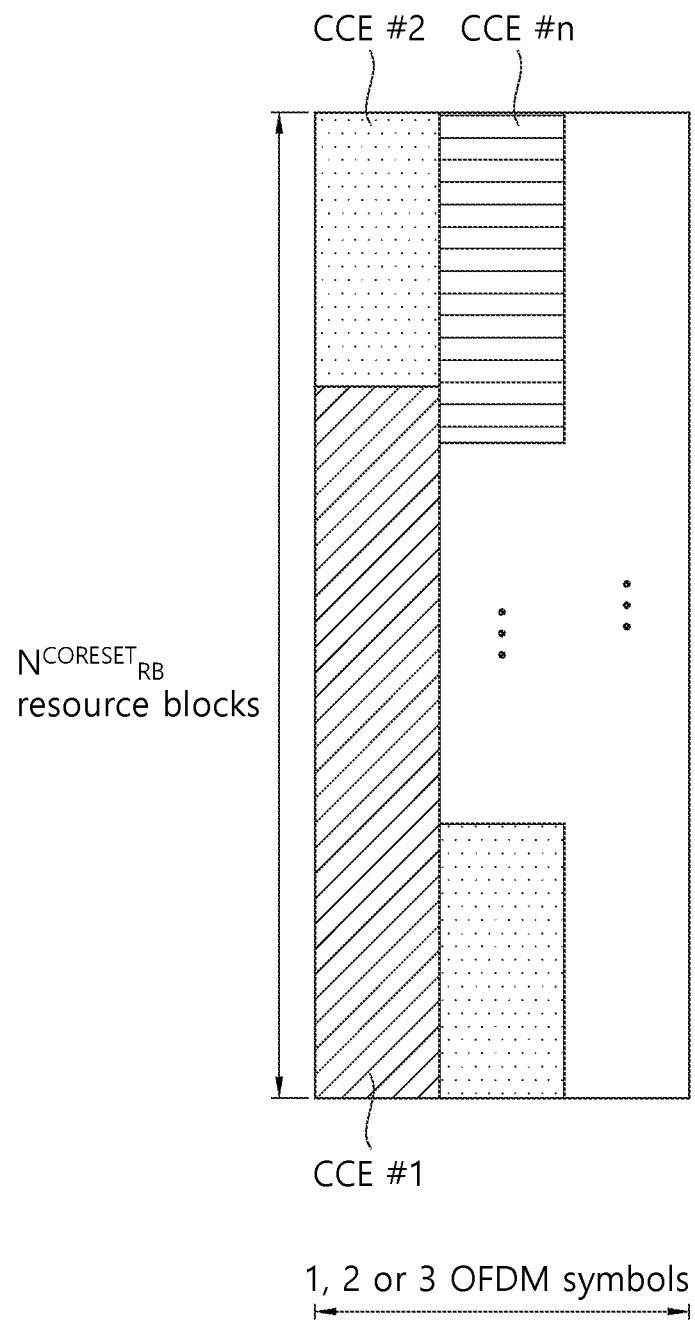
FIG. 31 schematically illustrates a synchronization signal and PBCH block (SS/PBCH block).

FIG. 31 schematically illustrates a synchronization signal and PBCH block (SS/PBCH block).

Referring to FIG. 31, the SS/PBCH block includes a PSS and an SSS each occupying one symbol and 127 subcarriers, and a PBCH occupying 3 OFDM symbols and 240 subcarriers with an unused part for the SSS remaining on one symbol. Periodicity of the SS/PBCH block may be set by a network, and a temporal position at which the SS/PBCH block can be transmitted is determined by a subcarrier spacing.

Polar coding is used for the PBCH. A UE can assume a band-specific subcarrier spacing for the SS/PBCH block unless a network sets the UE such that the UE assumes a different subcarrier spacing.

The PBCH symbols carry a frequency-multiplexed DMRS thereof. QPSK modulation is used for the PBCH.

1008 unique physical layer cell IDs are given according to the following equation 1.

[Equation 1]

$$N_{ID}^{cell} = 3N_{ID}^{(1)} + N_{ID}^{(2)}$$

(Here, $N_{ID}^{(1)} \in \{0, 1, \ldots, 335\}$ and $N_{ID}^{(2)} \in \{0, 1, 2\}$.)

Meanwhile, a PSS sequence $d_{PSS}(n)$ for the PSS is defined by the following equation 2.

$$d_{PSS}(n) = 1 - 2x(m) \, m = (n + 43 N_{ID}^{(2)}) \bmod 127 \quad \text{[Equation 2]}$$

$0 \le n < 127$ (Here, and $x(i+7) = (x(i+4) + x(i)) \bmod 2$ and $[x(6) \, x(5) \, x(4) \, x(3) \, x(2) \, x(1) \, x(0)] = [1 \, 1 \, 1 \, 0 \, 1 \, 1 \, 0]$.)

The aforementioned sequence can be mapped to physical resources illustrated in FIG. 30.

Meanwhile, an SSS sequence $d_{SSS}(n)$ for the SSS is defined by the following equation 3.

$$d_{SSS}(n) = [1 - 2x_0((n + m_0) \bmod 127)] \quad \text{[Equation 3]}$$
$$[1 - 2x_1((n + m_1) \bmod 127)]$$

$$m0 = 15 * \left\lfloor \frac{N_{ID}^{(1)}}{112} \right\rfloor + 5 N_{ID}^{(2)}$$

$$m_1 = N_{ID}^{(1)} \bmod 112$$

$$0 \le n < 127$$

$$\left( \text{Here, } \begin{array}{l} x_0(i+7) = (x_0(i+4) + x_0(i)) \bmod 2 \\ x_1(j+7) = (x_1(i+1) + x_1(i)) \bmod 2 \end{array} \right.$$

$$[x_0(6) \, x_0(5) \, x_0(4) \, x_0(3) \, x_0(2) \, x_0(1) \, x_0(0)] = [0 \, 0 \, 0 \, 0 \, 0 \, 0 \, 1]$$

$$[x_1(6) \, x_1(5) \, x_1(4) \, x_1(3) \, x_1(2) \, x_1(1) \, x_0(0)] = [0 \, 1 \, 0 \, 0 \, 0 \, 0 \, 1] \right).$$

The aforementioned sequence can be mapped to physical resources illustrated in FIG. 31.

For a half frame with SS/PBCH blocks, the first symbol indexes for candidate S S/PBCH blocks may be determined according to the subcarrier spacing of SS/PBCH bloc ks as follows.

Case A—15 kHz subcarrier spacing: the first symbols of the candidate SS/PBCH blocks have indexes of {2, 8}+14*n. For carrier frequencies smaller than or equal to 3 GHz, n=0, 1. For carrier frequencies larger than 3 GHz and smaller than or equal to 6 GHz, n=0, 1, 2, 3.

Case B—30 kHz subcarrier spacing: the first symbols of the candidate SS/PBCH blocks have indexes {4, 8, 16, 20}+28*n. For carrier frequencies smaller than or equal to 3 GHz, n=0. For carrier frequencies larger than 3 GHz and smaller than or equal to 6 GHz, n=0, 1.

Case C—30 kHz subcarrier spacing: the first symbols of the candidate SS/PBCH blocks have indexes {2, 8}+14*n. For carrier frequencies smaller than or equal to 3 GHz, n=0, 1. For carrier frequencies larger than 3 GHz and smaller than or equal to 6 GHz, n=0, 1, 2, 3.

Case D—120 kHz subcarrier spacing: the first symbols of the candidate SS/PBCH blocks have indexes {4, 8, 16, 20}+28*n. For carrier frequencies larger than 6 GHz, n=0, 1, 2, 3, 5, 6, 7, 8, 10, 11, 12, 13, 15, 16, 17, 18.

Case E—240 kHz subcarrier spacing: the first symbols of the candidate SS/PBCH blocks have indexes {8, 12, 16, 20, 32, 36, 40, 44}+56*n. For carrier frequencies larger than 6 GHz, n=0, 1, 2, 3, 5, 6, 7, 8.

The candidate SS/PBCH blocks in a half frame may be indexed in an ascending order in time from 0 to L−1. A UE needs to determine the 2 LSBs, for L=4, or the 3 LSBs, for L>4, of a SS/PBCH block index per half frame from one-to-one mapping with an index of the DM-RS sequence transmitted in the PBCH. For L=64, the UE needs to determine the 3 MSBs of the SS/PBCH block index per half frame by PBCH payload bits $\bar{a}_{\bar{A}+5}, \bar{a}_{\bar{A}+6}, \bar{a}_{\bar{A}+7}$.

A UE can be configured by higher layer parameter "SSB-transmitted-SIB1", indexes of SS/PBCH blocks for which the UE cannot receive other signals or channels in REs that overlap with REs corresponding to the SS/PBCH blocks. A UE can also be configured per serving cell, by higher layer parameter "SSB-transmitted", indexes of SS/PBCH blocks for which the UE cannot receive other signals or channels in REs that overlap with REs corresponding to the SS/PBCH blocks. A configuration by "SSB-transmitted" may override a configuration by "SSB-transmitted-SIB1". A UE can be configured per serving cell by higher layer parameter "SSB-periodicityServingCell" a periodicity of the half frames for reception of SS/PBCH blocks per serving cell. If the UE is not configured a periodicity of the half frames for receptions of SS/PBCH blocks, the UE may assume a periodicity of a half frame. A UE may assume that the periodicity is same for all SS/PBCH blocks in the serving cell.

Figure 32:
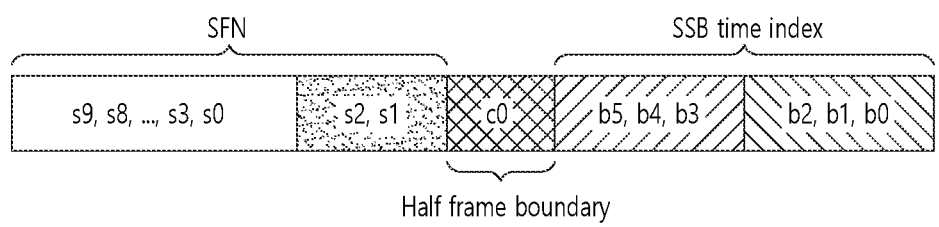
FIG. 32 illustrates a method of acquiring timing information by a UE.

FIG. 32 illustrates a method of acquiring timing information by a UE.

Firstly, the UE may acquire 6-bit SFN information via master information block (MIB) received in a PBCH. Further, the UE may acquire 4-bit SFN in a PBCH transport block.

Secondly, the UE may acquire 1-bit half frame indication as a part of a PBCH payload. For below 3 GHz, half frame indication may be further implicitly signaled as a part of a PBCH DMRS for Lmax=4.

Lastly, the UE may acquire an SS/PBCH block index by a DMRS sequence and the PBCH payload. That is, 3 LSBs of an SS block index can be acquired by the DMRS sequence within a period of 5 ms. Further, 3 MSBs of timing information are carried explicitly in the PBCH payload (for above 6 GHz).

For initial cell selection, a UE may assume that half frames with SS/PBCH blocks occur with a periodicity of 2 frames. Upon detection of an SS/PBCH block, the UE determines that a control resource set for Type0-PDCCH common search space is present if $k_{SSB} \leq 23$ for FR1 and if $k_{SSB} \leq 11$ for FR2. The UE determines that a control resource set for Type0-PDCCH common search space is not present if $k_{SSB} > 23$ for FR1 and of $k_{SSB} > 11$ for FR2.

For a serving cell without transmission of SS/PBCH blocks, a UE acquires time and frequency synchronization with the serving cell based on receptions of SS/PBCH blocks on the PCell, or on the PSCell, of the cell group for the serving cell.

Hereinafter, acquisition of system information (SI) will be described.

System information (SI) is divided into MasterInformationBlock (MIB) and a number of SystemInformationBlocks (SIBs) where:
  the MIB is always transmitted on a BCH with a periodicity of 80 ms and repetitions made within 80 ms and it includes parameters necessary to acquire SystemInformationBlockType1 (SIB1) from the cell;
  SIB1 is transmitted on a DL-SCH with a periodicity and repetitions. SIB1 includes information regarding the availability and scheduling (e.g., periodicity, SI-window size) of other SIBs. It also indicates whether they (i.e., other SIBs) are provided via periodic broadcast basis or only on-demand basis. If other SIBs are provided on-demand, when SIB1 includes information for the UE to perform SI request;
  SIBs other than SIB1 are carried in SystemInformation (SI) messages, which are transmitted on the DL-SCH. Each SI message is transmitted within periodically occurring time domain windows (referred to as SI-windows);
  For PSCell and SCells, RAN provides the required SI by dedicated signaling. Nevertheless, the UE needs to acquire MIB of the PSCell to get SFN timing of the SCG (which may be different from MCG). Upon change of relevant SI for SCell, RAN releases and adds the concerned SCell. For PSCell, SI can only be changed with Reconfiguration with Sync.

Figure 33:
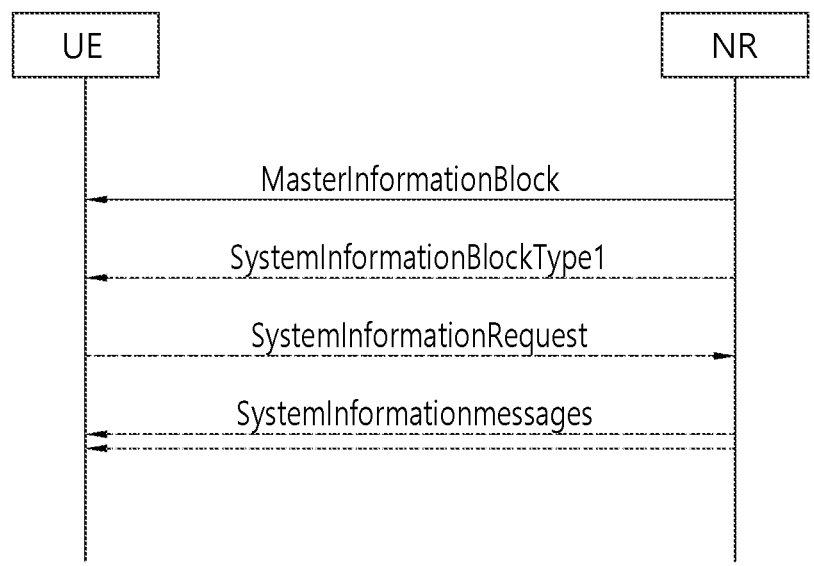
FIG. 33 illustrates an example of a system information acquisition process of a UE.

FIG. 33 illustrates an example of a system information acquisition process of a UE.

Referring to FIG. 33, the UE may receive MIB from a network and then receive SIB1. Then, the UE may transmit a system information request to the network and receive a SystemInformation message from the network in response to the system information request.

The UE may apply a system information acquisition procedure to acquire access stratum (AS) and non-access stratum (NAS) information.

The UE in RRC_IDLE and RRC_INACTIVE states needs to ensure having a valid version of (at least) MIB, SIB1, and SystemInformationBlockTypeX (depending on support of the concerned RATs for UE controlled mobility).

The UE in RRC_CONNECTED state needs to ensure having a valid version of MIB, SIB1, and SystemInformationBlockTypeX (depending on support of mobility towards the concerned RATs).

The UE needs to store relevant SI acquired from the currently camped/serving cell. A version of the SI acquired and stored by the UE remains valid only for a certain time. The UE can use such a stored version of the SI, for example, after cell re-selection, upon return from out of coverage or after system information change indication.

Hereinafter, random access (RA) will be described.

A random access procedure of a UE can be summarized in Table 10.

TABLE 10

| | Signal type | Operation/acquired information |
| --- | --- | --- |
| Step 1 | PRACH preamble of uplink | Initial beam acquisition<br>Random election of RA-preamble ID |
| Step 2 | Random access response on DL-SCH | Timing alignment information<br>RA-preamble ID<br>Initial uplink grant, temporary C-RNTI |
| Step 3 | Uplink transmission on UL-SCH | RRC connection request<br>UE identifier |
| Step 4 | Contention resolution of downlink | C-RNTI on PDCCH for initial access<br>C-RNTI on PDCCH for UE in RRC_CONNECTED state |

Figure 34:
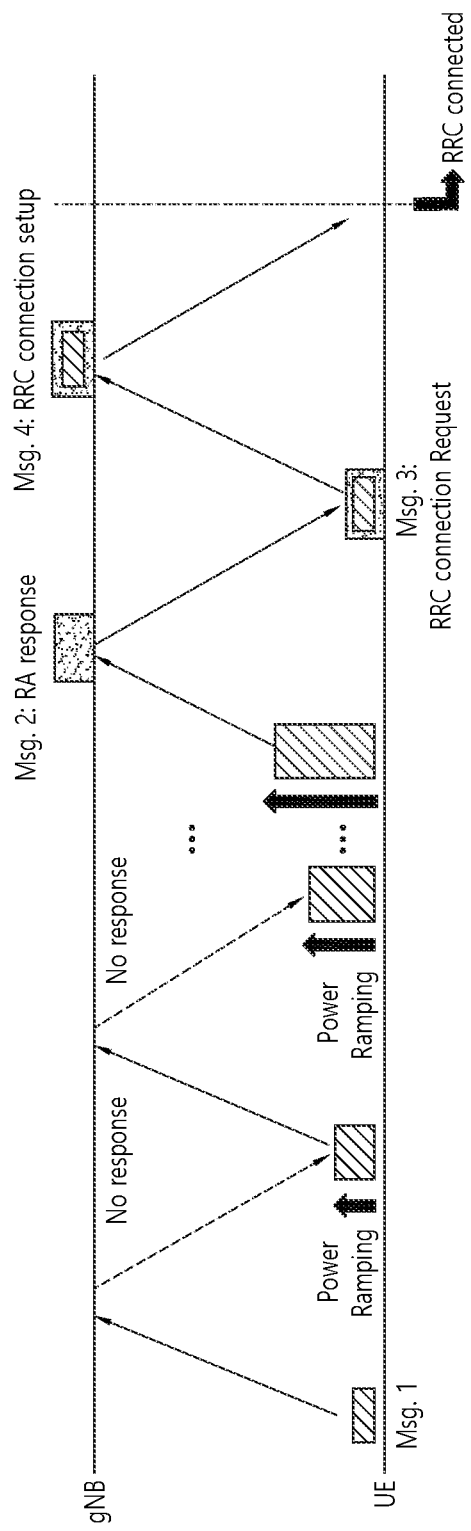
FIG. 34 illustrates the random access procedure.

FIG. 34 illustrates the random access procedure.

Referring to FIG. 34, firstly, a UE may transmit a PRACH preamble on uplink as message 1 (Msg1) of the random access procedure.

Random access preamble sequences of two different lengths may be supported. A long sequence having a length of 839 is applied with subcarrier spacings of 1.25 kHz and 5 kHz and a short sequence having a length of 139 is applied with subcarrier spacings of 15, 30, 60, and 120 kHz. Long sequences can support unrestricted sets and restricted sets of type A and type B, while short sequences can support unrestricted sets only.

Multiple RACH preamble formats may be defined with one or more RACH OFDM symbols, and different cyclic prefixes (CPs), and a guard time. The PRACH preamble configuration to use may be provided to the UE in the system information.

When there is no response to Msg1, the UE may retransmit the PRACH preamble with power ramping within a predetermined number of times. The UE calculates PRACH transmission power for retransmission of the preamble on the basis of the most recent estimate pathloss and a power ramping counter. If the UE conducts beam switching, the power ramping counter remains unchanged.

Figure 35:
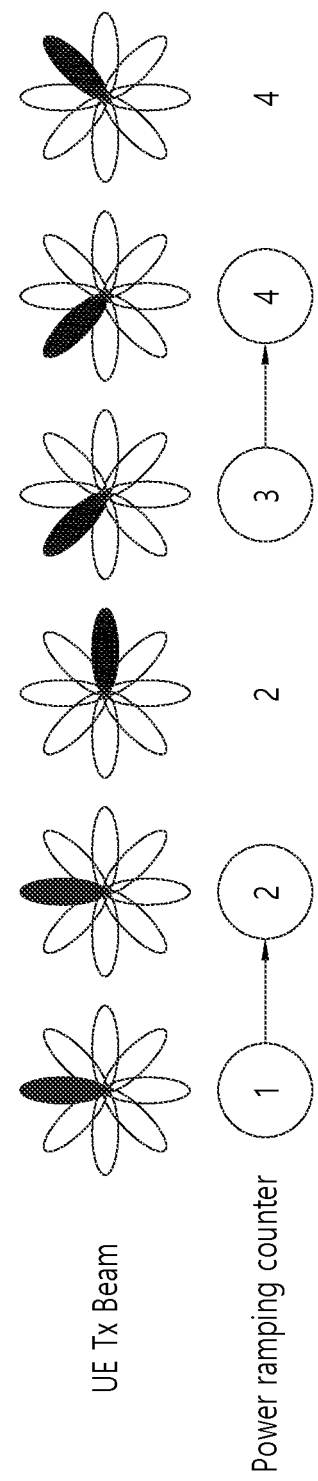
FIG. 35 illustrates the power ramping counter.

FIG. 35 illustrates the power ramping counter.

The UE can perform power ramping for retransmission of a random access preamble on the basis of the power ramping counter. Here, the power ramping counter remains unchanged when the UE performs beam switching during PRACH retransmission, as described above.

Referring to FIG. 35, when the UE retransmits a random access preamble for the same beam as in a case where the power ramping counter increases from 1 to 2 and from 3 to 4, the UE increases the power ramping counter by 1. However, when the beam has changed, the power ramping counter may not change during PRACH retransmission.

Figure 36:
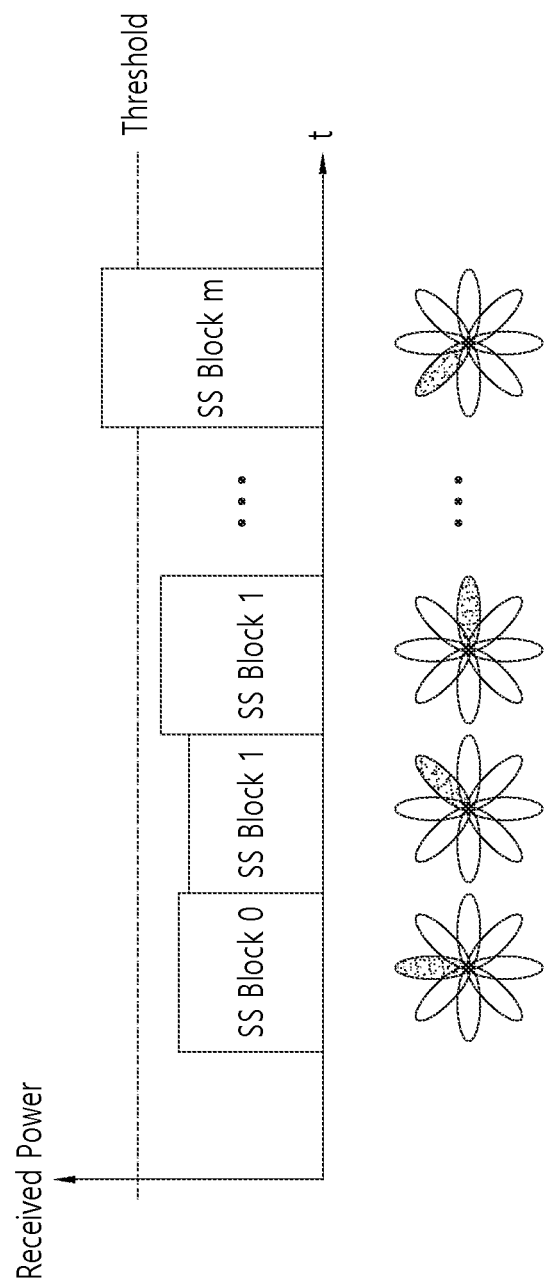
FIG. 36 illustrates the concept of a threshold of SS blocks for RACH resource association.

FIG. 36 illustrates the concept of a threshold of SS blocks for RACH resource association.

System information informs the UE of the association between SS blocks and RACH resources. The threshold of the SS blocks for RACH resource association may be based on the RSRP and network configurable. Transmission or retransmission of a RACH preamble may be based on SS blocks that satisfy the threshold. Accordingly, in the example of FIG. 36, SS block m exceeds the threshold of received power, and thus the RACH preamble is transmitted or retransmitted on the basis of SS block m.

Thereafter, when the UE receives a random access response on a DL-SCH, the DL-SCH may provide timing alignment information, a RA-preamble ID, an initial uplink grant, and a temporary C-RNTI.

Based on this information, the UE may perform uplink transmission on a UL-SCH as message 3 (Msg3) of the random access procedure. Msg3 may include an RRC connection request and a UE ID.

In response, the network may transmit Msg4, which can be treated as a contention resolution message on downlink. The UE can enter an RRC connected state by receiving Msg4.

Hereinafter, the random access procedure will be described in more detail.

Prior to initiation of a physical random access procedure, Layer 1 needs to receive a set of SS/PBCH block indexes from high layers and provide a corresponding set of RSRP measurements to the higher layers.

Prior to initiation of the physical random access procedure, Layer 1 needs to receive the following information from the higher layers.
  Configuration of PRACH transmission parameters (a PRACH preamble format, time resources, and frequency resources for PRACH transmission)
  Parameters for determining root sequences and their cyclic shifts in a PRACH preamble sequence set (index to logical root sequence table, cyclic shift ($N_{cs}$), and set type (an unrestricted set, restricted set A, and restricted set B)).

From the physical layer perspective, L1 random access procedure encompasses transmission of a random access preamble (Msg1) in a PRACH, a random access response (RAR) message (Msg2) with a PDCCH/PDSCH, and when applicable, transmission of Msg3 PUSCH, and PDSCH for contention resolution.

If a random access procedure is initiated by a PDCCH order to the UE, random access preamble transmission may be with the same subcarrier spacing as a subcarrier spacing for random access preamble transmission initiated by higher layers.

If a UE is configured with two uplink carriers for a serving cell and the UE detects a PDCCH order, the UE may use a UL/SUL indicator field value from the detected PDCCH order to determine an uplink carrier for the corresponding random access preamble transmission.

Hereinafter, the random access preamble will be described in more detail.

Regarding the random access preamble transmission step, the physical random access procedure may be triggered upon request of a PRACH transmission by higher layers or by a PDCCH order. A configuration by higher layers for PRACH transmission may include the following.
  A configuration for PRACH transmission
  A preamble index, a preamble subcarrier spacing, $P_{PRACH,target}$, a corresponding RA-RNTI, and a PRACH resources
  A preamble may be transmitted using a selected PRACH format with a transmission power $P_{PRACH,b,f,c(i)}$ on the indicated PRACH resources.

A UE may be provided with a number of SS/PBCH blocks associated with one PRACH occasion by a value of a higher layer parameter SSB-perRACH-Occasion. If the value of SSB-perRACH-Occasion is less than 1, one SS/PBCH block can be mapped to consecutive PRACH occasions of 1/SSB-perRACH-Occasions. The UE may be provided with a number of preambles per SS/PBCH by the value of higher layer parameter cb-preamblePerSSB, and the UE may determine a total number of preambles per SSB per PRACH occasion as a multiple of the value of SSB-perRACH-Occasion and the value of cb-preamblePerSSB.

SS/PBCH block indexes may be mapped to PRACH occasions in the following orders.
  First, in ascending order of preamble indexes within a single PRACH occasion
  Second, in ascending order of frequency resource indexes for frequency multiplexed PRACH occasions
  Third, in ascending order of time resource indexes for time multiplexed PRACH occasions within a PRACH slot
  Fourth, in ascending order of indexes for PRACH slots
  A period starting from frame 0, for mapping of SS/PBCH blocks to PRACH occasions, is the smallest of PRACH configuration periods {1, 2, 4} equal to or greater than $(N_{Tx}^{SSB}/N_{PRACHperiod}^{SSB})$, (where the UE acquires $N_{Tx}^{SSB}$ from higher layer parameter SSB-transmitted-SIB1, and $N_{PRACHperiod}^{SSB}$ is the number of SS/PBCH blocks that can be mapped to one PRACH configuration period.

If a random access procedure is initiated by a PDCCH order, the UE needs to, if requested by higher layers, transmit a PRACH in the first available PRACH occasion for which a time between the last symbol of the PDCCH order reception and the first symbol of the PRACH transmission is equal to or longer than $N_{T,2+\Delta_{BWPSwitching}+\Delta_{Delay}}$ msec, where $N_{T,2}$ is a time duration of $N_2$ symbols corresponding to a PUSCH preparation time for PUSCH processing capability 1, $\Delta_{BWPSwitching}$ is predefined, and $\Delta_{Delay} > 0$.

Hereinafter, the random access response will be described in more detail.

In response to a PRACH transmission, a UE attempts to detect a PDCCH with a corresponding RA-RNTI during a window controlled by higher layers. The window may start at the first symbol of the earliest control resource set the UE is configured for Type1-PDCCH common search space that is at least $((\Delta EN_{slot}^{subframe,\mu} EN_{symb}^{slot})/T_{sf})$ symbols after the last symbol of preamble sequence transmission. The length of the window in number of slots, based on the subcarrier spacing for Type0-PDCCH common search space may be provided by higher layer parameter rar-Window-Length.

If a UE detects a PDCCH with the corresponding RA-RNTI and a corresponding PDSCH including a DL-SCH transport block within the window, the UE can pass the transport block to higher layers. The higher layers can parse the transport block for a random access preamble identity (RAPID) associated with the PRACH transmission. If the higher layers identify the RAPID in RAR message(s) of the DL-SCH transport block, the higher layers can indicate an uplink grant to the physical layer. This may be referred to as a random access response (RAR) uplink grant in the physical layer. If the higher layers do not identify the RAPID associated with the PRACH transmission, the higher layers can indicate to the physical layer to transmit a PRACH. A minimum time between the last symbol of the PDSCH reception and the first symbol of the PRACH transmission is equal to $N_{T,1}+\Delta_{new}+0.5$, where $N_{T,1}$ is a time duration of $N_1$ symbols corresponding to a PDSCH reception time for PDSCH processing capability 1 and $\Delta_{new} \geq 0$.

A UE may need to receive the PDCCH with the corresponding RA-RNTI and the corresponding PDSCH including a DL-SCH transport block with the same DM-RS antenna port quasi co-location (QCL) properties, as for a detected SS/PBCH block or a received CSI-RS. If the UE attempts to detect the PDCCH with the corresponding RA-RNTI in response to a PRACH transmission initiated by a PDCCH order, the UE may assume that the PDCCH and the PDCCH order have the same DM-RS antenna port QCL properties.

A RAR uplink grant schedules a PUSCH transmission from the UE (Msg3 PUSCH). The contents of the RAR uplink grant, starting with the MSB and ending with the LSB, are given in Table 11. Table 11 shows a random access response grant configuration field size.

TABLE 11

| RAR grant field | Number of bits |
|---|---|
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is for uplink resource allocation type 1. In case of frequency hopping, based on the indication of the frequency hopping flag, the first one or two bits $N_{UL,hop}$ of the Msg3 PUSCH frequency resource allocation field can be used as hopping information bits. The MCS can be determined from the first 16 indexes of the available MCS index table for the PUSCH.

The TPC command $\delta_{msg2,b,f,c}$ is used to set the power of the Msg3 PUSCH and may be interpreted according to the following Table 12.

TABLE 12

| TPC Command | Value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In a non-contention-based random access procedure, the CSI request field is interpreted to determine whether an aperiodic CSI report is included in the corresponding PUSCH transmission. In a contention-based random access procedure, the CSI request field may be reserved. Unless a UE is configured a subcarrier spacing, the UE receives a subsequent PDSCH using the same subcarrier spacing as that for PDSCH reception which provides a RAR message.

If a UE does not detect the PDCCH with a corresponding RA-RNTI and a corresponding DL-SCH transport block within the window, the UE performs a procedure for random access response reception failure.

Hereinafter, Msg3 PUSCH transmission will be described in more detail.

Regarding Msg3 PUSCH transmission, higher layer parameter msg3-tp indicates to the UE whether or not the UE applies transform precoding, for Msg3 PUSCH transmission. If the UE applies transform precoding to Msg3 PUSCH transmission with frequency hopping, a frequency offset for the second hop may be given in Table 13. Table 13 shows frequency offsets for the second hop for Msg3 PUSCH transmission with frequency hopping.

TABLE 13

| Number of PRBs in initial active UL BWP | Value of $N_{UL,hop}$ Hopping Bits | Frequency offset for $2^{nd}$ hop |
|---|---|---|
| $N^{size}_{BWP} < 50$ | 0 | $N^{size}_{BWP}/2$ |
|  | 1 | $N^{size}_{BWP}/4$ |
| $N^{size}_{BWP} \geq 50$ | 00 | $N^{size}_{BWP}/2$ |
|  | 01 | $N^{size}_{BWP}/4$ |
|  | 10 | $-N^{size}_{BWP}/4$ |
|  | 11 | Reserved |

The subcarrier spacing for Msg3 PUSCH transmission may be provided by a higher layer parameter msg3-scs. The UE needs to transmit a PRACH and Msg3 PUSCH on the same uplink carrier of the same serving cell. A UL BWP for Msg3 PUSCH transmission may be indicated by SystemInformationBlockType1. A minimum time between the last symbol of PDSCH reception conveying a RAR and the first symbol of corresponding Msg3 PUSCH transmission scheduled by the RAR in a PDSCH for the UE when the PDSCH and the PUSCH have the same subcarrier spacing may be equal to $N_{T,1}+N_{T,2}+N_{TA,max}+0.5$ msec. $N_{T,1}$ is a time duration of $N_1$ symbols corresponding to PDSCH reception time for PDSCH processing capability 1 when an additional PDSCH DM-RS is configured, $N_{T,2}$ is a time duration of $N_2$ symbols corresponding to PUSCH preparation time for PUSCH processing capability 1, $N_{TA,max}$ is a maximum timing adjustment value that can be provided by the TA command field in the RAR.

Hereinafter, contention resolution will be described in more detail.

In response to an Msg3 PUSCH transmission when a UE has not been provided with a C-RNTI, the UE attempts to detect a PDCCH with a corresponding TC-RNTI scheduling a PDSCH that includes a UE contention resolution identity. In response to the PDSCH reception with the UE contention resolution identity, the UE transmits HARQ-ACK information in a PUCCH. A minimum time between the last symbol of the PDSCH reception and the first symbol of the corresponding HARQ-ACK transmission is equal to $N_{T,1}+0.5$ msec. $N_{T,1}$ is a time duration of $N_1$ symbols corresponding to a PDSCH reception time for PDSCH processing capability 1 when additional PDSCH DM-RS is configured.

Hereinafter, channel coding scheme will be described.

Channel coding schemes according to one embodiment of the present disclosure may mainly include a low density parity check (LDPC) coding scheme for data, and a polar coding scheme for control information.

A network/UE may perform LDPC coding on a PDSCH/PUSCH with two base graph (BG) support. Here, BG1 is for mother code rate 1/3, and BG2 is for mother code rate 1/5.

For coding of control information, repetition coding/simplex coding/Reed-Muller coding can be supported. The polar coding scheme can be used for the case when the control information has a length longer than 11 bits. A mother code size may be 512 for DL and may be 1024 for UL. Coding schemes for uplink control information can be summarized in the following table.

TABLE 14

| Uplink Control Information size including CRC, if present | Channel code |
|---|---|
| 1 | Repetition code |
| 2 | Simplex code |
| 3-11 | Reed Muller code |
| >11 | Polar code |

The polar coding scheme may be used for a PBCH. This coding scheme may be the same as that for the PDCCH. Hereinafter, an LDPC coding structure will be described.

LDPC code is a (n, k) linear block code defined as a null-space of a (n−k)×n sparse parity check matrix H.

LDPC code applicable to some embodiments of the present disclosure may be as follows.

$$Hx^T = 0 \quad \text{[Equation 4]}$$

$$Hx^T = \begin{bmatrix} 1 & 1 & 1 & 0 & 0 \\ 1 & 0 & 0 & 1 & 1 \\ 1 & 1 & 0 & 0 & 0 \\ 0 & 1 & 1 & 1 & 0 \end{bmatrix} \begin{bmatrix} x_1 \\ x_2 \\ x_3 \\ x_4 \\ x_5 \end{bmatrix} = \begin{bmatrix} 0 \\ 0 \\ 0 \\ 0 \end{bmatrix}$$

FIG. 37 illustrates a parity check matrix represented by a protograph.

Specifically, FIG. 37 illustrates a parity check matrix with respect to association between variable nodes and check nodes, represented by a protograph.

For example, referring to FIG. 37, variable nodes associated with a check node $c_1$ are $v_1$, $v_2$, $v_3$, $v_4$, $v_6$, and $v_7$, and check nodes associated with a variable node $v_8$ are $c_2$, $c_3$, and $c_4$.

Figure 38:
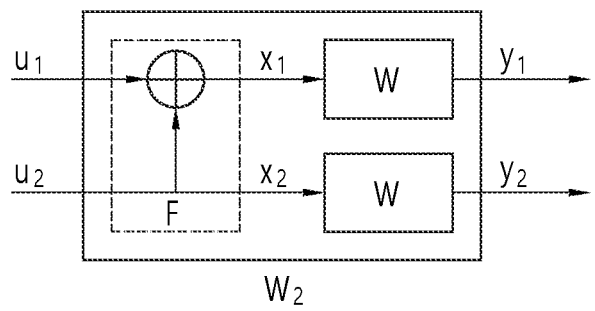
FIG. 38 illustrates an example of an encoder structure for polar code.

FIG. 38 illustrates an example of an encoder structure for polar code. Specifically, (a) of FIG. 38 illustrates an example of a base module for polar code, and (b) of FIG. 38 illustrates a base matrix.

The polar code is known in the art as a code which can acquire channel capacity in a binary-input discrete memoryless channel (B-DMC). That is, channel capacity can be acquired when the size N of the code block is increased to infinite.

Figure 39:
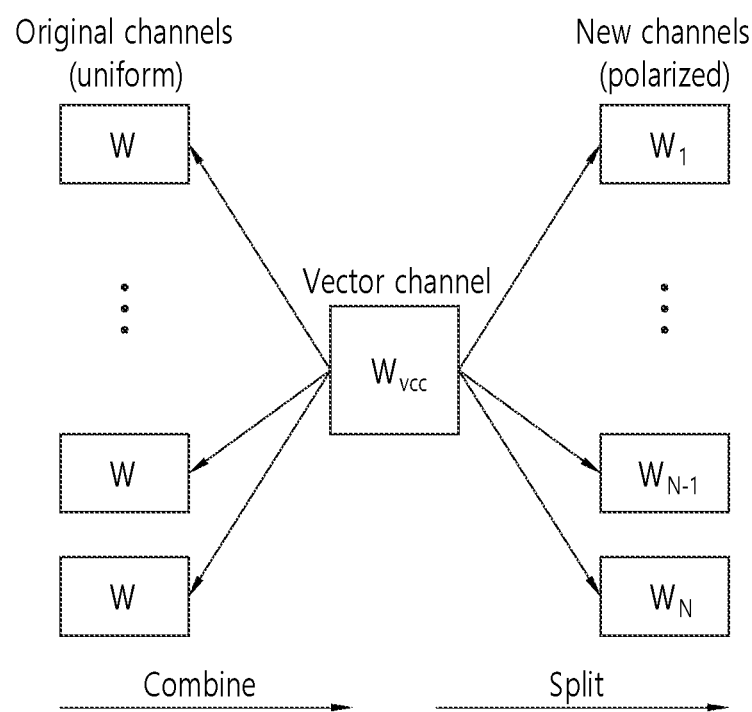
FIG. 39 schematically illustrates an example of an encoder operation for the polar code.

FIG. 39 schematically illustrates an example of an encoder operation for the polar code.

Referring to FIG. 39, a polar code encoder can perform channel combination and channel splitting. Specifically, the polar code encoder can combine original channels into one vector channel of split one vector channel into multiple new channels. For example, original channels before being combined into one vector channel may be uniform, and multiple new channels split from one vector channel may be polarized.

<Discontinuous Reception (DRX)>

Discontinuous reception (DRX) means an operation mode in which user equipment (UE) can discontinuously receive a downlink channel by reducing battery consumption. That is, a UE for which DRX is configured can reduce power consumption by discontinuously receiving a DL signal.

The DRX operation is performed within a DRX cycle representing a time interval at which on-duration is periodically repeated. The DRX cycle includes on-duration and sleep duration (or DRX occasion). On-duration represents a time interval in which a UE monitors a PDCCH in order to receive a PDCCH.

DRX can be performed in RRC (Radio Resource Control)_IDLE state (or mode), RRC_INACTIVE state (or mode) or RRC_CONNECTED state (or mode). In RRC_IDLE state and RRC_INACTIVE state, DRX can be used to discontinuously receive a paging signal.

RRC_IDLE state: a state in which radio connection (RRC connection) between an eNB and a UE is not established.

RRC_INACTIVE state: a state in which radio connection (RRC connection) between an eNB and a UE is established but radio connection is deactivated.

RRC_CONNECTED state: a state in which radio connection (RRC connection) between an eNB and a UE is established.

DRX can be basically divided into idle mode DRX, connected DRX (C-DRX), and extended DRX.

DRX applied in an IDLE state may be referred to as idle mode DRX, and DRX applied in a CONNECTED state may be referred to as connected DRX (C-DRX).

eDRX (Extended/Enhanced DRX) is a mechanism for extending cycles of the idle mode DRX and C-DRX and may be mainly used for application of (massive) IoT. In idle mode DRX, whether to allow eDRX can be set on the basis of system information (e.g., SIB1). SIB1 may include an eDRX-allowed parameter. eDRX-allowed parameter indicates whether idle mode extended DRX is allowed.

<Idle Mode DRX>

In the idle mode, a UE can use DRX to reduce power consumption. One paging occasion (PO) is a subframe in which a P-RNTI (Paging-Radio Network Temporary Identifier) can be transmitted through a PDCCH (that addresses a paging message for NB-IoT), an MPDCCH (MTC PDCCH) or an NPDCCH (Narrowband PDCCH).

In the P-RNTI transmitted through the MPDCCH, the PO can represent the starting subframe of MPDCCH repetition. In case of the P-RNTI transmitted through the NPDCCH, when a subframe determined by the PO is not valid NB-IoT downlink subframe, the PO can represent the starting subframe of NPDCCH repetition. Accordingly, the first valid NB-IoT downlink subframe after the PO is the starting subframe of NPDCCH repetition.

One paging frame (PF) is one radio frame that can include one or more paging occasions. When DRX is used, a UE can monitor only one PO per DRX cycle. One paging narrow band (PNB) is a narrow band in which a UE performs paging message reception. PF, PO, and PNB can be determined on the basis of DRX parameters provided by system information.

Figure 40:
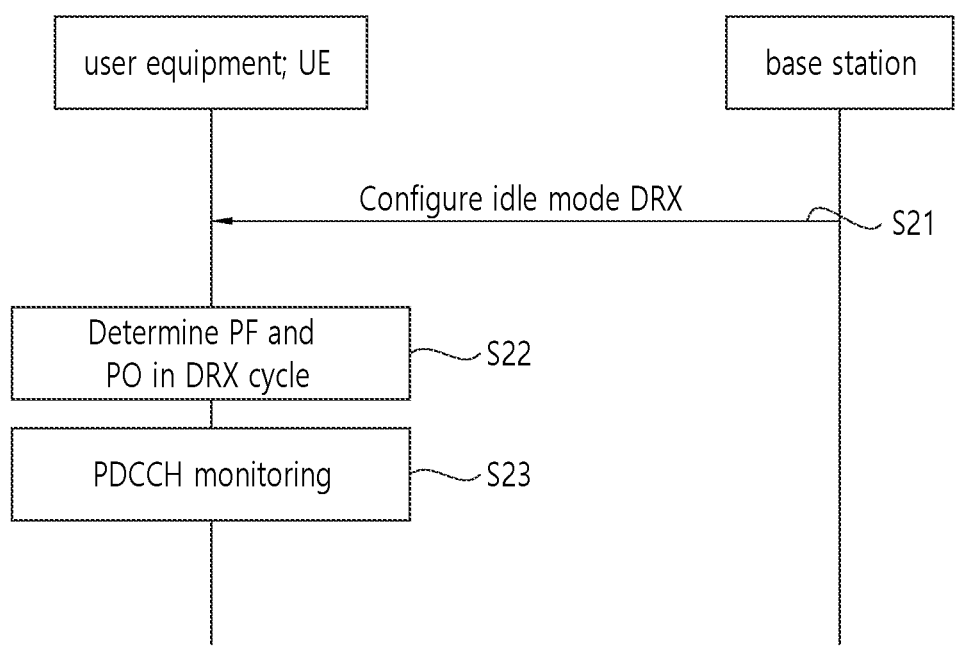
FIG. 40 is a flowchart illustrating an example of performing an idle mode DRX operation.

FIG. 40 is a flowchart illustrating an example of performing an idle mode DRX operation.

Referring to FIG. 40, a UE may receive idle mode DRX configuration information from a base station through higher layer signaling (e.g., system information) (S21).

The UE may determine a paging frame (PF) and a paging occasion (PO) in order to monitor a PDCCH in a paging DRX cycle on the basis of the idle mode DRX configuration information (S22). In this case, the DRX cycle may include on-duration and sleep duration (or DRX occasion).

The UE may monitor the PDCCH in the PO of the determined PF (S23). Here, the UE monitors only one subframe (PO) per paging DRX cycle, for example. Further, upon reception of a PDCCH scrambled by a P-RNTI for on-duration (i.e., upon detection of paging), the UE can switch to a connected mode and transmit/receive data to/from the base station.

Figure 41:
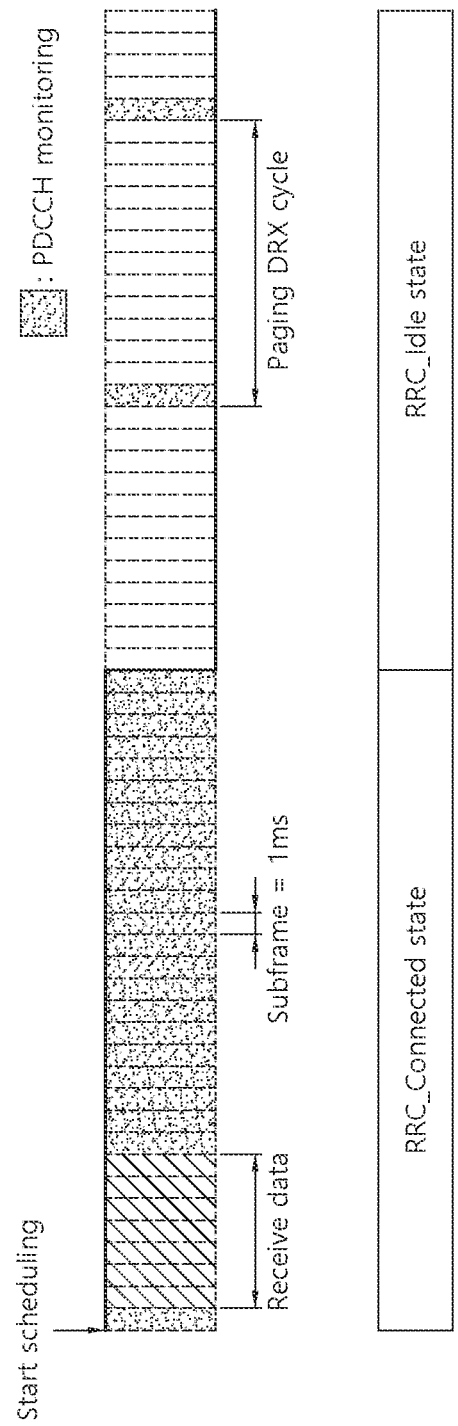
FIG. 41 schematically illustrates an example of the idle mode DRX operation.

FIG. 41 schematically illustrates an example of the idle mode DRX operation.

Referring to FIG. 41, when there is traffic directed to a UE in RRC_IDLE state (hereinafter referred to as a "idle state"), paging for the UE occurs. The UE can wake up periodically (i.e., at (paging) DRX cycle) to monitor a PDCCH. When paging is not present, the UE can switch to a connected state to receive data, and when data is not present, enter a sleep mode.

<Connected Mode DRX (C-DRX))>

C-DRX refers to DRX applied in RRC_CONNECTED state. The DRX cycle of C-DRX can be composed of a short DRX cycle and/or a long DRX cycle. Here, the short DRX cycle may be an option.

When C-DRX is configured, a UE can perform PDCCH monitoring for on-duration. When a PDCCH is successfully detected during PDCCH monitoring, the UE can operate (or execute) an inactive timer and remain in an awake state. On the other hand, when a PDCCH is not successfully detected during PDCCH monitoring, the UE can enter a sleep state after on-duration ends.

When C-DRX is configured, PDCCH reception occasions (e.g., slots having a PDCCH search space) may be discontinuously configured based on C-DRX configuration. On the contrary, when C-DRX is not configured, PDCCH reception occasions (e.g., slots having a PDCCH search space) can be continuously configured in the present disclosure.

Meanwhile, PDCCH monitoring may be limited to a time interval set to a measurement gap irrespective of C-DRX configuration.

Figure 42:
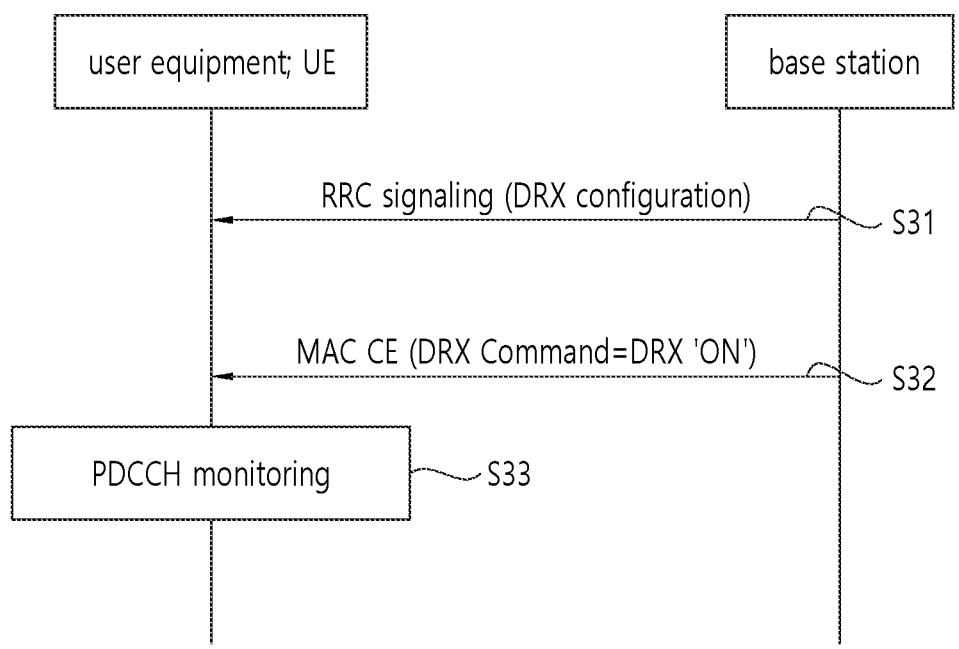
FIG. 42 is a flowchart illustrating an example of a method of performing a C-DRX operation.

FIG. 42 is a flowchart illustrating an example of a method of performing a C-DRX operation.

A UE may receive RRC signaling (e.g., MAC-MainConfig IE) including DRX configuration information from a base station (S31).

Here, the DRX configuration information may include the following information.
- onDurationTimer: the number of PDCCH subframes that can be continuously monitored at the start of a DRX cycle
- drx-InactivityTimer: the number of PDCCH subframes that can be continuously monitored when a UE decodes a PDCCH having scheduling information
- drx-RetransmissionTimer: the number of PDCCH subframes to be continuously monitored when HARQ retransmission is expected
- longDRX-Cycle: on-duration occurrence period
- drxStartOffset: a subframe number at which a DRX cycle starts
- drxShortCycleTimer: a short DRX cycle number
- shortDRX-Cycle: a DRX cycle operating by the number of drxShortCycleTimer when Drx-InactivityTimer expires In addition, when DRX "ON" is configured through a DRX command of a MAC command element (CE) (S32), the UE monitors a PDCCH for on-duration of the DRX cycle on the basis of DRX configuration (S33).

Figure 43:
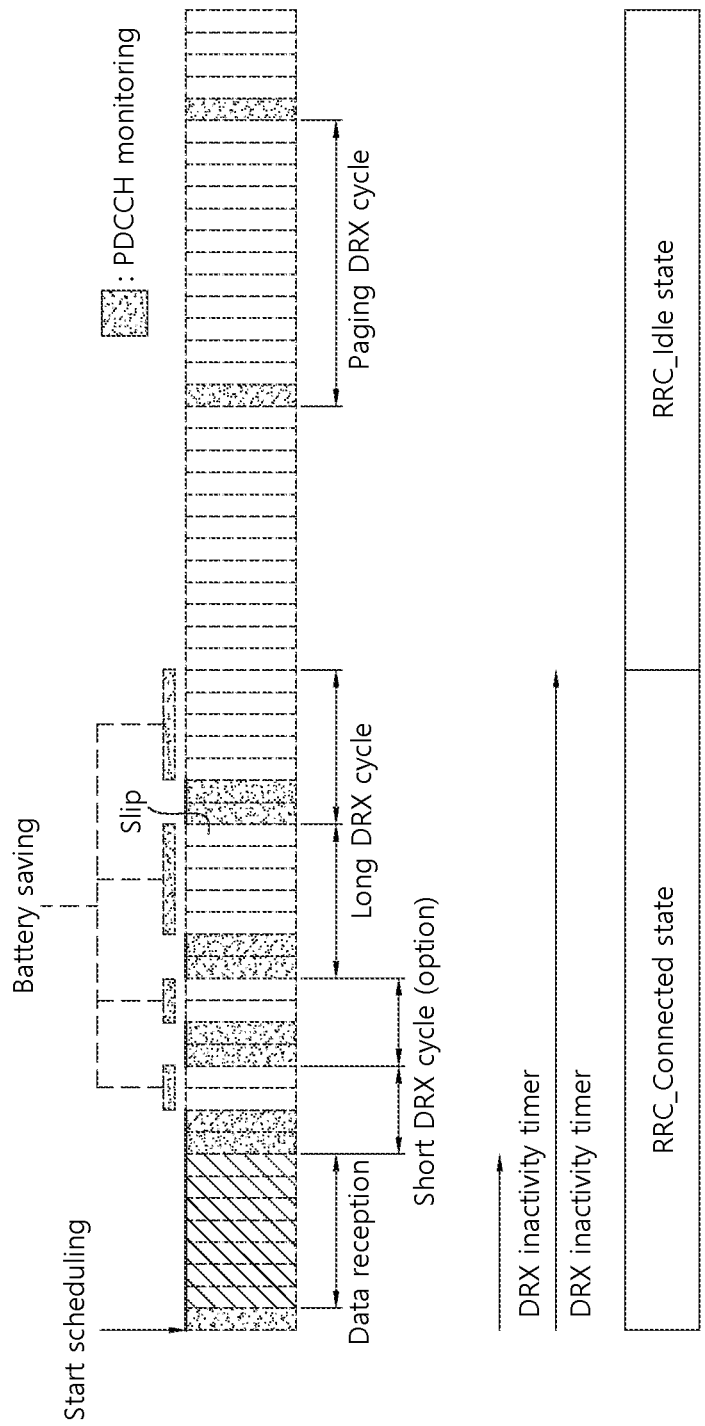
FIG. 43 schematically illustrates an example of the C-DRX operation.

FIG. 43 schematically illustrates an example of the C-DRX operation.

When a UE receives scheduling information (e.g., a DL grant) in RRC_CONNECTED state (hereinafter referred to as a connected state), the UE can execute an inactive timer and an RRC inactive timer.

When the DRX inactive timer expires, a DRX mode can be initiated. The UE can wake up in the DRX cycle and monitor a PDCCH for a predetermined time (on a duration timer).

In this case, when short DRX is configured, the UE initiates the DRX mode with a short DRX cycle first, and after the short DRX cycle ends, initiates the DRX mode with a long DRX cycle. Here, the long DRX cycle may correspond to a multiple of the short DRX cycle. In addition, the UE can wake up more frequently in the short cycle. After the RRC inactive timer expires, the UE can switch to an IDLE state and perform an idle mode DRX operation.

<IA/RA+Drx Operation>

Figure 44:
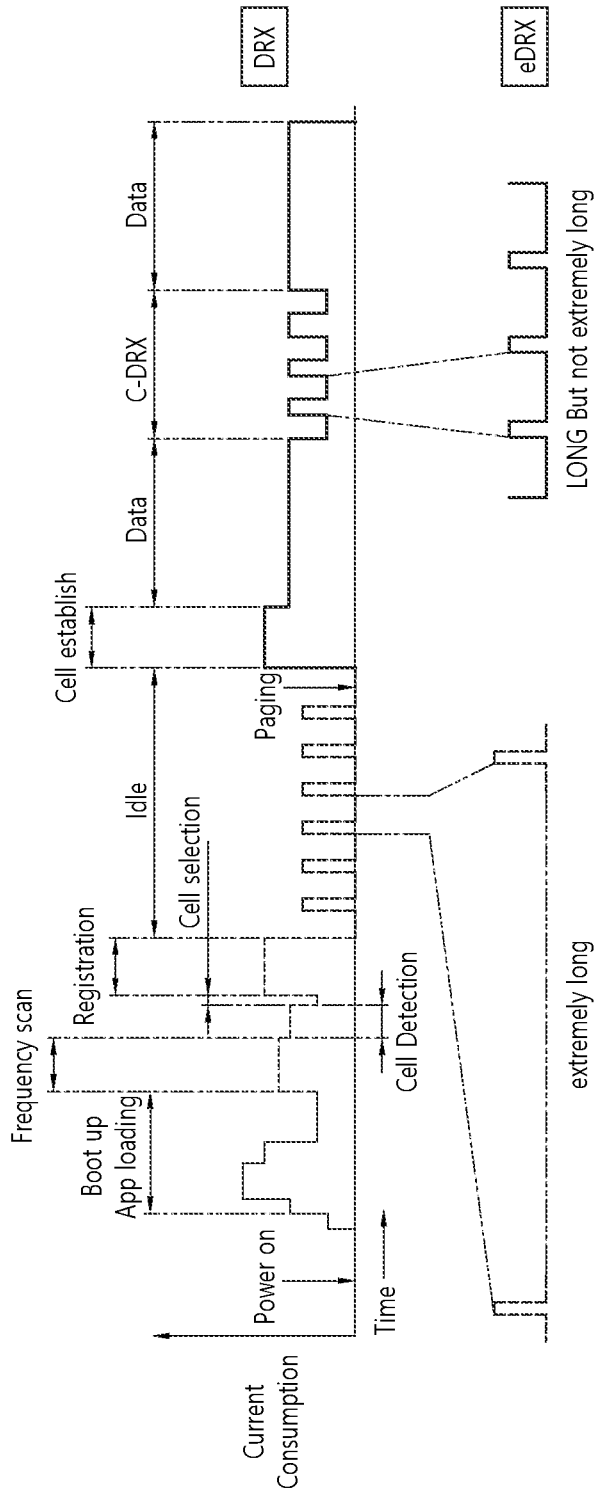
FIG. 44 schematically illustrates an example of power consumption in response to a UE state.

FIG. 44 schematically illustrates an example of power consumption in response to a UE state.

Referring to FIG. 44, After a UE is powered on, the UE performs boot up for application loading, an initial access/random access procedure for downlink and uplink synchronization with a base station, and a network registration procedure. Here, current consumption (power consumption) during each procedure is shown in FIG. 43.

If transmission power of the UE is high, current consumption of the UE may increase. Further, when traffic that needs to be transmitted to a UE or traffic that needs to be transmitted to a base station is not present, the UE switches to the idle mode in order to reduce power consumption and performs the idle mode DRX operation.

When paging (e.g., call) is generated during the idle mode DRX operation, the UE can switch from the idle mode to the connected mode through a cell establishment procedure and transmit/receive data to/from the base station.

In addition, when there is no data received from the base station or transmitted to the base station for a specific time in the connected mode or at set timing, the UE can perform connected DRX (C-DRX).

Furthermore, when extended DRX (eDRX) is configured for the UE through higher layer signaling (e.g., system information), the UE can perform eDRX operation in the idle mode or connected mode.

What is claimed is:

1. A method for performing a physical uplink shared channel (PUSCH) transmission in a wireless communication system, the method performed by a user equipment (UE) and comprising:
   transmitting a random access preamble to a base station;
   receiving a random access response from the base station; and
   performing the PUSCH transmission,
   wherein the UE receives specific information related to a start symbol of a PUSCH,
   wherein the UE performs the PUSCH transmission based on the start symbol,
   wherein a cyclic prefix (CP) extension is performed during a specific interval,
   wherein the specific interval is an interval determined based on a plurality of variables,
   wherein the plurality of variables comprises a variable which has a value of one of $25*10^{-6}$, $16*10^{-6}+T_{TA}$ or $25*10^{-6}+T_{TA}$ and
   wherein the $T_{TA}$ is a timing advance between a downlink and an uplink.

2. The method of claim 1, wherein the specific information is start and length indicator value (SLIV) information.

3. The method of claim 2, wherein the SLIV information informs a start symbol index of the PUSCH and a number of symbols constituting the PUSCH.

4. The method of claim 1, wherein the plurality of variables further comprises a variable which has a value related to a subcarrier spacing.

5. The method of claim 4, wherein the UE receives information related to a type of listen before transmission (LBT).

6. The method of claim 5, wherein the information related to the type of LBT is information related to a type of a channel sensing used before the UE transmits a signal.

7. The method of claim 6, wherein the plurality of variables are determined based on the type of LBT.

8. A user equipment (UE) comprising:
a memory;
a transceiver; and
a processor operatively coupled to the memory and the transceiver, wherein the processor is configured to:
control the transceiver to transmit a random access preamble to a base station;
control the transceiver to receive a random access response from the base station; and
perform a PUSCH transmission,
wherein the UE receives specific information related to a start symbol of a PUSCH,
wherein the UE performs the PUSCH transmission based on the start symbol,
wherein a cyclic prefix (CP) extension is performed during a specific interval,
wherein the specific interval is an interval determined based on a plurality of variables,
wherein the plurality of variables comprises a variable which has a value of one of $25*10^{\wedge}(-6)$, $16*10^{\wedge}(-6)+T_{TA}$ or $25*10^{\wedge}(-6)+T_{TA}$ and
wherein the $T_{TA}$ is a timing advance between a downlink and an uplink.

9. The UE of claim 8, wherein the specific information is start and length indicator value (SLIV) information.

10. The UE of claim 9, wherein the SLIV information informs a start symbol index of the PUSCH and a number of symbols constituting the PUSCH.

11. The UE of claim 8, wherein the plurality of variables further comprises a variable which has a value related to a subcarrier spacing.

12. The UE of claim 11, wherein the UE receives information related to a type of listen before transmission (LBT).

13. The UE of claim 12, wherein the information related to the type of LBT is information related to a type of a channel sensing used before the UE transmits a signal.

14. The UE of claim 13, wherein the plurality of variables are determined based on the type of LBT.

* * * * *